(12) United States Patent
Varaprasad et al.

(10) Patent No.: US 7,494,231 B2
(45) Date of Patent: Feb. 24, 2009

(54) VEHICULAR SIGNAL MIRROR

(75) Inventors: Desaraju V. Varaprasad, Holland, MI (US); Hamid Habibi, Holland, MI (US); Ian A. McCabe, Holland, MI (US); Niall R. Lynam, Holland, MI (US); Mingtang Zhao, Holland, MI (US); Craig A. Dornan, Grand Haven, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 11/954,982

(22) Filed: Dec. 12, 2007

(65) Prior Publication Data

US 2008/0094684 A1 Apr. 24, 2008

Related U.S. Application Data

(63) Continuation of application No. 11/655,096, filed on Jan. 19, 2007, which is a continuation of application No. 11/244,182, filed on Oct. 6, 2005, which is a continuation of application No. 10/971,456, filed on Oct. 22, 2004, now Pat. No. 7,004,592, which is a continuation of application No. 09/954,285, filed on Sep. 18, 2001, now abandoned, which is a continuation of application No. 08/957,027, filed on Oct. 24, 1997, now abandoned, which is a continuation of application No. 08/429,643, filed on Apr. 27, 1995, now Pat. No. 5,724,187, which is a continuation-in-part of application No. 08/238,521, filed on May 5, 1994, now Pat. No. 5,668,663.

(51) Int. Cl.
*G02B 17/00* (2006.01)
*G02B 27/10* (2006.01)

(52) U.S. Cl. .................. 359/603; 359/601; 359/618

(58) Field of Classification Search ......... 359/601–615, 359/618–630, 838–870
See application file for complete search history.

(56) References Cited

U.S. PATENT DOCUMENTS 2,166,303 A 7/1939 Hodny et al. ................. 359/839

(Continued)

FOREIGN PATENT DOCUMENTS

DE 7323996 11/1973

(Continued)

OTHER PUBLICATIONS

N.R. Lynam, "Smart Windows for Automobiles", *SAE Technical Paper Series*, 900419, Society for Automotive Engineers (1990).

(Continued)

*Primary Examiner*—Thong Nguyen
(74) *Attorney, Agent, or Firm*—Van Dyke, Gardner, Linn & Burkhart, LLP

(57) ABSTRACT

A vehicular signal mirror includes a reflective mirror element comprising a mirror reflector on a light-transmitting substrate. The visible light reflectance is at least about 40% for visible light incident upon the front side of the reflective mirror element. A turn signal light display and/or a blind-spot indicator light display is disposed to the rear of the reflective mirror element and configured so that the light emitted by the light display passes through the reflective mirror element to be viewed by a viewer viewing from the front of the reflective mirror element. The light display exhibits, when electrically powered and when operated in the vehicle during day time driving conditions, a display luminance of at least about 30 foot lamberts as measured with the light display placed behind, and emitting light through, the reflective mirror element.

13 Claims, 13 Drawing Sheets

U.S. PATENT DOCUMENTS

| | | |
|---|---|---|
| 3,185,020 A | 5/1965 | Thelen |
| 3,280,701 A | 10/1966 | Donnelly et al. ............... 88/77 |
| 3,432,225 A | 3/1969 | Rock |
| 3,451,741 A | 6/1969 | Manos ....................... 350/160 |
| 3,453,038 A | 7/1969 | Kissa et al. ................. 350/160 |
| 3,521,941 A | 7/1970 | Deb et al. ................... 350/160 |
| 3,543,018 A | 11/1970 | Barcus et al. |
| 3,557,265 A | 1/1971 | Chisholm et al. ............. 264/47 |
| 3,565,985 A | 2/1971 | Schrenk et al. ............. 264/171 |
| 3,628,851 A | 12/1971 | Robertson ................... 359/868 |
| 3,676,668 A | 7/1972 | Collins et al. |
| 3,711,176 A | 1/1973 | Alfrey, Jr. et al. ............... 350/1 |
| 3,781,090 A | 12/1973 | Sumita |
| 3,806,229 A | 4/1974 | Schoot et al. ............... 350/160 |
| 3,807,832 A | 4/1974 | Castellion ................... 350/160 |
| 3,821,590 A | 6/1974 | Kosman et al. |
| 3,860,847 A | 1/1975 | Carley |
| 4,035,681 A | 7/1977 | Savage |
| 4,075,468 A | 2/1978 | Marcus |
| 4,109,235 A | 8/1978 | Bouthors |
| 4,139,234 A | 2/1979 | Morgan ....................... 296/84 |
| 4,174,152 A | 11/1979 | Giglia et al. ................. 350/357 |
| 4,211,955 A | 7/1980 | Ray |
| 4,214,266 A | 7/1980 | Myers |
| 4,228,490 A | 10/1980 | Thillays |
| 4,257,703 A | 3/1981 | Goodrich |
| 4,277,804 A | 7/1981 | Robison |
| 4,281,899 A | 8/1981 | Oskam ....................... 350/289 |
| RE30,835 E | 12/1981 | Giglia ........................ 350/357 |
| 4,310,851 A | 1/1982 | Pierrat |
| 4,331,382 A | 5/1982 | Graff ......................... 359/868 |
| 4,338,000 A | 7/1982 | Kamimori et al. ........... 350/357 |
| 4,377,613 A | 3/1983 | Gordon ...................... 428/212 |
| 4,419,386 A | 12/1983 | Gordon ...................... 427/109 |
| 4,435,042 A | 3/1984 | Wood et al. |
| 4,435,048 A | 3/1984 | Kamimori et al. ........... 350/357 |
| 4,436,371 A | 3/1984 | Wood et al. |
| 4,446,171 A | 5/1984 | Thomas |
| 4,465,339 A | 8/1984 | Baucke et al. ............... 350/357 |
| 4,473,695 A | 9/1984 | Wrighton et al. ............ 546/266 |
| 4,490,227 A | 12/1984 | Bitter ......................... 204/192 |
| 4,499,451 A * | 2/1985 | Suzuki et al. ................ 362/494 |
| 4,524,941 A | 6/1985 | Wood et al. |
| 4,546,551 A | 10/1985 | Franks |
| 4,561,625 A | 12/1985 | Weaver ....................... 249/85 |
| 4,580,196 A | 4/1986 | Task |
| 4,588,267 A | 5/1986 | Pastore ....................... 350/600 |
| 4,630,904 A | 12/1986 | Pastore ....................... 350/600 |
| 4,638,287 A | 1/1987 | Umebayashi et al. |
| 4,646,210 A | 2/1987 | Skogler et al. |
| 4,652,090 A | 3/1987 | Uchikawa et al. ........... 350/357 |
| 4,665,430 A | 5/1987 | Hiroyasu |
| 4,671,619 A | 6/1987 | Kamimori et al. ........... 350/357 |
| 4,692,798 A | 9/1987 | Seko et al. |
| 4,702,566 A | 10/1987 | Tukude et al. ............... 350/357 |
| 4,712,879 A | 12/1987 | Lynam et al. ................ 350/357 |
| 4,729,076 A | 3/1988 | Masami et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. .......... 350/357 |
| 4,780,752 A | 10/1988 | Angerstein et al. |
| 4,781,436 A | 11/1988 | Armbuster |
| 4,793,690 A | 12/1988 | Gahan et al. |
| 4,793,695 A | 12/1988 | Wada et al. .................. 359/270 |
| 4,807,096 A | 2/1989 | Skogler et al. |
| 4,855,161 A | 8/1989 | Moser et al. ................. 427/108 |
| 4,882,466 A | 11/1989 | Friel .......................... 219/219 |
| 4,882,565 A | 11/1989 | Gallmeyer |
| 4,883,349 A | 11/1989 | Mittelhäuser |
| 4,902,108 A | 2/1990 | Byker ........................ 350/357 |
| 4,910,591 A | 3/1990 | Petrossian et al. |
| 4,930,742 A | 6/1990 | Schofield et al. |
| 4,935,665 A | 6/1990 | Murata |
| 4,936,533 A | 6/1990 | Adams et al. |
| 4,953,305 A | 9/1990 | Van Lente et al. |
| 4,959,247 A | 9/1990 | Moser et al. .............. 427/126.5 |
| 4,959,865 A | 9/1990 | Stettiner et al. |
| 4,996,083 A | 2/1991 | Moser et al. ................. 427/108 |
| 5,005,213 A | 4/1991 | Hanson et al. |
| 5,006,971 A | 4/1991 | Jenkins |
| 5,014,167 A | 5/1991 | Roberts |
| 5,016,996 A * | 5/1991 | Ueno ......................... 359/838 |
| 5,027,200 A | 6/1991 | Petrossian et al. |
| 5,038,255 A | 8/1991 | Nishihashi et al. |
| 5,058,851 A | 10/1991 | Lawlor et al. |
| 5,066,112 A | 11/1991 | Lynam et al. ............... 359/267 |
| 5,073,012 A | 12/1991 | Lynam ....................... 359/265 |
| 5,076,673 A | 12/1991 | Lynam et al. |
| 5,076,674 A | 12/1991 | Lynam ....................... 359/274 |
| 5,100,095 A | 3/1992 | Haan et al. |
| 5,115,346 A | 5/1992 | Lynam ....................... 359/604 |
| 5,117,346 A | 5/1992 | Gard |
| 5,121,200 A | 6/1992 | Choi et al. |
| 5,128,799 A | 7/1992 | Byker ........................ 359/265 |
| 5,136,483 A | 8/1992 | Schöniger et al. |
| 5,140,455 A | 8/1992 | Varaprasad et al. .......... 359/275 |
| 5,142,407 A | 8/1992 | Varaprasad et al. .......... 359/276 |
| 5,151,816 A | 9/1992 | Varaprasad et al. .......... 359/275 |
| 5,151,824 A | 9/1992 | O'Farrell .................... 359/604 |
| 5,160,200 A | 11/1992 | Cheselske |
| 5,160,201 A | 11/1992 | Wrobel |
| 5,178,448 A | 1/1993 | Adams et al. |
| 5,179,471 A | 1/1993 | Caskey et al. |
| 5,189,537 A | 2/1993 | O'Farrell ..................... 359/71 |
| 5,193,029 A | 3/1993 | Schofield et al. |
| 5,197,562 A | 3/1993 | Kakinami et al. |
| 5,207,492 A | 5/1993 | Roberts ....................... 362/30 |
| 5,230,400 A | 7/1993 | Kakinami et al. |
| 5,233,461 A | 8/1993 | Dornan et al. ............... 359/272 |
| 5,239,405 A | 8/1993 | Varaprasad et al. .......... 359/272 |
| 5,239,406 A | 8/1993 | Lynam ....................... 359/275 |
| 5,243,417 A | 9/1993 | Pollard |
| 5,252,354 A | 10/1993 | Cronin et al. ................ 427/58 |
| 5,253,109 A | 10/1993 | O'Farrell et al. ............. 359/604 |
| 5,255,442 A | 10/1993 | Schierbeek et al. |
| 5,277,986 A | 1/1994 | Cronin et al. ............... 428/432 |
| 5,285,060 A | 2/1994 | Larson et al. ............... 250/214 |
| 5,289,321 A | 2/1994 | Secor |
| 5,296,924 A | 3/1994 | Blancard et al. |
| 5,303,205 A | 4/1994 | Gauthier et al. |
| 5,304,980 A | 4/1994 | Maekawa |
| 5,330,149 A | 7/1994 | Haan et al. |
| 5,355,284 A | 10/1994 | Roberts |
| 5,361,190 A | 11/1994 | Roberts et al. |
| 5,371,659 A | 12/1994 | Pastrick et al. |
| 5,386,285 A | 1/1995 | Asayama |
| 5,406,414 A | 4/1995 | O'Farrell et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,424,865 A | 6/1995 | Lynam |
| 5,424,952 A | 6/1995 | Asayama |
| 5,432,496 A | 7/1995 | Lin |
| 5,444,478 A | 8/1995 | LeLong et al. |
| 5,446,576 A | 8/1995 | Lynam et al. |
| 5,469,298 A | 11/1995 | Suman et al. |
| 5,475,494 A | 12/1995 | Nishida et al. |
| 5,481,409 A | 1/1996 | Roberts |
| 5,483,453 A | 1/1996 | Uemura et al. |
| 5,485,378 A | 1/1996 | Franke et al. |
| 5,487,522 A | 1/1996 | Hook |
| 5,488,496 A | 1/1996 | Pine |

| | | | | | |
|---|---|---|---|---|---|
| 5,497,305 A | 3/1996 | Pastrick et al. | 5,805,367 A | 9/1998 | Kanazawa .................. 359/868 |
| 5,497,306 A | 3/1996 | Pastrick | 5,806,965 A | 9/1998 | Deese |
| 5,515,448 A | 5/1996 | Nishitani | 5,808,777 A | 9/1998 | Lynam et al. |
| 5,521,760 A | 5/1996 | DeYoung et al. | 5,813,745 A | 9/1998 | Fant, Jr. et al. |
| 5,523,811 A | 6/1996 | Wada et al. | 5,820,097 A | 10/1998 | Spooner |
| 5,525,264 A | 6/1996 | Cronin et al. | 5,820,245 A | 10/1998 | Desmond et al. |
| 5,528,474 A | 6/1996 | Roney et al. | 5,823,654 A | 10/1998 | Patrick et al. |
| 5,530,240 A | 6/1996 | Larson et al. | 5,844,505 A | 12/1998 | Van Ryzin |
| 5,530,421 A | 6/1996 | Marshall et al. | 5,850,176 A | 12/1998 | Kinoshita et al. |
| 5,535,056 A | 7/1996 | Caskey et al. | 5,863,116 A | 1/1999 | Pastrick et al. |
| 5,535,144 A | 7/1996 | Kise | 5,871,275 A | 2/1999 | O'Farrell et al. |
| 5,541,590 A | 7/1996 | Nishio | 5,877,707 A | 3/1999 | Kowalick |
| 5,550,677 A | 8/1996 | Schofield et al. | 5,877,897 A | 3/1999 | Schofield et al. |
| 5,567,360 A | 10/1996 | Varaprasad et al. | 5,878,370 A | 3/1999 | Olson |
| 5,570,127 A | 10/1996 | Schmidt | 5,879,074 A | 3/1999 | Pastrick |
| 5,574,443 A | 11/1996 | Hsieh | 5,883,739 A | 3/1999 | Ashihara et al. |
| 5,576,975 A | 11/1996 | Sasaki et al. | 5,899,956 A | 5/1999 | Chan |
| 5,587,236 A | 12/1996 | Agrawal et al. | 5,904,729 A | 5/1999 | Ruzicka |
| 5,602,542 A | 2/1997 | Widmann et al. | 5,910,854 A | 6/1999 | Varaprasad et al. |
| 5,610,756 A | 3/1997 | Lynam et al. | 5,914,815 A | 6/1999 | Bos |
| 5,611,966 A | 3/1997 | Varaprasad et al. | 5,924,212 A | 7/1999 | Domanski |
| 5,615,023 A | 3/1997 | Yang | 5,929,786 A | 7/1999 | Schofield et al. |
| 5,615,857 A | 4/1997 | Hook | 5,938,321 A | 8/1999 | Bos et al. |
| 5,617,085 A | 4/1997 | Tsutsumi et al. | 5,940,011 A | 8/1999 | Agravante et al. |
| 5,632,092 A | 5/1997 | Blank et al. | 5,940,120 A | 8/1999 | Frankhouse et al. |
| 5,632,551 A | 5/1997 | Roney et al. | 5,949,331 A | 9/1999 | Schofield et al. |
| 5,634,709 A | 6/1997 | Iwama | 5,956,079 A | 9/1999 | Ridgley |
| 5,642,238 A | 6/1997 | Sala | 5,956,181 A | 9/1999 | Lin |
| 5,644,851 A | 7/1997 | Blank et al. | 5,959,367 A | 9/1999 | O'Farrell et al. |
| 5,646,614 A | 7/1997 | Abersfelder et al. | 5,959,555 A | 9/1999 | Furuta |
| 5,649,756 A | 7/1997 | Adams et al. | 5,971,552 A | 10/1999 | O'Farrell et al. |
| 5,650,765 A | 7/1997 | Park | 5,975,715 A | 11/1999 | Bauder |
| 5,662,375 A | 9/1997 | Adams et al. | 6,000,823 A | 12/1999 | Desmond et al. |
| 5,668,663 A | 9/1997 | Varaprasad et al. ......... 359/603 | 6,001,486 A | 12/1999 | Varaprasad et al. |
| 5,669,698 A | 9/1997 | Veldman et al. | 6,002,511 A | 12/1999 | Varaprasad et al. |
| 5,669,699 A | 9/1997 | Pastrick et al. | 6,002,544 A | 12/1999 | Yatsu |
| 5,669,704 A | 9/1997 | Pastrick | 6,007,222 A | 12/1999 | Thau |
| 5,669,705 A | 9/1997 | Pastrick et al. | 6,009,359 A | 12/1999 | El-Hakim et al. |
| 5,670,935 A | 9/1997 | Schofield et al. | 6,016,035 A | 1/2000 | Eberspacher et al. |
| 5,671,996 A | 9/1997 | Bos et al. | 6,019,411 A | 2/2000 | Carter et al. |
| 5,673,994 A | 10/1997 | Fant, Jr. et al. | 6,019,475 A | 2/2000 | Lynam et al. |
| 5,680,123 A | 10/1997 | Lee | 6,023,229 A | 2/2000 | Bugno et al. |
| 5,680,245 A | 10/1997 | Lynam | 6,025,872 A | 2/2000 | Ozaki et al. |
| 5,699,044 A | 12/1997 | Van Lente et al. | 6,037,689 A | 3/2000 | Bingle et al. |
| 5,708,410 A | 1/1998 | Blank et al. | 6,042,253 A | 3/2000 | Fant, Jr. et al. |
| 5,708,857 A | 1/1998 | Ishibashi | 6,045,243 A | 4/2000 | Muth et al. |
| 5,715,093 A | 2/1998 | Schierbeek et al. | 6,046,766 A | 4/2000 | Sakata |
| 5,724,187 A | 3/1998 | Varaprasad et al. | 6,046,837 A | 4/2000 | Yamamoto |
| 5,724,316 A | 3/1998 | Brunts | 6,060,989 A | 5/2000 | Gehlot |
| 5,729,194 A | 3/1998 | Spears et al. | 6,061,002 A | 5/2000 | Weber et al. |
| 5,737,226 A | 4/1998 | Olson et al. | 6,065,840 A | 5/2000 | Caskey et al. |
| 5,741,966 A | 4/1998 | Handfield et al. | 6,067,111 A | 5/2000 | Hahn et al. |
| 5,745,050 A | 4/1998 | Nakagawa | 6,072,391 A | 6/2000 | Suzuki et al. |
| 5,751,211 A | 5/1998 | Shirai et al. | 6,074,777 A | 6/2000 | Reimers et al. |
| 5,751,489 A | 5/1998 | Caskey et al. | 6,078,355 A | 6/2000 | Zengel |
| 5,754,099 A | 5/1998 | Nishimura et al. | 6,078,865 A | 6/2000 | Koyanagi |
| 5,760,828 A | 6/1998 | Cortes | 6,082,881 A | 7/2000 | Hicks |
| 5,760,962 A | 6/1998 | Schofield et al. | 6,086,131 A | 7/2000 | Bingle et al. |
| 5,761,094 A | 6/1998 | Olson et al. | 6,086,229 A | 7/2000 | Pastrick |
| 5,764,139 A | 6/1998 | Nojima et al. | 6,087,012 A | 7/2000 | Varaprasad et al. |
| 5,765,940 A | 6/1998 | Levy et al. | 6,087,953 A | 7/2000 | DeLine et al. |
| 5,767,793 A | 6/1998 | Agravante et al. | 6,097,023 A | 8/2000 | Schofield et al. |
| 5,775,762 A | 7/1998 | Vitito | 6,099,131 A | 8/2000 | Fletcher et al. |
| 5,786,772 A | 7/1998 | Schofield et al. | 6,099,155 A | 8/2000 | Pastrick et al. |
| 5,790,973 A | 8/1998 | Blaker et al. | 6,102,559 A | 8/2000 | Nold et al. |
| 5,793,308 A | 8/1998 | Rosinski et al. | 6,104,552 A | 8/2000 | Thau et al. |
| 5,793,420 A | 8/1998 | Schmidt | 6,106,121 A | 8/2000 | Buckley et al. |
| 5,796,094 A | 8/1998 | Schofield et al. | 6,111,498 A | 8/2000 | Jobes et al. |
| 5,796,176 A | 8/1998 | Kramer et al. | 6,115,651 A | 9/2000 | Cruz |
| 5,798,575 A | 8/1998 | O'Farrell et al. | 6,116,743 A | 9/2000 | Hoek |
| 5,798,688 A | 8/1998 | Schofield | 6,122,597 A | 9/2000 | Saneyoshi et al. |
| 5,802,727 A | 9/1998 | Blank et al. | 6,124,647 A | 9/2000 | Marcus et al. |
| 5,803,579 A | 9/1998 | Turnbull et al. | 6,124,886 A | 9/2000 | DeLine et al. |

| | | | | | | |
|---|---|---|---|---|---|---|
| 6,128,576 | A | 10/2000 | Nishimoto et al. | 6,310,611 B1 | 10/2001 | Caldwell |
| 6,132,072 | A | 10/2000 | Turnbull et al. | 6,310,738 B1 | 10/2001 | Chu |
| 6,139,171 | A | 10/2000 | Waldmann | 6,313,454 B1 | 11/2001 | Bos et al. |
| 6,139,172 | A | 10/2000 | Bos et al. | 6,317,057 B1 | 11/2001 | Lee |
| 6,140,933 | A | 10/2000 | Bugno et al. | 6,317,248 B1 | 11/2001 | Agrawal et al. |
| 6,146,003 | A | 11/2000 | Thau | 6,318,870 B1 | 11/2001 | Spooner et al. |
| 6,149,287 | A | 11/2000 | Pastrick et al. | 6,320,176 B1 | 11/2001 | Schofield et al. |
| 6,150,014 | A | 11/2000 | Chu et al. | 6,320,282 B1 | 11/2001 | Caldwell |
| 6,151,065 | A | 11/2000 | Steed et al. | 6,320,612 B1 | 11/2001 | Young |
| 6,151,539 | A | 11/2000 | Bergholz et al. | 6,324,295 B1 | 11/2001 | Valery et al. |
| 6,152,590 | A | 11/2000 | Furst et al. | 6,326,613 B1 | 12/2001 | Heslin et al. |
| 6,154,149 | A | 11/2000 | Tychkowski et al. | 6,326,900 B2 | 12/2001 | DeLine et al. |
| 6,154,306 | A | 11/2000 | Varaprasad et al. | 6,329,925 B1 | 12/2001 | Skiver et al. |
| 6,157,294 | A | 12/2000 | Urai et al. | 6,330,511 B2 | 12/2001 | Ogura et al. |
| 6,158,655 | A | 12/2000 | DeVries, Jr. et al. | 6,331,066 B1 | 12/2001 | Desmond et al. |
| 6,166,625 | A | 12/2000 | Teowee et al. | 6,333,759 B1 | 12/2001 | Mazzilli |
| 6,166,628 | A | 12/2000 | Andreas | 6,335,680 B1 | 1/2002 | Matsuoka |
| 6,166,848 | A | 12/2000 | Cammenga et al. | 6,336,737 B1 | 1/2002 | Thau |
| 6,167,755 | B1 | 1/2001 | Damson et al. | 6,344,805 B1 | 2/2002 | Yasui et al. |
| 6,169,955 | B1 | 1/2001 | Fultz | 6,348,858 B2 | 2/2002 | Weis et al. |
| 6,172,600 | B1 | 1/2001 | Kakinami et al. | 6,353,392 B1 | 3/2002 | Schofield et al. |
| 6,172,601 | B1 | 1/2001 | Wada et al. | 6,356,206 B1 | 3/2002 | Takenaga et al. |
| 6,172,613 | B1 | 1/2001 | DeLine et al. | 6,357,883 B1 | 3/2002 | Strumolo et al. |
| 6,173,501 | B1 | 1/2001 | Blank et al. | 6,362,548 B1 | 3/2002 | Bingle et al. |
| 6,175,164 | B1 | 1/2001 | O'Farrell et al. | 6,363,326 B1 | 3/2002 | Scully |
| 6,175,300 | B1 | 1/2001 | Kendrick | 6,366,213 B2 | 4/2002 | DeLine et al. |
| 6,176,602 | B1 | 1/2001 | Pastrick et al. | 6,370,329 B1 | 4/2002 | Teuchert |
| 6,178,034 | B1 | 1/2001 | Allemand et al. | 6,371,636 B1 | 4/2002 | Wesson |
| 6,183,119 | B1 | 2/2001 | Desmond et al. | 6,386,742 B1 | 5/2002 | DeLine et al. |
| 6,184,781 | B1 | 2/2001 | Ramakesavan | 6,390,529 B1 | 5/2002 | Bingle et al. |
| 6,185,492 | B1 | 2/2001 | Kagawa et al. | 6,390,635 B2 | 5/2002 | Whitehead et al. |
| 6,191,704 | B1 | 2/2001 | Takenaga et al. | 6,396,397 B1 | 5/2002 | Bos et al. |
| 6,196,688 | B1 | 3/2001 | Caskey et al. | 6,408,247 B1 | 6/2002 | Ichikawa et al. |
| 6,198,409 | B1 | 3/2001 | Schofield et al. | 6,411,204 B1 | 6/2002 | Bloomfield et al. |
| 6,199,014 | B1 | 3/2001 | Walker et al. | 6,412,959 B1 | 7/2002 | Tseng |
| 6,200,010 | B1 | 3/2001 | Anders | 6,412,973 B1 | 7/2002 | Bos et al. |
| 6,201,642 | B1 | 3/2001 | Bos | 6,415,230 B1 | 7/2002 | Maruko et al. |
| 6,210,008 | B1 | 4/2001 | Hoekstra et al. | 6,416,208 B2 | 7/2002 | Pastrick et al. |
| 6,217,181 | B1 | 4/2001 | Lynam et al. | 6,418,376 B1 | 7/2002 | Olson |
| 6,218,934 | B1 | 4/2001 | Regan | 6,419,300 B1 | 7/2002 | Pavao et al. |
| 6,222,447 | B1 | 4/2001 | Schofield et al. | 6,420,975 B1 | 7/2002 | DeLine et al. |
| 6,222,460 | B1 | 4/2001 | DeLine et al. | 6,421,081 B1 | 7/2002 | Markus |
| 6,227,689 | B1 | 5/2001 | Miller | 6,424,272 B1 | 7/2002 | Gutta et al. |
| 6,243,003 | B1 | 6/2001 | DeLine et al. | 6,424,273 B1 | 7/2002 | Gutta et al. |
| 6,245,262 | B1 | 6/2001 | Varaprasad et al. | 6,424,892 B1 | 7/2002 | Matsuoka |
| 6,249,214 | B1 | 6/2001 | Kashiwazaki | 6,426,492 B1 | 7/2002 | Bos et al. |
| 6,250,148 | B1 | 6/2001 | Lynam | 6,427,349 B1 | 8/2002 | Blank et al. |
| 6,250,766 | B1 | 6/2001 | Strumolo et al. | 6,428,172 B1 | 8/2002 | Hutzel et al. |
| 6,250,783 | B1 | 6/2001 | Stidham et al. | 6,433,676 B2 | 8/2002 | DeLine et al. |
| 6,257,746 | B1 | 7/2001 | Todd et al. | 6,433,680 B1 | 8/2002 | Ho |
| 6,259,412 | B1 | 7/2001 | Duroux | 6,437,688 B1 | 8/2002 | Kobayashi |
| 6,259,475 | B1 | 7/2001 | Ramachandran et al. | 6,438,491 B1 | 8/2002 | Farmer |
| 6,265,968 | B1 | 7/2001 | Betzitza et al. | 6,439,755 B1 | 8/2002 | Fant et al. |
| 6,268,803 | B1 | 7/2001 | Gunderson et al. | 6,441,872 B1 | 8/2002 | Ho |
| 6,269,308 | B1 | 7/2001 | Kodaka et al. | 6,445,287 B1 | 9/2002 | Schofield et al. |
| 6,276,821 | B1 | 8/2001 | Pastrick et al. | 6,447,128 B1 | 9/2002 | Lang et al. |
| 6,276,822 | B1 | 8/2001 | Bedrosian et al. | 6,452,533 B1 | 9/2002 | Yamabuchi et al. |
| 6,278,377 | B1 | 8/2001 | DeLine et al. | 6,463,369 B2 | 10/2002 | Sadano et al. |
| 6,278,941 | B1 | 8/2001 | Yokoyama | 6,466,701 B1 | 10/2002 | Ejiri et al. |
| 6,280,068 | B1 | 8/2001 | Mertens et al. | 6,472,977 B1 | 10/2002 | Pöchmüller |
| 6,280,069 | B1 | 8/2001 | Pastrick et al. | 6,473,001 B1 | 10/2002 | Blum |
| 6,281,804 | B1 | 8/2001 | Haller et al. | 6,474,853 B2 | 11/2002 | Pastrick et al. |
| 6,286,965 | B1 | 9/2001 | Caskey et al. | 6,476,731 B1 | 11/2002 | Miki et al. |
| 6,286,984 | B1 | 9/2001 | Berg | 6,477,460 B2 | 11/2002 | Kepler |
| 6,289,332 | B2 | 9/2001 | Menig et al. | 6,477,464 B2 | 11/2002 | McCarthy et al. |
| 6,291,906 | B1 | 9/2001 | Marcus et al. | 6,483,429 B1 | 11/2002 | Yasui et al. |
| 6,294,989 | B1 | 9/2001 | Schofield et al. | 6,483,438 B2 | 11/2002 | DeLine et al. |
| 6,296,379 | B1 | 10/2001 | Pastrick | 6,487,500 B2 | 11/2002 | Lemelson et al. |
| 6,297,781 | B1 | 10/2001 | Turnbull et al. | 6,494,602 B2 | 12/2002 | Pastrick et al. |
| 6,299,333 | B1 | 10/2001 | Pastrick et al. | 6,498,620 B2 | 12/2002 | Schofield et al. |
| 6,300,879 | B1 | 10/2001 | Regan et al. | 6,501,387 B2 | 12/2002 | Skiver et al. |
| 6,304,173 | B2 | 10/2001 | Pala et al. | 6,513,252 B1 | 2/2003 | Schierbeek et al. |
| 6,305,807 | B1 | 10/2001 | Schierbeek | 6,515,581 B1 | 2/2003 | Ho |

| | | | | | | |
|---|---|---|---|---|---|---|
| 6,515,597 | B1 | 2/2003 | Wada et al. | 7,167,796 | B2 | 1/2007 | Taylor et al. |
| 6,520,667 | B1 | 2/2003 | Mousseau | 7,175,291 | B1 | 2/2007 | Li |
| 6,522,451 | B1 | 2/2003 | Lynam | 7,195,381 | B2 | 3/2007 | Lynam et al. |
| 6,522,969 | B2 | 2/2003 | Kannonji | 7,328,103 | B2 | 2/2008 | McCarthy et al. |
| 6,539,306 | B2 | 3/2003 | Turnbull | 7,344,284 | B2 | 3/2008 | Lynam et al. |
| 6,542,085 | B1 | 4/2003 | Yang | 7,370,983 | B2 | 5/2008 | DeWind et al. |
| 6,542,182 | B1 | 4/2003 | Chutorash | 2001/0019356 | A1 | 9/2001 | Takeda et al. |
| 6,545,598 | B1 | 4/2003 | de Villeroche | 2001/0022616 | A1 | 9/2001 | Rademacher et al. |
| 6,553,308 | B1 | 4/2003 | Uhlmann et al. | 2001/0026316 | A1 | 10/2001 | Senatore |
| 6,568,839 | B1 | 5/2003 | Pastrick et al. | 2001/0045981 | A1 | 11/2001 | Gioger et al. |
| 6,572,233 | B1 | 6/2003 | Northman et al. | 2002/0003571 | A1 | 1/2002 | Schofield et al. |
| 6,575,643 | B2 | 6/2003 | Takahashi | 2002/0049535 | A1 | 4/2002 | Rigo et al. |
| 6,580,373 | B1 | 6/2003 | Ohashi | 2002/0072026 | A1 | 6/2002 | Lynam et al. |
| 6,581,007 | B2 | 6/2003 | Hasegawa et al. | 2002/0093826 | A1 | 7/2002 | Bos et al. |
| 6,583,730 | B2 | 6/2003 | Lang et al. | 2002/0126497 | A1 | 9/2002 | Pastrick |
| 6,591,192 | B2 | 7/2003 | Okamura et al. | 2002/0154007 | A1 | 10/2002 | Yang |
| 6,594,583 | B2 | 7/2003 | Ogura et al. | 2002/0159270 | A1 | 10/2002 | Lynam et al. |
| 6,594,614 | B2 | 7/2003 | Studt et al. | 2002/0172053 | A1 | 11/2002 | Pastrick et al. |
| 6,611,202 | B2 | 8/2003 | Schofield et al. | 2002/0191409 | A1 | 12/2002 | DeLine et al. |
| 6,611,227 | B1 | 8/2003 | Nebiyeloul-Kifle | 2003/0002165 | A1 | 1/2003 | Mathias et al. |
| 6,611,759 | B2 | 8/2003 | Brosche | 2003/0007261 | A1 | 1/2003 | Hutzel et al. |
| 6,614,387 | B1 | 9/2003 | Deadman | 2003/0016125 | A1 | 1/2003 | Lang et al. |
| 6,616,764 | B2 | 9/2003 | Krämer et al. | 2003/0016287 | A1 | 1/2003 | Nakayama et al. |
| 6,618,672 | B2 | 9/2003 | Sasaki et al. | 2003/0016543 | A1 | 1/2003 | Pastrick et al. |
| 6,627,918 | B2 | 9/2003 | Getz et al. | 2003/0020603 | A1 | 1/2003 | DeLine et al. |
| 6,630,888 | B2 | 10/2003 | Lang et al. | 2003/0025596 | A1 | 2/2003 | Lang et al. |
| 6,636,258 | B2 | 10/2003 | Strumolo | 2003/0025597 | A1 | 2/2003 | Schofield |
| 6,642,840 | B2 | 11/2003 | Lang et al. | 2003/0030546 | A1 | 2/2003 | Tseng |
| 6,642,851 | B2 | 11/2003 | DeLine et al. | 2003/0030551 | A1 | 2/2003 | Ho |
| 6,648,477 | B2 | 11/2003 | Hutzel et al. | 2003/0030724 | A1 | 2/2003 | Okamoto |
| 6,665,592 | B2 | 12/2003 | Kodama | 2003/0035050 | A1 | 2/2003 | Mizusawa |
| 6,670,207 | B1 | 12/2003 | Roberts | 2003/0043269 | A1 | 3/2003 | Park |
| 6,670,910 | B2 | 12/2003 | Delcheccolo et al. | 2003/0052969 | A1 | 3/2003 | Satoh et al. |
| 6,672,744 | B2 | 1/2004 | DeLine et al. | 2003/0058338 | A1 | 3/2003 | Kawauchi et al. |
| 6,674,370 | B2 | 1/2004 | Rodewald et al. | 2003/0067383 | A1 | 4/2003 | Yang |
| 6,675,075 | B1 | 1/2004 | Engelsberg et al. | 2003/0069690 | A1 | 4/2003 | Correia et al. |
| 6,678,614 | B2 | 1/2004 | McCarthy et al. | 2003/0076415 | A1 | 4/2003 | Strumolo |
| 6,683,539 | B2 | 1/2004 | Trajkovic et al. | 2003/0080877 | A1 | 5/2003 | Takagi et al. |
| 6,683,969 | B1 | 1/2004 | Nishigaki et al. | 2003/0085806 | A1 | 5/2003 | Samman et al. |
| 6,685,348 | B2 | 2/2004 | Pastrick et al. | 2003/0088361 | A1 | 5/2003 | Sekiguchi |
| 6,690,268 | B2 | 2/2004 | Schofield et al. | 2003/0090568 | A1 | 5/2003 | Pico |
| 6,690,413 | B1 | 2/2004 | Moore | 2003/0090569 | A1 | 5/2003 | Poechmuller |
| 6,693,517 | B2 | 2/2004 | McCarthy et al. | 2003/0090570 | A1 | 5/2003 | Takagi et al. |
| 6,693,518 | B2 | 2/2004 | Kumata | 2003/0098908 | A1 | 5/2003 | Misaiji et al. |
| 6,693,519 | B2 | 2/2004 | Keirstead | 2003/0103141 | A1 | 6/2003 | Bechtel et al. |
| 6,693,524 | B1 | 2/2004 | Payne | 2003/0103142 | A1 | 6/2003 | Hitomi et al. |
| 6,709,136 | B2 | 3/2004 | Pastrick et al. | 2003/0117522 | A1 | 6/2003 | Okada |
| 6,717,610 | B1 | 4/2004 | Bos et al. | 2003/0122929 | A1 | 7/2003 | Minaudo et al. |
| 6,717,712 | B2 | 4/2004 | Lynam et al. | 2003/0122930 | A1 | 7/2003 | Schofield et al. |
| 6,726,337 | B2 | 4/2004 | Whitehead et al. | 2003/0133014 | A1 | 7/2003 | Mendoza |
| 6,727,808 | B1 | 4/2004 | Uselmann et al. | 2003/0137586 | A1 | 7/2003 | Lewellen |
| 6,727,844 | B1 | 4/2004 | Zimmermann et al. | 2003/0141965 | A1 | 7/2003 | Gunderson et al. |
| 6,731,332 | B1 | 5/2004 | Yasui et al. | 2003/0146831 | A1 | 8/2003 | Berberich et al. |
| 6,734,807 | B2 | 5/2004 | King | 2003/0169158 | A1 | 9/2003 | Paul, Jr. |
| 6,737,964 | B2 | 5/2004 | Samman et al. | 2003/0169522 | A1 | 9/2003 | Schofield et al. |
| 6,738,088 | B1 | 5/2004 | Uskolovsky et al. | 2003/0179293 | A1 | 9/2003 | Oizumi |
| 6,744,353 | B2 | 6/2004 | Sjönell | 2003/0202096 | A1 | 10/2003 | Kim |
| 6,748,211 | B1 | 6/2004 | Isaac et al. | 2003/0214576 | A1 | 11/2003 | Koga |
| 6,756,912 | B2 | 6/2004 | Skiver et al. | 2003/0214584 | A1 | 11/2003 | Ross, Jr. |
| 6,757,109 | B2 | 6/2004 | Bos | 2003/0214733 | A1 | 11/2003 | Fujikawa et al. |
| 6,778,904 | B2 | 8/2004 | Iwami et al. | 2003/0222793 | A1 | 12/2003 | Tanaka et al. |
| 6,810,323 | B1 | 10/2004 | Bullock et al. | 2003/0222983 | A1 | 12/2003 | Nobori et al. |
| 6,824,281 | B2 | 11/2004 | Schofield et al. | 2003/0227546 | A1 | 12/2003 | Hilborn et al. |
| 6,832,848 | B2 | 12/2004 | Pastrick | 2004/0004541 | A1 | 1/2004 | Hong |
| 6,836,725 | B2 | 12/2004 | Millington et al. | 2004/0027695 | A1 | 2/2004 | Lin |
| 6,847,487 | B2 | 1/2005 | Burgner | 2004/0032321 | A1 | 2/2004 | McMahon et al. |
| 6,848,817 | B2 | 2/2005 | Bos et al. | 2004/0032675 | A1 | 2/2004 | Weller et al. |
| 6,882,287 | B2 | 4/2005 | Schofield | 2004/0036768 | A1 | 2/2004 | Green |
| 6,902,284 | B2 | 6/2005 | Hutzel et al. | 2004/0046870 | A1 | 3/2004 | Leigh Travis |
| 6,912,396 | B2 | 6/2005 | Sziraki et al. | 2004/0051634 | A1 | 3/2004 | Schofield et al. |
| 6,946,978 | B2 | 9/2005 | Schofield | 2004/0056955 | A1 | 3/2004 | Berberich et al. |
| 7,004,592 | B2 | 2/2006 | Varaprasad et al. | 2004/0057131 | A1 | 3/2004 | Hutzel et al. |
| 7,046,448 | B2 | 5/2006 | Burgner | 2004/0064241 | A1 | 4/2004 | Sekiguchi |

| | | |
|---|---|---|
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0080431 A1 | 4/2004 | White |
| 2004/0085196 A1 | 5/2004 | Miller et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0128065 A1 | 7/2004 | Taylor et al. |
| 2004/0145457 A1 | 7/2004 | Schofield et al. |
| 2004/0202001 A1 | 10/2004 | Roberts et al. |
| 2004/0243303 A1 | 12/2004 | Padmanabhan |
| 2005/0078389 A1 | 4/2005 | Kulas et al. |
| 2005/0079326 A1 | 4/2005 | Varaprasad et al. |
| 2005/0083577 A1 | 4/2005 | Varaprasad et al. |
| 2006/0007550 A1 | 1/2006 | Tonar et al. |
| 2006/0028730 A1 | 2/2006 | Varaprasad et al. |
| 2006/0050018 A1 | 3/2006 | Hutzel et al. |
| 2006/0164230 A1 | 7/2006 | DeWind et al. |
| 2007/0118287 A1 | 5/2007 | Taylor et al. |
| 2007/0132567 A1 | 6/2007 | Schofield et al. |
| 2007/0162229 A1 | 7/2007 | McCarthy et al. |
| 2007/0171037 A1 | 7/2007 | Schofield et al. |
| 2007/0183066 A1 | 8/2007 | Varaprasad et al. |
| 2007/0184284 A1 | 8/2007 | Varaprasad et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0183355 A1 | 7/2008 | Taylor et al. |
| 2008/0186724 A1 | 8/2008 | Lynam et al. |
| 2008/0201075 A1 | 8/2008 | Taylor et al. |
| 2008/0212215 A1 | 9/2008 | Schofield et al. |

FOREIGN PATENT DOCUMENTS

| | | |
|---|---|---|
| DE | 3301945 | 7/1984 |
| DE | 3614882 | 11/1987 |
| DE | 29703084 | 6/1997 |
| DE | 29902344 | 7/1999 |
| FR | 2 759 045 | 8/1998 |
| GB | 1136134 | 12/1968 |
| GB | 2351055 | 12/2000 |
| JP | 5730639 | 2/1982 |
| JP | 57208530 | 12/1982 |
| JP | 5830729 | 2/1983 |
| JP | 59-114139 | 7/1984 |
| JP | 63106730 | 5/1988 |
| JP | 63106731 | 5/1988 |
| JP | 64-14700 | 1/1989 |
| JP | 4-114587 | 4/1992 |
| JP | 5-213113 | 8/1993 |
| JP | 11078693 | 3/1999 |
| WO | WO 0055685 | 9/2000 |

OTHER PUBLICATIONS

N.R. Lynam and A. Agrawal, "Automotive Applications of Chromogenic Materials", *Large-Area Chromogenics: Materials and Devices for Transmittance Control, SPIE Institute Series*, IS 4, 46-84, C.M. Lampert and C.G. Granquist, eds., SPIE Optical Engineering Press, Washington (1990).

Nagai et al., "Transmissive Electrochromic Device", *Opt. Mat'ls. Tech. For Energy Effic. And Solar Energy Conv. IV*, 562, 39-45, C.M. Lampert, ed., SPIE—The Int'l Soc. For Opt. Eng'g (1985).

W. Schrenk et al., "Coextruded Elastomeric Optical Interference Film", *ANTEC '88*, 1703-07 (1988).

T. Alfrey, Jr. et al., "Physical Optics of Iridescent Multilayered Plastic Films", *Polym. Eng'g & Sci.*, 9(6), 400-04 (1969).

I.F. Chang, "Electrochromic and Electrochemichromic Materials and Phenomena" in *Nonemissive Electrooptic Displays*, 155-96, A.R. Kmetz and F.K. von Willisen, eds., Plenum Press, New York (1976).

C.M. Lampert, "Electrochromic Materials and Devices for Energy Efficient Windows", *Solar Energy Mat'ls*, 11, 1-27 (1984).

N.R. Lynam, "Electrochromic Automotive Day/Night Mirrors", *SAE Technical Paper Series*, 870636, Society for Automotive Engineers (1987).

Dana H. Ballard and Christopher M. Brown, Computer Vision, article, 4 pages Prentice-Hall, Englewood Cliffs, New Jersey, believed to be published more than one year prior to the filing date of the present application.

G. Wang, D. Renshaw, P.B. Denyer and M. Lu, CMOS Video Cameras, article, 1991, 4 pages, University of Edinburgh, UK.

National Semiconductor, LM78S40, Universal Switching Regulator Subsystem, National Semiconductor Corporation, Apr. 1996, p. 6.

\* cited by examiner

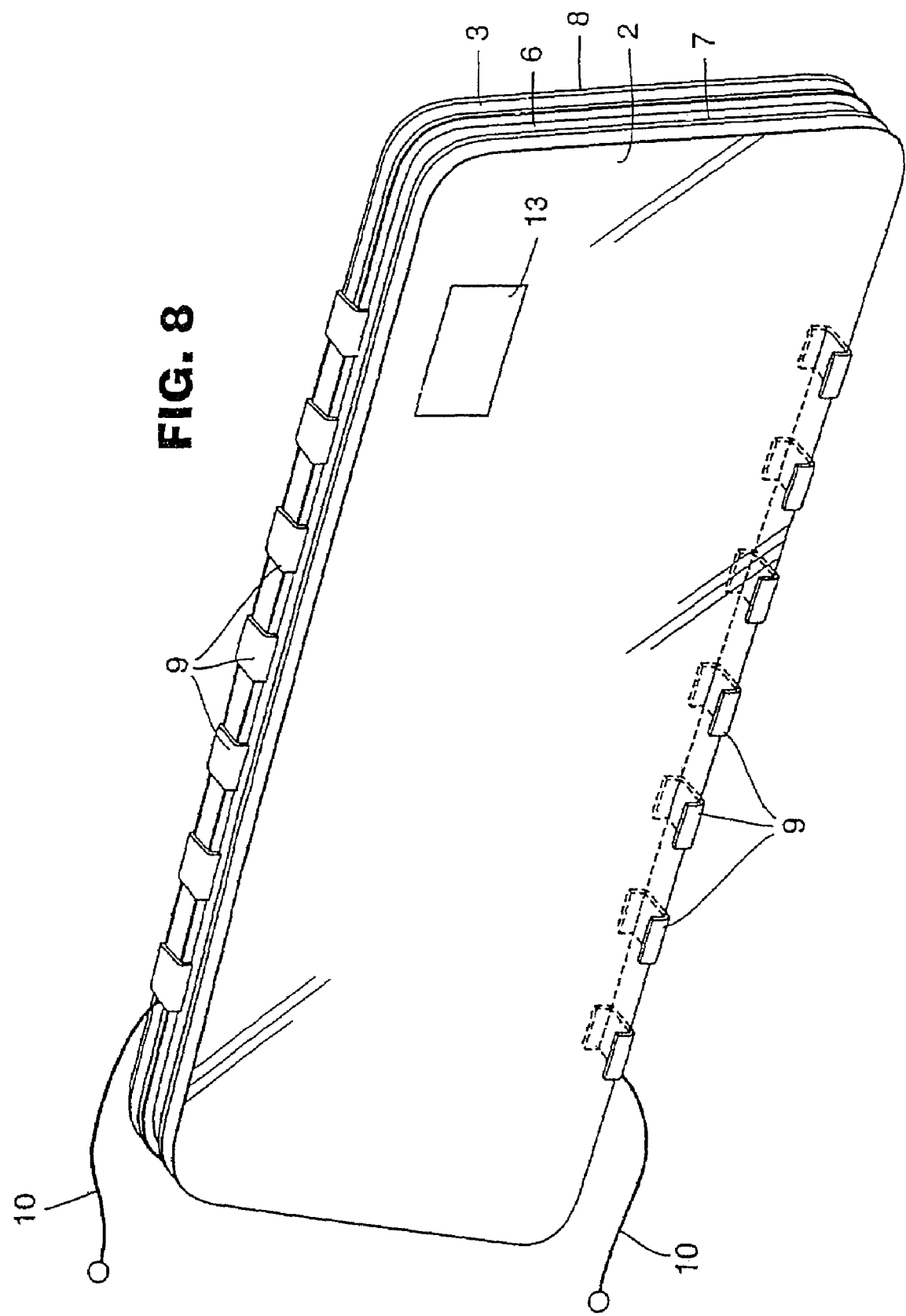

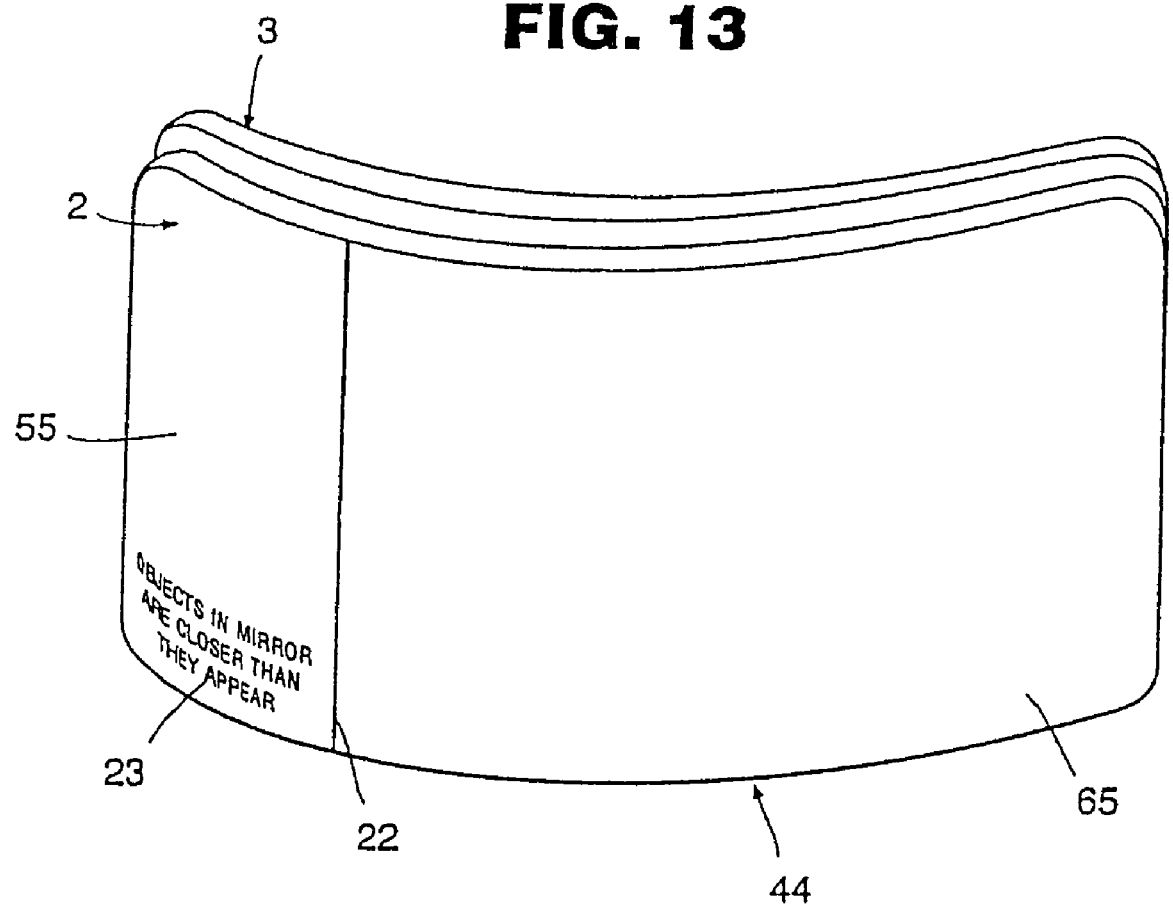

VEHICULAR SIGNAL MIRROR

RELATED UNITED STATES PATENT APPLICATION

This application is a continuation of U.S. application Ser. No. 11/655,096, filed Jan. 19, 2007, which is continuation of U.S. application Ser. No. 11/244,182, filed Oct. 6, 2005, which is a continuation of U.S. application Ser. No. 10/971,456, filed Oct. 22, 2004, now U.S. Pat. No. 7,004,592, which is a continuation of U.S. application Ser. No. 09/954,285, filed Sep. 18, 2001, now abandoned, which is a continuation of U.S. application Ser. No. 08/957,027, filed Oct. 24, 1997, now abandoned, which is a continuation of U.S. application Ser. No. 08/429,643, filed Apr. 27, 1995, now U.S. Pat. No. 5,724,187, which is a continuation-in-part of U.S. application Ser. No. 08/238,521, filed May 5, 1994, now U.S. Pat. No. 5,668,663.

BACKGROUND OF THE INVENTION

1. Technical Field of the Invention

The present invention relates to electrochromic devices for continuously varying the transmissivity to light suitable for use in, for example, electrochromic rearview mirrors, windows and sun roofs for motor vehicles, manufactured front electrochromic solid films and electrolytes containing redox reaction promoters and alkali ions and/or protons.

2. Brief Description of the Related Technology

Prior to the introduction of electro-optic mirrors into the automotive marketplace, prismatic rearview mirrors were available to drivers of motor vehicles to determine the whereabouts of neighboring motor vehicles to their rearward surroundings. By using a manual lever located on such mirrors, a driver of a motor vehicle, especially at dusk or later, would be able to employ a prismatic feature on the mirror to vitiate the effect of headlamp glare (the principal source of incoming electromagnetic radiation from the rear of the motor vehicle) from the low beam, and especially high beam, lighting elements of other motor vehicles travelling posterior thereto. Should the lever be flipped to the nighttime position, the driver would be able to view an image in a reflection from a glass-to-air interface on the first surface of the mirror. The light reflected from this first surface would exhibit non-spectral selectivity. That is, the background of any image viewed in the nighttime position of the prismatic mirror would be a neutral color. Such conventional prismatic mirrors are still used on a majority of motor vehicles in the United States today.

With the advent of electro-optic technology, such as electrochromic technology, it has become possible to achieve continuous variability in reflectivity in rearview mirrors for motor vehicles. This continuous variability has been achieved, for example, through the use of reversibly variable electrochromic devices, wherein the intensity of light (e.g., visible, infrared, ultraviolet or other distinct or overlapping electromagnetic radiation) is modulated by passing the light through an electrochromic medium. In such devices, the electrochromic medium is disposed between two conductive electrodes and undergoes electrochromism when potential differences are applied across the two electrodes.

Some examples of these prior art electrochromic devices are described in U.S. Pat. No. 3,280,701 (Donnelly); U.S. Pat. No. 3,451,741 (Manos); U.S. Pat. No. 3,806,229 (Schoot); U.S. Pat. No. 4,465,339 (Baucke); U.S. Pat. No. 4,712,879 (Lynam) ("Lynam I"); U.S. Pat. No. 4,902,108 (Byker) ("Byker I"); Japanese Patent Publication JP 57-30,639 (Negishi) ("Negishi I"); Japanese Patent Publication JP 57-208,530 (Negishi) ("Negishi II"); and I. F. Chang, "Electrochromic and Electrochemichromic Materials and Phenomena", in Nonemissive Electrooptic Displays, 155-96, A. R. Kmetz and F. K. on Willisen, eds., Plenum Press, New York (1976).

Numerous devices using an electrochromic medium wherein the electrochromism takes place entirely in a liquid solution are known in the art [see e.g., U.S. Pat. No. 5,128,199 (Byker) ("Byker II"); Donnelly, Manos, Schoot and Byker I; and commonly assigned U.S. Pat. No. 5,073,012 (Lynam) ("Lynam II"); U.S. Pat. No. 5,115,346 (Lynam) ("Lynam III"); U.S. Pat. No. 5,140,455 (Varaprasad) ("Varaprasad I"); U.S. Pat. No. 5,142,407 (Varaprasad) ("Varaprasad II"); U.S. Pat. No. 5,151,816 (Varaprasad) ("Varaprasad III"); U.S. Pat. No. 5,239,405 (Varaprasad) ("Varaprasad IV"); and commonly assigned co-pending U.S. patent application Ser. Nos. 07/935,784 (filed Aug. 27, 1992), now U.S. Pat. No. 5,500,760, and Ser. No. 08/061,742 (filed May 17, 1993), now U.S. Pat. No. 5,424,865] Typically, these electrochromic devices, sometimes referred to as electrochemichromic devices, are single-compartment, self-erasing, solution-phase electrochromic devices. See e.g., Manos, Negishi II, Byker I and Byker II.

In single-compartment, self-erasing, solution-phase electrochromic devices, the intensity of the electromagnetic radiation is modulated by passing through a solution of the color-forming species held in a single-compartment. The color-changing reaction occurs only in this solution-phase. That is, there is no solid material present in the devices that has the color-changing reaction in it. During operation of such devices, the solution of the color-forming species is liquid or fluid, although it may be gelled or made highly viscous with a thickening agent, and the components of the solution do not precipitate. See e.g., Byker I and Byker II.

Numerous devices using an electrochromic medium wherein the electrochromism occurs in a solid layer are also widely described in the art. Among such devices are those that employ electrochromic thin film technology [see e.g., N. R. Lynam, "Electrochromic Automotive Day/Night Mirrors", SAE Technical Paper Series, 870636. (1987); N. R. Lynam, "Smart Windows for Automobiles", SAE Technical Paper Series, 900419 (1990); N. R. Lynam and A. Agrawal, "Automotive Applications of Chromogenic Materials", Large Area Chromogenics: Materials & Devices for Transmittance Control, C. M. Lampert and C. G. Granquist, eds., Optical Eng'g Press, Washington (1990); C. M. Lampert, "Electrochromic Devices and Devices for Energy Efficient Windows", Solar Energy Materials, 11, 1-27 (1984); Japanese Patent Document JP 58-30,729 (Kamimori) ("Kamimori I"); U.S. Pat. No. 3,521,941 (Deb); U.S. Pat. No. 3,807,832 (Castellion); U.S. Pat. No. 4,174,152 (Giglia); U.S. Pat. No. Re. 30,835 (Giglia); U.S. Pat. No. 4,338,000 (Kamimori) ("Kamimori II"); U.S. Pat. No. 4,652,090 (Uchikawa); U.S. Pat. No. 4,671,619 (Kamimori) ("Kamimori III"); U.S. Pat. No. 4,702,566 (Tukude); Lynam I and commonly assigned U.S. Pat. No. 5,066,112 (Lynam) ("Lynam IV") and U.S. Pat. No. 5,076,674 (Lynam) ("Lynam V")].

In thin film electrochromic devices, an anodic electrochromic layer and/or a cathodic electrochromic layer, each layer usually made from inorganic metal oxides or polymer films, may be separate and distinct from one another. In contrast to the single-compartment, self-erasing, solution-phase devices referred to supra, these thin film electrochromic devices modulate the intensity of electromagnetic radiation by passing through the individual anodic electrochromic layer and/or cathodic electrochromic layer.

In certain thin film electrochromic devices, a thin film layer of a solid electrochromic material, such as a tungsten oxide-type solid film, may be placed in contact with a liquid electrolyte containing redox promoters, such as ferrocene and iodide, and a solvent. See e.g., Kamimori III. In these electrochromic devices, the intensity of electromagnetic radiation is primarily modulated by passing through the solid electrochromic material. When dimmed to a colored state, these tungsten oxide-type solid films typically dim to a blue-colored state.

Having grown accustomed to conventional prismatic rearview mirrors for motor vehicles, some consumers of motor vehicles may show a preference for rearview mirrors possessing substantial non-spectral selectivity. That is, some consumers may prefer mirrors which present a substantially gray color when dimmed to a colored state; in other words, a mirror that exhibits a viewing background comparable in spectral reflectivity to that of conventional prismatic mirrors.

On another note, the reflective element of the mirror is often constructed from silver and is typically situated on the rearmost surface of the mirror. That is, the reflective element is placed on the surface of a glass substrate farthest from that surface which first comes in contact with incident light. However, such placement has certain disadvantages. For instance, double imaging is a recognized problem in such mirror construction. In addition, in its path to reaching the reflective element of the mirror, incident light must first pass through each of the glass substrates of the mirror assembly. Therefore, in these mirror constructions, to achieve good optical performance, higher quality glass should be used for both substrates. Moreover, these mirror constructions typically require the use of a thin film transparent conductive electrode coating on the inward surface of each substrate in order to apply a potential to the electrochromic element. Requiring each substrate of the mirror to be of such higher quality glass and the use of two such transparent conductive electrodes increases material and production costs. Further, placement of the reflective element on the rearmost surface of the mirror requires an additional manufacturing step, which also increases production costs. And, such placement increases material and production costs due to necessary measures taken to protect the reflective element (typically, a highly reflective material, such as silver or aluminum) against environmental degradation, such as through the use of a paint or the like. Frequently, lead-based paints have been used for this purpose, thereby presenting environmental concerns.

It has been suggested and attempts have been made to place the reflective element of the mirror, such as silver, on the inward facing surface of the rear substrate so as to act as a conductive electrode coating as well as a reflective element. See e.g., Donnelly, Negishi I, Byker I and Byker II. This configuration is plainly attractive since it eliminates the need for a separate transparent conductive coating on the rear substrate, thereby reducing the cost of manufacture.

In order to function in the dual role of reflective element and conductive electrode, a coating must (1) be electrochemically stable so as not to degrade during operation of the device, (2) remain securely adhered to the rear substrate to maintain the integrity of the device, and (3) be highly reflective so that the mirror as a whole will have an acceptable level of reflectance. However, no known mirror construction meets all of these requirements—for example silver, commonly used as the reflective element in conventional mirror constructions, is highly reflective but is not electrochemically stable and is difficult to adhere to the surface of a glass substrate. Other materials, such as rhodium or Inconel, which have been used as a combined reflective element and conducting electrode in prior art mirrors are not sufficiently reflective to provide a highly reflective electrochromic mirror. Perhaps for these reasons, the prior art suggestions and attempts have not resulted in any commercially successful electrochromic mirror in which a single coating is used as both reflective element and conducting electrode.

Electrochromic devices, such as those using a solid film electrochromic material, like tungsten oxide, may also exhibit deleterious performance when exposed to ultraviolet radiation over prolonged periods of time (e.g., conditions typically encountered during outdoor weathering). This deleterious performance may be linked to any of a variety of sources, including a potential propensity for photochromism to occur.

On yet another note, displays, indicia and sensors, such as photosensors, motion sensors, cameras and the like, have heretofore been incorporated into certain electrochromic mirror constructions [see e.g., U.S. Pat. No. 5,189,537 (O'Farrell) and U.S. Pat. No. 5,285,060 (Larson)]. In these constructions, the reflective element of the mirror has been locally removed to create a highly transmissive local window. However, such use of displays and the like positioned behind the reflective element of electrochromic mirrors has been limited. One reason for this limited use is due to diminished rear vision capability in that portion of the reflective element of the mirror which has been removed. Moreover, the displays and the like known to date may be distracting as well as aesthetically non-appealing to the driver and/or passengers of motor vehicles insofar as they may be visible and observable within the mirror mounted in the motor vehicles when in the inactivated state. In addition, the known methods of incorporating such displays and the like into mirrors have been only partially successful, labor intensive and economically unattractive from a manufacturing standpoint.

Further, although it has been suggested to use semi-transparent reflectors in rearview mirrors [see e.g., U.S. Pat. No. 5,014,167 (Roberts) ("Roberts I") and U.S. Pat. No. 5,207,492 (Roberts) ("Roberts II")], previous attempts have included the use of dichroic reflectors which are complex to design and expensive to fabricate. Also, where use of metallic reflectors has been suggested [see e.g., U.S. Pat. No. 4,588,267 (Pastore)], it has been in the context of conventional mirrors such as prismatic mirrors. These suggestions fail to recognize the problems that must be overcome to provide a highly reflecting and partially transmitting electrochromic rearview mirror.

Therefore, the need exists for an electrochromic mirror that provides substantial non-spectral selectivity when dimmed to a colored state, akin to that exhibited by conventional prismatic mirrors when in the nighttime position, along with continuous variability in reflectivity, ease and economy of manufacture and enhanced outdoor weathering resilience. It would also be desirable, particularly in this connection, to have an electrochromic mirror construction that reduces material and manufacturing costs by employing as only one of its substrates a high quality glass as a substrate and also as only one of its electrodes a thin film, substantially transparent conductive electrode coating. In addition, it would be desirable for a mirror to have display-on-demand capability where a display could become activated to be viewed on demand, and where the display is (1) aesthetically appealing and not distracting in its inactivated state, and (2) is manufactured with ease and economy.

SUMMARY OF THE INVENTION

The present invention meets the needs expressed above concerning the desirability of a substantially non-spectral selective electrochromic mirror by providing such an electrochromic mirror that exhibits substantially non-spectral selectivity in the form of a substantially neutral or neutral gray appearance when dimmed to a color state by the introduction of an applied potential. The electrochromic element of this mirror comprises an electrochromic solid film and an electrolyte, which itself comprises redox reaction promoters and alkali ions and/or protons.

Another aspect of the present invention provides a commercially practicable electrochromic mirror having a novel construction. More specifically, this novel mirror construction provides a layer of reflective material coated on the inward surface of the second substrate which also serves as a conductive electrode coating. The layer of reflective material is overcoated with an electrochromic solid film and may also be undercoated to promote its adhesion to the substrate.

This construction employs a higher quality glass for only one of its substrates and employs for only that substrate made from a higher quality glass a conductive electrode coating that is substantially transparent. That is, the construction permits the use of (1) a lower quality glass as the second or rearmost substrate while maintaining good optical performance in the mirror; (2) a higher resistance, and hence more economical, conductive electrode coating for the first or frontmost substrate which is made from a higher quality glass; and (3) only one substantially transparent conductive electrode coating (to be used on the inward surface of the first substrate made from a higher quality glass), which further reduces material costs incurred in the manufacture of such mirrors.

In addition, the layer of reflective material in this novel construction reduces further still the material and production costs associated with such mirrors since it serves the additional role of a conductive electrode coating thereby obviating manufacturing costs associated with a separate substantially transparent conductive electrode coating. Moreover, in this construction, the reflective element of the mirror is located within, and protected by, the sealed cavity which forms the electrochromic element of the mirror. The reflective element of the mirror is thus protected from degradation through environmental exposure without having to resort to the use of protective materials, such as lead-based overcoating paints or the like. The novel construction of this electrochromic mirror also enhances the resistance of the reflective material to physical, chemical and/or electrochemical degradation.

Further, the construction so provided also reduces image separation which can lead to the recognized problem of double imaging.

In addition, another aspect of the invention provides an "on demand display" for mirrors, as described hereinafter. The mirror construction referred to supra and described in detail hereinafter, facilitates placement of displays, indicia and sensors and the like behind the mirror element so that they may be viewed as an "on demand display".

As stated supra, the electrochromic mirrors of the present invention exhibit a substantially gray appearance when dimmed to a colored state upon the introduction of an applied potential. The coloring capability of these mirrors determines the extent to which glare may be reflected from the mirrors. As with other electrochromic mirrors, this coloring capability may be continuously varied by controlling the magnitude, duration and polarity of the applied potential introduced thereto. The appearance of the substantially gray color may be appealing to consumer preferences (especially to certain drivers of motor vehicles which employ these mirrors) and to commercial design and manufacture concerns by virtue of its substantial color neutrality relative to the color of the housing, casing, structure, machine, instrument or vehicle with which it is to be used. That is, even when dimmed to a colored state, the electrochromic mirrors of the present invention are often aesthetically complementary to the color of the other component(s) with which they are to be used.

The electrochromic mirrors of the present invention are suitable for use as electrochromic rearview mirrors (e.g., truck mirrors, interior and exterior mirrors for motor vehicles), architectural mirrors or specialty mirrors, like those useful in aeronautical, periscopic or dental and medical applications.

In addition to electrochromic mirrors, electrochromic devices, such as electrochromic glazings (e.g., architectural glazings, like those useful in the home, office or other edifice; aeronautical glazings, such as those which may be useful in aircraft; or vehicular glazings, for instance, windows, like windshields, side windows and backlights, sun roofs, sun visors or shade bands); electrochromic optically attenuating contrast filters, such as contrast enhancement filters, suitable for use in connection with cathode ray tube monitors and the like; electrochromic privacy or security partitions; electrochromic solar panels, such as sky lights; electrochromic information displays; and electrochromic lenses and eye glass, may also benefit from that which is described herein, especially where substantially non-spectral selective coloring is desired.

Thus, the present invention exemplifies an advance in the art that will become readily apparent and more greatly appreciated by a study of the detailed description taken in conjunction with the figures which follow hereinafter.

BRIEF DESCRIPTION OF THE FIGURES

FIG. 8 depicts a perspective view of an electrochromic mirror constructed with an on demand display.

FIG. 11A depicts a perpendicular displacement of the first substrate and the second substrate.

FIG. 13 depicts a perspective view of a multi-radius electrochromic mirror according to the present invention.

In FIG. 17, solid curve X represents the percent transmission versus wavelength (nm) spectrum for a 600 nm medium-band interference filter having a bandwidth of about 40 nm. Curve A represents light transmission through the band pass filter and the electrochromic window cell with no potential applied. Curve B represents light transmission through the band pass filter and the electrochromic window cell at an applied potential of about 0.3 volts. Curve C represents light transmission through the band pass filter and the electrochromic window cell at an applied potential of about 0.5 volts. Curve D represents light transmission through the band pass filter and the electrochromic window cell at an applied potential of about 0.8 volts. Curve E represents light transmission through the band pass filter and the electrochromic window cell at an applied potential of about 1.1 volts. And curve F represents light transmission through the band pass filter and the electrochromic window cell at an applied potential of about 1.4 volts.

The depictions in these figures are for illustrative purposes only and are not drawn to scale. Unless otherwise indicated, in the following detailed description of the invention the element numbers discussed are descriptive of like elements of all figures.

DETAILED DESCRIPTION OF THE INVENTION

Figure 1:
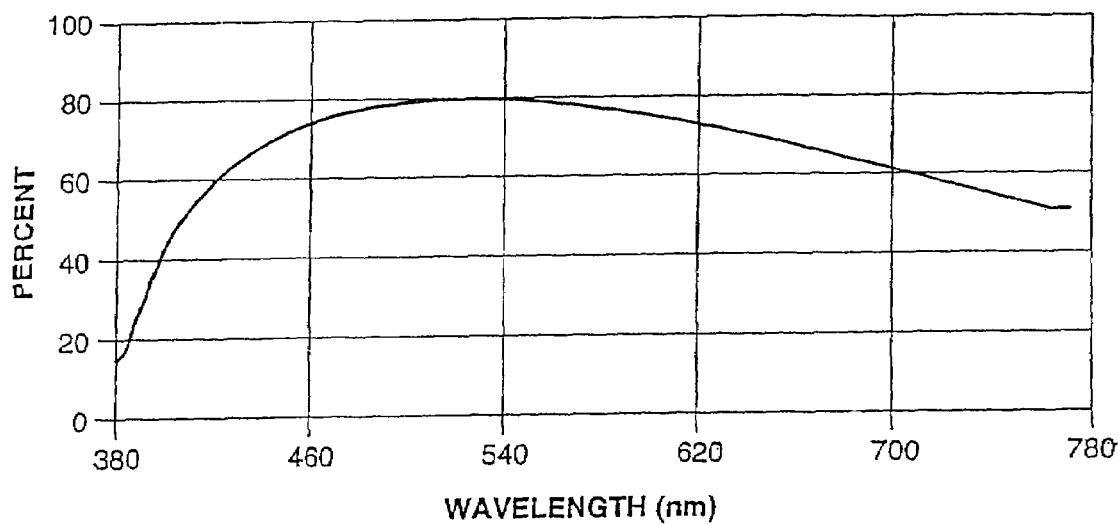
FIG. 1 depicts a spectral scan of percent reflectance versus wavelength in nanometers of an electrochromic mirror according to the present invention when in its bleached state.

In accordance with the teaching of the present invention, there are provided electrochromic mirrors, such as electrochromic rearview mirrors for a motor vehicle. These mirrors are constructed from a first substantially transparent substrate with a substantially transparent conductive electrode coating on its inward surface and a second substrate, which may or may not be substantially transparent, with a conductive electrode coating, which also may or may not be substantially transparent, on its inward surface. Whether the second substrate and the conductive electrode coating thereon are or are not substantially transparent will depend on the particular construction of the mirror.

The first substrate and second substrate may be positioned in spaced-apart relationship with one another, being substantially parallel or substantially tangentially parallel depending upon whether the substrates are flat or bent. These substrates may also be laterally displaced from, or in a substantially flush relationship with, one another. The substrates may also have respective dimensions such that one of the substrates is sized and shaped to have a slightly greater length and width than the other substrate. Thus, when the substrates are positioned in central alignment with one another, the peripheral edges of the slightly larger substrate extend beyond the peripheral edges of the slightly smaller substrate.

The mirrors have a layer of reflective material coated either onto (a) the rearmost (non-inward) surface of the second substrate, where it serves a single role as a reflective element of the mirror or (b) the inward surface of the second substrate, where it serves a dual role as a conductive electrode coating and a reflective element of the mirror.

In these mirrors, an electrochromic solid film is coated either onto (a) the transparent conductive electrode coating of the first substrate, (b) the layer of reflective material when acting as a conductive electrode coating on the inward surface of the second substrate or (c) the substantially transparent conductive electrode coating on the inward surface of the second substrate, when the layer of reflective material is placed on the rearmost (non-inward) surface of the second substrate.

A sealing means is positioned toward the peripheral edge of each of the first substrate and the second substrate to form a cavity, in which is located, either in a liquid-phase or a solid-phase, an electrolyte comprising redox reaction promoters and alkali ions and/or protons. In the cavity, the electrolyte is in contact with the electrochromic solid film (which itself is in contact with a conductive electrode coating on the inward surface of one of either the first substrate or second substrate) and a conductive electrode coating (on the inward surface of the other of the first substrate or second substrate) to form an electrochromic element.

Finally, a means for introducing an applied potential to the electrochromic element is also provided to controllably vary the amount of light reflected from the mirror.

Decreased light transmissivity in the electrochromic devices of the present invention (and reflectivity in the electrochromic mirrors) is primarily provided by the color-forming reaction that occurs in the electrochromic solid film. This electrochromic solid film may be a thin film layer of an inorganic transition metal oxide. Stoichiometric and substoichiometric forms of transition metal oxides, such as Group IV-B, V-B or VI-B oxides like tungsten oxide, molybdenum oxide, niobium oxide, vanadium oxide, titanium dioxide and combinations thereof, may be used. Other conventional inorganic transition metal oxides, such as those recited in Kamimori III, may also be employed. Preferably, however, tungsten oxide or doped tungsten oxide, with suitable dopants including molybdenum, rhenium, tin, rhodium, indium, bismuth, barium, titanium, tantalum, niobium, copper, cerium, lanthanum, zirconium, zinc, nickel, and the like, may be used as the electrochromic solid film. A beneficial effect of the addition of the dopant may be to move the spectral absorption edge of the doped tungsten oxide coating farther into the visible range of the electromagnetic spectrum.

Where doped tungsten oxide is used, the dopant should be present in a concentration within the range of from about 0.1% (by mole) to about 20% (by mole) or even greater. Preferred doped tungsten oxides include those where a molybdenum dopant is used within the range of about 0.5% (by mole) to about 10% (by mole).

The electrochromic solid film may be a stack of thin films, such as a layer of tungsten oxide overcoated and/or undercoated with a thin film like silicon dioxide, titanium dioxide, tantalum pentoxide or cerium oxide. Such overcoats and/or undercoats may help promote enhanced adhesion of the tungsten oxide electrochromic solid film to its substrate and/or passivate it from the electrolyte which it contacts in the electrochromic element.

When the electrochromic solid film comprises a stack of thin films, the layers of the multiple layer stack may individually comprise an electrochromic material. For example, a stacked electrochromic solid film can be formed by coating an electrochromic layer of molybdenum oxide onto a transparent conductor coated substrate (to a thickness of, for example, about 100 Å to about 3,000 Å), and by overcoating (and/or undercoating) the molybdenum oxide electrochromic layer with another electrochromic solid film layer, such as tungsten-oxide having a thickness, for example, in the range of about 100 Å to about 5,000 Å. Alternatively, multiple layers of tungsten oxide and layers of molybdenum oxide can be used to form a stacked electrochromic solid film.

When evaporating molybdenum oxide, it may be useful to melt-process the molybdenum oxide powder prior to evaporation. Since molybdenum oxide melts at about 795° C., molybdenum oxide powder (typically about 100 mesh) may be placed into a suitable high temperature resistant, inert evaporation crucible (such as an alumina crucible) and converted to a solid mass by heating to a temperature within the range of about 850° C. to about 900° C. for a period of time of about 60 minutes in a high temperature furnace, preferably in an inert atmosphere such as a nitrogen atmosphere. Since molybdenum oxide melts at a lower temperature (less than about 1,000° C.) compared to other electrochromic metal oxides such as tungsten oxide that melt at a temperature greater than about 1,000° C., molybdenum oxide (and equivalent lower melting metal oxides) may be used as a binder for evaporation of high melt temperature metal oxide powders.

The thickness of the electrochromic solid film may be within the range of from about 0.05 μm to about 1.0 μm or greater, with about 0.25 μm to about 0.75 μm being preferred, and about 0.3 μm to about 0.6 μm being more preferred.

The electrochromic solid film may have a microstructure that is amorphous, crystalline, polycrystalline or combinations thereof. In electrochromic devices where the occurrence of photochromism is a concern, it may be desirable for the electrochromic solid film to possess a microstructure that is at least partially crystalline. Such a crystalline microstructure is believed to minimize the photochromic effect, which may be deleterious to the operation of the electrochromic devices. It may also be desirable for the electrochromic solid film to possess a microstructure that is porous. In this connection, it may be desirable for the electrochromic solid film, such as tungsten oxide or doped tungsten oxide, to have a density of less than about 90%, preferably less than about 80%, of the density of the bulk oxide.

The electrolyte useful in the electrochromic element of the electrochromic mirrors of the present invention should comprise redox reaction promoters, and alkali ions and/or protons. The electrolyte may be in a liquid-phase or in a solid-phase.

The redox reaction promoters of the electrolyte comprise two individual species, a metallocene and a phenothiazine used in combination.

The metallocenes suitable for use as a redox reaction promoter in the present invention are represented by the following structure:

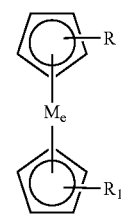

metallocenes and
their derivatives wherein R and $R_1$ may be the same or different, and each may be selected from the group consisting of H; any straight- or branched-chain alkyl constituent having from about 1 carbon atom to about 8 carbon atoms, such as $CH_3$, $CH_2CH_3$, $CH_2CH_2CH_3$, $CH_3(CH_3)_2$, $C(CH_3)_3$ and the like; acetyl; vinyl; allyl; hydroxyl; carboxyl; —$(CH_2)_n$—OH, wherein n may be an integer in the range of 1 to about 8; —$(CH_2)_n$—$COOR_2$, wherein n may be an integer in the range of 1 to about 8 and $R_2$ may be any straight- or branched-chain alkyl constituent having from about 1 carbon atom to about 8 carbon atoms, hydrogen, lithium, sodium,

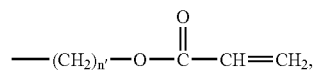

wherein n' may be an integer in the range of 2 to about 8, or

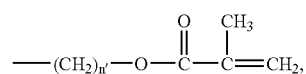

wherein n' may be an integer in the range of 2 to about 8; —$(CH_2)_n$—$OR_3$, wherein n may be an integer in the range of 1 to about 8 and $R_3$ may be any straight- or branched-chain alkyl constituent having from about 1 carbon atom to about 8 carbon atoms,

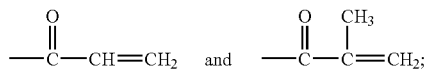

or —$(CH_2)_n$—$N^+(CH_3)_3 X^-$, wherein n may be an integer in the range of 1 to about 8 and X may be $Cl^-$, $Br^-$, $I^-$, $ClO_4^-$ or $BF_4^-$; and Me is Fe, Ni, Ru, Co, Ti, Cr and the like.

The phenothiazines suitable for use as a redox reaction promoter in the present invention include, but are not limited to, those represented by the following structure:

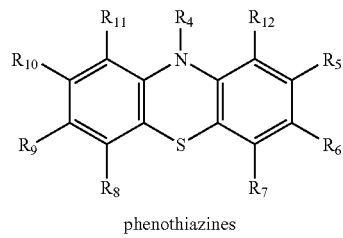

phenothiazines wherein $R_4$ may be selected from the group consisting of H; any straight- or branched-chain alkyl constituent having from about 1 carbon atom to about 10 carbon atoms; phenyl; benzyl; —$(CH_2)_2$—CN; —$(CH_2)_2$—COOH;

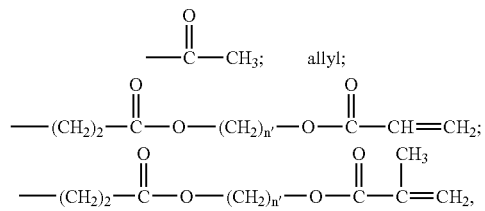

wherein n' may be an integer in the range of 2 to about 8;

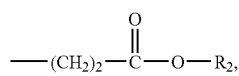

wherein $R_2$ may be any straight- or branched-chain alkyl constituent having from about 1 carbon atom to about 8 carbon atoms; and $R_5$, $R_6$, $R_7$, $R_8$, $R_9$, $R_{10}$, $R_{11}$, $R_{12}$ may be selected from H, Cl, Br, $CF_3$, $CH_3$, $NO_2$, COOH,

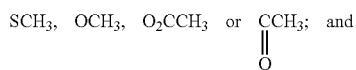

$R_4$ and $R_{12}$, when taken together, form a ring with six atoms (five of which being carbon) having a carbonyl substituent on one of the carbon atoms.

Preferred among phenothiazines II is phenothiazine III, as depicted in the following structure:

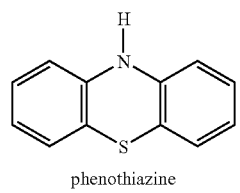

phenothiazine

Other desirable phenothiazines II include:

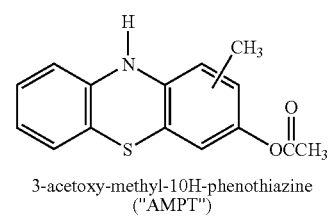

3-acetoxy-methyl-10H-phenothiazine ("AMPT")

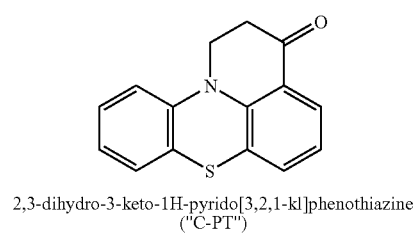

2,3-dihydro-3-keto-1H-pyrido[3,2,1-kl]phenothiazine ("C-PT")

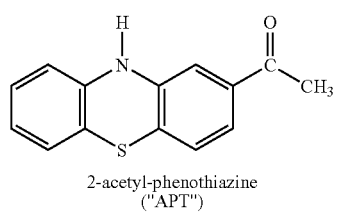

2-acetyl-phenothiazine ("APT")

An example of a desirable quinone for use as a redox promoter in the present invention is

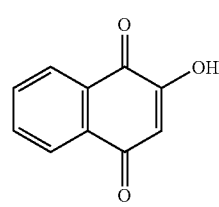

2-hydroxy-naphthoquinone

Combinations of redox reaction promoters may be selectively chosen to achieve a desired substantially non-spectral selectivity when the electrochromic element (and the mirror in which the electrochromic element is to function) is dimmed to a colored state.

The redox reaction promoters may be present in the electrolyte in a total concentration of about 0.005 M to about 0.5 M, with a total concentration of about 0.02 M to about 0.1 M being preferred. The ratio of this combination (i.e., total metallocene to total phenothiazine) should be within the range of about 1:1 to about 1:10, with a preferred combination of redox reaction promoters being ferrocene and phenothiazine (III) in about a 1:2 (by mole) to about a 1:4 (by mole) ratio and, more preferably, having a total concentration of about 0.07 M to about 0.09 M.

A source of alkali ions may also be included in the electrolyte. Suitable sources of alkali ions are lithium salts, such as lithium perchlorate ("$LiClO_4$"), lithium tetrafluoroborate ("$LiBF_4$"), lithium iodide ("LI"), lithium hexafluorophosphate ("$LiPF_4$"), lithium hexafluoroarsenate ("$LiAsF_6$"), lithium styrylsulfonate ("LiSS"), lithium triflate ("$LiCF_3SO_3$"); lithium methacrylate, lithium halides other than LI, such as lithium chloride ("LiCl"), lithium bromide ("LiBr") and the like, lithium trifluoroacetate ("$CF_3COOLi$") and combinations thereof. Of these, $LiClO_4$ or combinations of $LiClO_4$ and $LiBF_4$ are preferred. These sources of alkali ions may be present in the electrolyte in a concentration of about 0.01 M to about 1.0 M, with a concentration of about 0.05 M to about 0.1 M being preferred.

A source of protons may also be included in the electrolyte, by, for example, incorporating into the electrolyte water [for example, in a concentration of less than about 5% (v/v), preferably in a concentration within the range of about 0.5% (v/v) to about 2% (v/v)], or by incorporating into the electrolyte organic acids, inorganic acids or other protonic sources suitable for use in conjunction with organic solvents as are known in the art.

The electrolyte itself may be in a liquid-phase or a solid-phase, however, where the electrolyte is in a liquid-phase, a suitable solvent for use in the electrolyte may solubilize the redox reaction promoters and alkali ions (and other optional components such as ultraviolet stabilizing agents which absorb and/or screen ultraviolet radiation) while remaining substantially inert thereto (as well as to any other optional components in the electrolyte). Any material that remains in its liquid form over the range of temperatures to which the devices manufactured with the electrolytes of the present invention will likely be subjected is suitable for use as a solvent in a liquid-phase electrolyte [for a non-exhaustive recitation of such solvents, see e.g., Varaprasad I and Varaprasad III]. Practically speaking, the solvent may be an organic solvent, preferably a substantially non-aqueous organic solvent, which is stable to electrolysis and other phenomena likely to be encountered during the practice of this invention.

Suitable solvents may be selected from acetonitrile, 3-hydroxypropionitrile, methoxypropionitrile, 3-ethoxypropionitrile, 2-acetylbutyrolactone, propylene carbonate, ethylene carbonate, glycerine carbonate, tetramethylene sulfone, cyanoethyl sucrose, γ-butyrolactone, 2-methylglutaronitrile, N,N'-dimethylformamide, 3-methylsulfolane, glutaronitrile, 3,3'-oxydipropionitrile, methylethyl ketone, cyclopentanone, cyclohexanone, benzoyl acetone, 4-hydroxy-4-methyl-2-pentanone, acetophenone, 2-methoxyethyl ether, triethylene glycol dimethyl ether, 4-ethenyl-1,3-dioxalane-2-one, 1,2-butylene carbonate, glycidyl ether carbonates (such as those commercially available from Texaco Chemical Company, Austin, Tex.) and combinations thereof, preferred of which include propylene carbonate, 1,2-butylene carbonate, the combination of tetramethylene sulfone and propylene carbonate and the combination of 1,2-butylene carbonate and propylene carbonate.

Where the electrolyte of the present invention is desirably a solid-phase electrolyte, a formulation of starting components may be in situ transformed such as by polymerization reaction through, for instance, exposure to ultraviolet radiation or application of thermal energy, to produce a solid electrolyte. In the context of ultraviolet radiation activated polymerization, ultraviolet polymerizable components [such as those taught by and described in commonly assigned co-pending U.S. patent application Ser. No. 08/023,675, filed Feb. 26, 1993 (now abandoned) ("the '675 application") and Ser. No. 08/193,557, filed Feb. 8, 1994 (now abandoned)("the '557 application"), the disclosures of each of which are incorporated herein by reference] may be used to transform into a solid-phase electrolyte when exposed to ultraviolet radiation. In accordance with the disclosure of U.S. patent application Ser. No. 08/193,557, filed Feb. 8, 1994 (now abandoned) ("the '557 application"), polychromic solid films may be prepared by exposing an electrochromic monomer composition to electromagnetic radiation for a time sufficient to transform the electrochromic monomer composition into a polychromic solid film. This in situ curing process initiates polymerization of, and typically completely polymerizes, an electrochromic monomer composition, normally in a liquid state, by exposure to electromagnetic radiation to form a polychromic solid film, whose surface and cross-sections are substantially tack-free.

The electrochromic monomer compositions are comprised of anodic electrochromic compounds, cathodic electrochromic compounds, each of which are organic or organometallic compounds, a monomer component and a plasticizer. In addition, cross-linking agents, photoinitiators, photosensitizers, ultraviolet stabilizing agents, electrolytic materials, coloring agents, spacers, anti-oxidizing agents, flame retarding agents, heat stabilizing agents, compatibilizing agents, adhesion promoting agents, coupling agents, humectants and lubricating agents and combinations thereof may also be added. In the preferred electrochromic monomer compositions, the chosen monomer component may be a polyfunctional monomer, such as a difunctional monomer, trifunctional monomer, or a higher functional monomer, or a combination of monofunctional monomer and difunctional monomer or monofunctional monomer and cross-linking agent. Those of ordinary skill in the art may choose a particular monomer component or combination of monomer components from those recited in view of the intended application so as to impart the desired beneficial properties and characteristics to the polychromic solid film. To prepare a polychromic solid film, a monomer should be chosen as a monomer component that is capable of in situ curing through exposure to electromagnetic radiation, and that is compatible with the other components of the electrochromic monomer composition at the various stages of the in situ curing process. The combination of a plasticizer with a monomer component (with or without the addition of a difunctional monomer or a cross-linking agent) should preferably be in an equivalent ratio of between 75:25 to 10:90 to prepare polychromic solid films with superior properties and characteristics. Of course, the art-skilled should bear in mind that the intended application of a polychromic solid[1] film will often dictate its particular properties and characteristics, and that the choice and equivalent ratio of the components within the electrochromic monomer composition may need to be varied to attain a polychromic solid film with the desired properties and characteristics.

Among the monomer components that may be advantageously employed in U.S. patent application Ser. No. 08/193,557, filed Feb. 8, 1994 (now abandoned) ("the '557 application") are monomers having at least one reactive functionality rendering the compound capable of polymerization or further polymerization by an addition mechanism, such as vinyl polymerization or ring opening polymerization. Included among such monomers are oligomers and polymers that are capable of further polymerization. For monomers suitable for use herein, see generally those commercially available from Monomer-Polymer Labs., Inc., Philadelphia, Pa.; Sartomer Co., Exton, Pa.; and Polysciences, Inc., Warrington, Pa.

Monomers capable of vinyl polymerization, suitable for use herein, have as a commonality the ethylene functionality, as represented below: wherein $R_6$, $R_7$ and $R_8$ may be the same or different, and are each selected from a member of the group consisting of hydrogen; halogen; alkyl, cycloalkyl, poly-cycloalkyl, heterocycloalkyl and alkyl and alkenyl derivatives thereof; alkenyl, cycloalkenyl, cycloalkadienyl, poly-cycloalkadienyl and alkyl and alkenyl derivatives thereof; hydroxyalkyl; hydroxyalkenyl; alkoxyalkyl; alkoxyalkenyl; cyano; amido; phenyl; benzyl and carboxylate, and derivatives thereof.

Preferred among these vinyl monomers are the ethylene carboxylate derivatives known as acrylates—i.e., wherein at least one of $R_6$, $R_7$ and $R_8$ are carboxylate groups or derivatives thereof. Suitable carboxylate derivatives include, but are not limited to alkyl, cycloalkyl, poly-cycloalkyl, heterocycloalkyl and alkyl and alkenyl derivatives thereof; alkenyl, cycloalkenyl, poly-cycloalkenyl and alkyl and alkenyl derivatives thereof; mono- and poly-hydroxyalkyl; mono- and poly-hydroxyalkenyl; alkoxyalkyl; alkoxyalkenyl and cyano.

Among the acrylates that may be advantageously employed herein are mono- and poly-acrylates (bearing in mind that poly-acrylates function as cross-linking agents as well, see infra), such as 2-hydroxyethyl acrylate, 2-hydroxyethyl methacrylate, methylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate, dipropylene glycol monomethacrylate, 2,3-dihydroxypropyl methacrylate, methyl acrylate, ethyl acrylate, n-propyl acrylate, i-propyl acrylate, n-butyl acrylate, s-butyl acrylate, n-pentyl acrylate, 2-ethylhexyl acrylate, methyl methacrylate, ethyl methacrylate, n-propyl methacrylate, i-propyl methacrylate, n-butyl methacrylate, s-butyl methacrylate, n-pentyl methacrylate, s-pentyl methacrylate, methoxyethyl acrylate, methoxyethyl methacrylate, triethylene glycol monoacrylate, glycerol monoacrylate, glycerol monomethacrylate, allyl methacrylate, benzyl acrylate, caprolactone acrylate, cyclohexyl acrylate, cyclohexyl methacrylate, 2-ethoxyethyl acrylate, 2-ethoxyethyl methacrylate, 2-(2-ethoxyethoxy)ethylacrylate, glycidyl methacrylate, n-hexyl acrylate, n-hexyl methacrylate, isobornyl acrylate, isobornyl methacrylate, i-decyl acrylate, i-decyl methacrylate, i-octyl acrylate, lauryl acrylate, lauryl methacrylate, 2-methoxyethyl acrylate, n-octyl acrylate, 2-phenoxyethyl acrylate, 2-phenoxyethyl methacrylate, stearyl acrylate, stearyl methacrylate, tetrahydrofurfuryl acrylate, tetrahydrofurfuryl methacrylate, tridecyl methacrylate, 1,4-butanediol diacrylate, 1,4-butanediol dimethacrylate, 1,3-butylene glycol diacrylate, 1,3-butylene glycol dimethacrylate, diethylene glycol diacrylate, diethylene glycol dimethacrylate, ethylene glycol diacrylate, ethoxylated bisphenol A dimethacrylate, ethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol diacrylate, tetraethylene glycol dimethacrylate, triethylene glycol diacrylate, triethylene glycol dimethacrylate, tripropylene glycol diacrylate, dipentaerythritol pentaacrylate, ethoxylated pentaerythritol triacrylate, pentaerythritol tetraacrylate, pentaerythritol triacrylate, trimethylolpropane triacrylate, trimethylolpropane trimethacrylate, tris(2-hydroxyethyl)-isocyanurate triacrylate, tris(2-hydroxyethyl)-isocyanurate trimethacrylate, polyethylene glycol monoacrylate, polyethylene glycol monomethacrylate, polypropylene glycol monoacrylate, polypropylene glycol monomethacrylate, hydroxyethyl cellulose acrylate, hydroxyethyl cellulose methacrylate, methoxy poly(ethyleneoxy)ethylacrylate, methoxy poly(ethyleneoxy)ethylmethacrylate and combinations thereof. For a further recitation of suitable acrylates for use herein, see those acrylates available commercially from Monomer-Polymer Labs, Inc.; Polysciences, Inc. and Sartomer Co. Also, those of ordinary skill in the art will appreciate that derivatized acrylates in general should provide beneficial properties and characteristics to the resulting polychromic solid film.

Other monomers suitable for use herein include styrenes, unsaturated polyesters, vinyl ethers, acrylamides, methyl acrylamides and the like.

Monomers capable of ring opening polymerization suitable for use herein include epoxides, lactones, lactams, dioxepanes, spiro orthocarbonates, unsaturated spiro orthoesters and the like.

Preferred among these ring opening polymerizable monomers are epoxides and lactones. Of the epoxides suitable for use herein, preferred are cyclohexene oxide, cyclopentene oxide, glycidyl i-propyl ether, glycidyl acrylate, furfuryl glycidyl ether, styrene oxide, ethyl-3-phenyl glycidate, 1,4-butanediol glycidyl ether, 2,3-epoxypropyl-4-(2,3-epoxypropoxy)benzoate, 4,4'-bis-(2,3-epoxypropoxy)biphenyl and the like.

Also, particularly preferred are the cycloalkyl epoxides sold under the "CYRACURE" tradename by Union Carbide Chemicals and Plastics Co., Inc., Danbury, Conn., such as the "CYRACURE" resins UVR-6100 (mixed cycloalkyl epoxides), UVR-6105 (3,4-epoxycyclohexylmethyl-3,4-epoxycyclohexane carboxylate), UVR-6110 (3,4-epoxycyclohexylmethyl-3,4-epoxycyclohexane carboxylate) and UVR-6128 [bis-(3,4-epoxycyclohexyl)adipate], and the "CYRACURE" diluents UVR-6200 (mixed cycloalkyl epoxides) and UVR-6216 (1,2-epoxyhexadecane); those epoxides commercially available from Dow Chemical Co., Midland, Mich., such as D. E. R. 736 epoxy resin (epichlorohydrin-polyglycol reaction product), D.E.R. 755 epoxy resin (diglycidyl ether of bisphenol A-diglycidyl ether of polyglycol) and D.E.R. 732 epoxy resin (epichlorohydrin-polyglycol reaction product), and the NOVOLAC epoxy resins such as D.E.N. 431, D.E.N. 438 and D.E.N. 439 (phenolic epoxides), and those epoxides commercially available from Shell Chemical Co., Oak Brook, Ill., like the "EPON" resins 825 and 1001F (epichlorohydrin-bisphenol A type epoxy resins).

Other commercially available epoxide monomers that are particularly well-suited for use herein include those commercially available under the "ENVIBAR" tradename from Union Carbide Chemicals and Plastics Co., Inc., Danbury, Conn., such as "ENVIBAR" UV 1244 (cycloalkyl epoxides).

In addition, derivatized urethanes, such as acrylated (e.g., mono- or poly-acrylated) urethanes; derivatized heterocycles, such as acrylated (e.g., mono- or polyacrylated) heterocycles, like acrylated epoxides, acrylated lactones, acrylated lactams; and combinations thereof, capable of undergoing addition polymerizations, such as vinyl polymerizations and ring opening polymerizations, are also well-suited for use herein.

Many commercially available ultraviolet curable formulations are well-suited for use herein as a monomer component in the electrochromic monomer composition. Among those commercially available ultraviolet curable formulations are acrylated urethanes, such as the acrylated alkyl urethane formulations commercially available from Sartomer Co., including Low Viscosity Urethane Acrylate (Flexible) (CN 965), Low Viscosity Urethane Acrylate (Resilient) (CN 964), Urethane Acrylate (CN 980), Urethane Acrylate/TPGDA (CN 966 A80), Urethane Acrylate/IBOA (CN 966 J75), Urethane Acrylate/EOEOEA (CN 966H90), Urethane Acrylate/TPGDA (CN 965 A80), Urethane Acrylate/EOTMPTA (CN 964 E75), Urethane Acrylate/EOEOEA (CN 966H90), Urethane Acrylate/TPGDA (CN 963 A80), Urethane Acrylate/EOTMPTA (CN 963 E75), Urethane Acrylate (Flexible) (CN 962), Urethane Acrylate/EOTMPTA (CN 961 E75), Urethane Acrylate/EOEOEA (CN 961H90), Urethane Acrylate (Hard) (CN 955), Urethane Acrylate (Hard) (CN 960) and Urethane Acrylate (Soft) (CN 953), and acrylated aromatic urethane formulations, such as those sold by Sartomer Co., may also be used herein, including Hydrophobic Urethane Methacrylate (CN 974), Urethane Acrylate/TPGDA (CN 973 A80), Urethane Acrylate/IBOA (CN 973 J75), Urethane Acrylate/EOEOEA (CN 973H90), Urethane Acrylate (Flexible) (CN 972), Urethrane Acrylate (Resilient) (CN 971), Urethane Acrylate/TPGDA (CN 971 A80), Urethane Acrylate/TPGDA (CN 970 A60), Urethane Acrylate/EOTMPTA (CN 970 E60) and Urethane Acrylate/EOEOEA (CN 974H75). Other acrylated urethane formulations suitable for use herein may be obtained commercially from Monomer-Polymer Labs, Inc. and Polysciences, Inc.

Other ultraviolet curable formulations that may be used herein are the ultraviolet curable acrylated epoxide formulations commercially available from Sartomer Co., such as Epoxidized Soy Bean Oil Acrylate (CN 111), Epoxy Acrylate (CN 120), Epoxy Acrylate/TPGDA (CN 120 A75), Epoxy Acrylate/HDDA (CN 120 B80), Epoxy Acrylate/TMPTA (CN 120 C80), Epoxy Acrylate/GPTA (CN 120 D80), Epoxy Acrylate/Styrene (CN 120 S85), Epoxy Acrylate (CN 104), Epoxy Acrylate/GPTA (CN 104 D80), Epoxy Acrylate/HDDA (CN 104 B80), Epoxy Acrylate/TPGDA (CN 104 A80), Epoxy Acrylate/TMPTA (CN 104 C75), Epoxy Novolac Acrylate/TMPTA (CN 112 C60), Low Viscosity Epoxy Acrylate (CN 114), Low Viscosity Epoxy Acrylate/EOTMPTA (CN 114 E80), Low Viscosity Epoxy Acrylate/GPTA (CN 114 D75) and Low Viscosity Epoxy Acrylate/TPGDA (CN 114 A80).

In addition, "SARBOX" acrylate resins, commercially available from Sartomer Co., like Carboxylated Acid Terminated (SB 400), Carboxylated Acid Terminated (SB 401), Carboxylated Acid Terminated (SB 500), Carboxylated Acid Terminated (SB 500E50), Carboxylated Acid Terminated (SB 500K60), Carboxylated Acid Terminated (SB 501), Carboxylated Acid Terminated (SB 510E35), Carboxylated Acid Terminated (SB 520E35) and Carboxylated Acid Terminated (SB 600) may also be advantageously employed herein.

Also well-suited for use herein are ultraviolet curable formulations like the ultraviolet curable conformational coating formulations commercially available under the "QUICK CURE" trademark from the Specialty Coating Systems subsidiary of Union Carbide Chemicals & Plastics Technology Corp., Indianapolis, Ind., and sold under the product designations B-565, B-566, B-576 and BT-5376; ultraviolet curing adhesive formulations commercially available from Loctite Corp., Newington, Conn. under the product names UV OPTICALLY CLEAR ADH, MULTI PURPOSE UV ADHESIVE, "IMPRUV" LV PLOTTING COMPOUND and "LOCQUIC" ACTIVATOR 707; ultraviolet curable urethane formulations commercially available from Norland Products, Inc., New Brunswick, N.J., and sold under the product designations "NORLAND NOA 61", "NORLAND NOA 65" and "NORLAND NOA 68"; and ultraviolet curable acrylic formulations commercially available from Dymax Corp., Torrington, Conn., including "DYMAX LIGHT-WELD 478".

By employing polyfunctional monomers, like difunctional monomers, or cross-linking agents, cross-linked polychromic solid films may be advantageously prepared. Such cross-linking tends to improve the physical properties and characteristics (e.g., mechanic al strength) of the resulting polychromic solid films. Cross-linking during cure to transform the electrochromic monomer composition into a polychromic solid film may be achieved by means of free radical ionic initiation by the exposure to electromagnetic radiation. This may be accomplished by combining together all the components of the particular electrochromic monomer composition and thereafter effecting cure. Alternatively, cross-links may be achieved by exposing to electromagnetic radiation the electrochromic monomer composition for a time sufficient to effect a partial cure, whereupon further electromagnetic radiation and/or a thermal influence may be employed to effect a more complete in situ cure and transformation into the polychromic solid film.

Suitable polyfunctional monomers for use in preparing polychromic films should have at least two reactive functionalities, and may be selected from, among others, ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol diacrylate, dipropylene glycol diacrylate, divinyl benzene, divinyl toluene, diallyl tartrate, allyl maleate, divinyl tartrate, triallyl melamine, glycerine trimethacrylate, diallyl maleate, divinyl ether, diallyl monomethylene glycol citrate, ethylene glycol vinyl allyl citrate, allyl vinyl maleate, diallyl itaconate, ethylene glycol diester of itaconic acid, polyester of maleic anhydride with triethylene glycol, polyallyl glucoses (e.g., triallyl glucose), polyallyl sucroses (e.g., pentaallyl sucrose diacrylate), glucose dimethacrylate, pentaerythritol tetraacrylate, sorbitol dimethacrylate, diallyl aconitate, divinyl citrasonate, diallyl fumarate, allyl methacrylate and polyethylene glycol diacrylate.

Ultraviolet radiation absorbing monomers may also be advantageously employed herein. Preferred among such monomers are 1,3-bis-(4-benzoyl-3-hydroxyphenoxy)-2-propylacrylate, 2-hydroxy-4-acryloxyethoxybenzophenone, 2-hydroxy-4-octoxybenzophenone and 4-methacryloxy-2-hydroxybenzophenone, as they perform the dual function of acting as a monomer component, or a portion thereof, and as an ultraviolet stabilizing agent.

The density of the cross-link within the resulting polychromic solid film tends to increase with the amount and/or the degree of functionality of polyfunctional monomer present in the electrochromic monomer composition. Cross-linking density within a polychromic solid film may be achieved or further increased by adding to the electrochromic monomer composition cross-linking agents, which themselves are incapable of undergoing further polymerization. In addition to increasing the degree of cross-linking within the resulting polychromic solid film, the use of such cross-linking agents in the electrochromic monomer composition may enhance the prolonged coloration performance of the resulting polychromic solid film. Included among such cross-linking agents are polyfunctional hydroxy compounds, such as glycols and glycerol, polyfunctional primary or secondary amino compounds and polyfunctional mercapto compounds. Among the preferred cross-linking agents are pentaerythritol, 2-ethyl-2-(hydroxymethyl)-1,3-propanediol, the poly(caprolactone)

diols having molecular weights of 1,250, 2,000 and 3,000, and polycarbonate diol available from Polysciences, Inc. and the polyfunctional hydroxy compounds commercially available under the "TONE" tradename from Union Carbide Chemicals and Plastics Co. Inc., Danbury, Conn., such as ÿ-caprolactone triols (known as "TONE" 0301, "TONE" 0305 and "TONE" 0310). Among the preferred glycols are the poly (ethylene glycols), like those sold under the "CARBOWAX" tradename by the Industrial Chemical division of Union Carbide Corp., Danbury, Conn. such as "CARBOWAX" PEG 200, PEG 300, PEG 400, PEG 540 Blend, PEG 600, PEG 900, PEG 1000, PEG 1450, PEG 3350, PEG 4600, and PEG 8000, with "CARBOWAX" PEG 1450 being the most preferred among this group, and those available from Polysciences, Inc.

Polychromic solid films that perform well under prolonged coloration may be prepared from electrochromic monomer compositions that contain as a monomer component at least some portion of a polyfunctional monomer—e.g., a difunctional monomer.

By preferably using polyfunctional monomers having their functional groups spaced apart to such an extent so as to enhance the flexibility of the resulting polychromic solid film, polychromic solid films may be prepared with a minimum of shrinkage during the transformation process and that also perform well under prolonged coloration.

While it is preferable to have electrochromic monomer compositions which contain a monomer component having polyfunctionality in preparing polychromic solid films that perform well under prolonged coloration, electrochromic monomer compositions that exhibit enhanced resistance to shrinkage when transformed into polychromic solid films preferably contain certain monofunctional monomers. In this regard, depending on the specific application, some physical properties and characteristics of polychromic solid films may be deemed of greater import than others. Thus, superior performance in terms of resistance to shrinkage during in situ curing of the electrochromic monomer composition to the polychromic solid film may be balanced with the prolonged coloration performance of the resulting polychromic solid film to achieve the properties and characteristics desirable of that polychromic solid film.

Those of ordinary skill in the art may make appropriate choices among the herein described monomers—monofanctional and polyfunctional, such as difunctional—and cross-linking agents to prepare a polychromic solid film having beneficial properties and characteristics for the specific application by choosing such combinations of a monofunctional monomer to a polyfunctional monomer or a monofanctional monomer to a cross-linking agent in an equivalent ratio of about 1:1 or greater.

In the preferred electrochromic monomer compositions, photoinitiators or photosensitizers may also be added to assist the initiation of the in situ curing process. Such photoinitiators or photosensitizers enhance the rapidity of the curing process when the electrochromic monomer compositions are exposed to electromagnetic radiation. These materials include, but are not limited to, radical initiation type and cationic initiation type polymerization initiators such as benzoin derivatives, like the n-butyl, i-butyl and ethyl benzoin alkyl ethers, and those commercially available products sold under the "ESACURE" tradename by Sartomer Co., such as "ESACURE" TZT (trimethyl benzophenone blend), KB1 (benzildimethyl ketal), KB60 (60% solution of benzildimethyl ketal), EB3 (mixture of benzoin n-butyl ethers), KIP 100F (ÿ-hydroxy ketone), KT37 (TZT and ÿ-hydroxy ketone blend), ITX (i-propylthioxanthone), X15 (ITX and TZT blend), and EDB [ethyl-4-(dimethylamino)-benzoate]; those commercially available products sold under the "IRGACURE" and "DAROCURE" tradenames by Ciba Geigy Corp., Hawthorne, N.Y., specifically "IRGACURE" 184, 907, 369, 500, 651, 261, 784 and "DAROCURE" 1173 and 4265, respectively; the photoinitiators commercially available from Union Carbide Chemicals and Plastics Co. Inc., Danbury, Conn., under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiator, dl-camphorquinone.

Of course, when those of ordinary skill in the art choose a commercially available ultraviolet curable formulation, it may no longer be desirable to include as a component within the electrochromic monomer composition an additional monomer to that monomer component already present in the commercial formulation. And, as many of such commercially available ultraviolet curable formulations contain a photoinitiator or photosensitizer, it may no longer be desirable to include this optional component in the electrochromic monomer composition. Nevertheless, a monomer, or a photoinitiator or a photosensitizer, may still be added to the electrochromic monomer composition to achieve beneficial results, and particularly when specific properties and characteristics are desired of the resulting polychromic solid film.

With an eye toward maintaining the homogeneity of the electrochromic monomer composition and the polychromic solid film which results after in situ cure, those of ordinary skill in the art should choose the particular components dispersed throughout, and their relative quantities, appropriately. One or more compatibilizing agents may be optionally added to the electrochromic monomer composition so as to accomplish this goal. Such compatibilizing agents include, among others, combinations of plasticizers recited herein, a monomer component having polyfunctionality and cross-linking agents that provide flexible cross-links. See supra.

Many electrochromic compounds absorb electromagnetic radiation in the about 290 nm to about 400 nm ultraviolet region. Because solar radiation includes an ultraviolet region between about 290 nm to about 400 nm, it is often desirable to shield such electrochromic compounds from ultraviolet radiation in that region. By so doing, the longevity and stability of the electrochromic compounds may be improved. Also, it is desirable that the polychromic solid film itself be stable to electromagnetic radiation, particularly in that region. This may be accomplished by adding to the electrochromic monomer composition an ultraviolet stabilizing agent (and/or a self-screening plasticizer which may act to block or screen such ultraviolet radiation) so as to extend the functional lifetime of the resulting polychromic solid film. Such ultraviolet stabilizing agents (and/or self-screening plasticizers) should be substantially transparent in the visible region and function to absorb ultraviolet radiation, quench degradative free radical reaction formation and prevent degradative oxidative reactions.

As those of ordinary skill in the art will readily appreciate, the preferred ultraviolet stabilizing agents, which are usually employed on a by-weight basis, should be selected so as to be compatible with the other components of the electrochromic monomer composition, and so that the physical, chemical or electrochemical performance of, as well as the transformation into, the resulting polychromic solid film is not adversely affected.

Although many materials known to absorb ultraviolet radiation may be employed herein, preferred ultraviolet stabilizing agents include "UVINUL" 400 [2,4-dihydroxybenzophenone (manufactured by BASF Corp., Wyandotte, Mich.)], "UVINUL" D 49 [2,2'-dihydroxy-4,4'-dimethoxybenzophenone (BASF Corp.)], "UVINUL" N 35 [ethyl-2-cyano-3,3-diphenylacrylate (BASF Corp.)], "UVINUL" N 539 [2-ethylhexyl-2-cyano-3,3'-diphenylacrylate (BASF Corp.)], "UVINUL" M 40 [2-hydroxy-4-methoxybenzophenone (BASF Corp.)], "UVINUL" M 408 [2-hydroxy-4-octoxybenzophenone (BASF Corp.)], "TINUVIN" P [2-(2'-hydroxy-5'-methylphenyl)-triazole] (Ciba Geigy Corp.)], "TINUVIN" 327 [2-(3',5'-di-t-butyl-2'-hydroxyphenyl)-5-chloro-benzotriazole (Ciba Geigy Corp.)], "TINUVIN" 328 [2-(3',5'-di-n-pentyl-2'-hydroxyphenyl)-benzotriazole (Ciba Geigy Corp.)] and "CYASORB UV" 24 [2,2'-dihydroxy-4-methoxy-benzophenone (manufactured by American Cyanamid Co., Wayne, N.J.)], with "UVINUL" M 40, "UVINUL M" 408, "UVINUL" N 35 and "UVINUL" N 539 being the most preferred ultraviolet stabilizing agents when used in a by-weight range of about 0.1% to about 15%, with about 4% to about 10% being preferred.

Since solar radiation includes an ultraviolet region only between about 290 nm and 400 nm, the cure wave length of the electrochromic monomer composition, the peak intensity of the source of electromagnetic radiation, and the principle absorbance maxima of the ultraviolet stabilizing agents should be selected to provide a rapid and efficient transformation of the electrochromic monomer compositions into the polychromic solid films, while optimizing the continued long-term post-cure stability to outdoor weathering and all-climate exposure of polychromic solid films.

An electrolytic material may also be employed in the electrochromic monomer composition to assist or enhance the conductivity of the electrical current passing through the resulting polychromic solid film. The electrolytic material may be selected from a host of known materials, preferred of which are tetraethylammonium perchlorate, tetrabutylammonium tetrafluoroborate, tetrabutylammonium hexafluorophosphate, tetrabutylammonium trifluoromethane sulfonate, lithium salts and combinations thereof, with tetrabutylammonium hexafluorophosphate and tetraethylammonium perchlorate being the most preferred.

In addition, adhesion promoting agents or coupling agents may be used in the preferred electrochromic monomer compositions to further enhance the degree to which the resulting polychromic solid films adhere to the contacting surfaces. Adhesion promoting or coupling agents, which promote such enhanced adhesion, include silane coupling agents, and commercially available adhesion promoting agents like those sold by Sartomer Co., such as Alkoxylated Trifunctional Acrylate (9008), Trifunctional Methacrylate Ester (9010 and 9011), Trifunctional Acrylate Ester (9012), Aliphatic Monofunctional Ester (9013 and 9015) and Aliphatic Difunctional Ester (9014). Moreover, carboxylated vinyl monomers, such as methacrylic acid, vinyl carboxylic acid and the like may be used to further assist the development of good adhesion to the contacting surfaces.

And, coloring agents, spacers, anti-oxidizing agents, flame retarding agents, heat stabilizing agents and combinations thereof may be added to the electrochromic monomer compositions, choosing of course those materials in appropriate quantities depending upon the specific application of the resulting polychromic solid film. For instance, a blue-tinted electrochromic automotive mirror, such as described herein, may be prepared by dispersing within the electrochromic monomer composition a suitable ultraviolet stable coloring agent, such as "NEOZAPON" BLUE ™ 807 (a phthalocyanine blue dye, available commercially from BASF Corp., Parsippany, N.J.) and "NEOPEN" 808 (a phthalocyanine blue dye, available commercially from BASF Corp.).

Polychromic solid films may be prepared within an electrochromic device by introducing an electrochromic monomer composition to a film forming means, such as the vacuum backfilling technique, which fills a cavity of an assembly by withdrawing into the cavity the electrochromic monomer composition while the assembly is in an environment of reduced atmospheric pressure [see e.g., Varaprasad II], the two hole filling technique, where the electrochromic monomer composition is dispensed under pressure into the assembly through one hole while a gentle vacuum is applied at the other hole [see e.g., Varaprasad III], or with the sandwich lamination technique, which contemporaneously creates and fills a cavity of an assembly by placing on one or both substrates either a thermoplastic sealing means to act as a spacing means [see commonly assigned U.S. Pat. No. 5,233,461 (Dornan)] or glass beads of nominal diameter, and then exposing to electromagnetic radiation at least one clear substrate of the assembly constructed by any of the above manufacturing techniques (containing the low viscosity electrochromic monomer composition) for a time sufficient to transform the electrochromic monomer composition into a polychromic solid film.

In connection with such film forming means, spacers, such as glass beads, may be dispensed across the conductive surface of one or both substrates, or dispersed throughout the electrochromic monomer composition which may then be dispensed onto the conductive surface of one or both substrates, to assist in preparing a polychromic solid film which contacts, in abutting relationship, the conductive surface of the two substrates. Similarly, a pre-established spacing means of solid material, such as tape, pillars, walls, ridges and the like, may also be employed to assist in determining the interpane distance between the substrates in which a polychromic solid film may be prepared to contact, in abutting relationship with, the conductive surface of the two substrates.

Polychromic solid films may also be prepared separately from the electrochromic device, and thereafter placed between, and in abutting relationship with, the conductive surface of the two substrates used in constructing the device. Many known film manufacturing processes may be employed as a film forming means to manufacture polychromic solid films. Included among these processes are calendering, casting, rolling, dispensing, coating, extrusion and thermoforming. For a non-exhaustive description of such processes, see Modern Plastics Encyclopedia 1988, 203-300, McGraw-Hill Inc., New York (1988). For instance, the electrochromic monomer composition may be dispensed or coated onto the conductive surface of a substrate, using conventional techniques, such as curtain coating, spray coating, dip coating, spin coating, roller coating, brush coating or transfer coating.

As described above, polychromic solid films may be prepared as a self-supporting solid film which may thereafter be contacted with conductive substrates.

For instance, an electrochromic monomer composition may be continuously cast or dispensed onto a surface, such as a fluorocarbon surface and the like, to which the polychromic solid film, transformed therefrom by exposure to electromagnetic radiation, does not adhere. In this way, polychromic solid films may be continuously prepared, and, for example, reeled onto a take-up roller and stored for future use. Thus, when a particular electrochromic device is desired, an appropriately shaped portion of the stored polychromic solid film may be cut from the roll using a die, laser, hot wire, blade or other cutting means. This now custom-cut portion of polychromic solid film may be contacted with the conductive substrates to form an electrochromic device.

For example, the custom-cut portion of the polychromic solid film may be laminated between the conductive surface of two transparent conductive coated substrates, such as ITO or tin oxide coated glass substrates, two ITO or tin oxide coated "MYLAR" [polyethylene terephthalate film (commercially available from E.I. du Pont de Nemours and Co., Wilmington, Del.)] substrates or one ITO or tin oxide coated glass substrate and one ITO or tin oxide coated "MYLAR" substrate. To this end, it may be desirable to allow for residual cure in the stored polychromic solid film so that adhesion to the conductive substrates in the laminate to be formed is facilitated and optimized.

In this regard, a polychromic solid film may be prepared by the film forming means of extrusion or calendaring wherein the electrochromic monomer composition is transformed into the polychromic solid film by exposure to electromagnetic radiation prior to, contemporaneously with, or, if the electrochromic monomer composition is sufficiently viscous, after passing through the extruder or calendar. Thereafter, the polychromic solid film may be placed between, and in abutting relationship with, the conductive surface of the substrates, and then construction of the electrochromic device may be completed.

While preparing polychromic solid films, the viscosity of the electrochromic monomer composition may be controlled to optimize its dispensability by adjusting the temperature of (1) the electrochromic monomer composition itself, (2) the substrates on which the electrochromic monomer composition may be placed to assemble the electrochromic device or (3) the processing equipment used to prepare polychromic solid films (if the polychromic film is to be prepared independently from the substrates of the electrochromic devices). For example, the temperature of the electrochromic monomer composition, the substrates or the equipment or combinations thereof may be elevated to decrease the viscosity of the electrochromic monomer composition. Similarly, the uniformity on the substrate of the dispensed electrochromic monomer composition may be enhanced using lamination techniques, centrifuge techniques, pressure applied from the atmosphere (such as with vacuum bagging), pressure applied from a weighted object, rollers and the like.

The substrates employed in the electrochromic devices of U.S. patent application Ser. No. 08/193,557, filed Feb. 8, 1994 (now abandoned) ("the '557 application") may be constructed from materials that are substantially inflexible as well as flexible depending on the application to which they are to be used. In this regard, the substrates may be constructed from substantially inflexible substrates, such as glass, laminated glass, tempered glass, optical plastics, such as polycarbonate, acrylic and polystyrene, and flexible substrates, such as "MYLAR" film. Also, the glass substrates suitable for use herein may be tinted specialized glass which is known to significantly reduce ultraviolet radiation transmission while maintaining high visible light transmission. Such glass, often bearing a blue colored tint, provides a commercially acceptable silvery reflection to electrochromic automotive mirrors even when the polychromic solid film is prepared containing an ultraviolet stabilizing agent or other component which may have a tendency to imbue a yellowish appearance to the polychromic solid film. Preferably, blue tinted specialized glass may be obtained commercially from Pittsburgh Plate Glass Industries, Pittsburgh, Pa. as "SOLEXTRA" 7010; Ford Glass Co., Detroit, Mich. as "SUNGLAS" Blue; or Asahi Glass Co., Tokyo, Japan under the "SUNBLUE" tradename.

Whether the chosen substrate is substantially inflexible or flexible, a transparent conductive coating, such as indium tin oxide ("ITO") or doped-tin oxide, is coated on a surface of the substrate making that surface suitable for placement in abutting relationship with a polychromic solid film.

The choice of substrate may influence the choice of processing techniques used to prepare the polychromic solid film or the type of electrochromic device assembled. For example, when assembling an electrochromic device from flexible substrates, an electrochromic monomer composition may be advantageously applied to such flexible substrates using a roll-to-roll system where the flexible substrates are released from rolls (that are aligned and rotate in directions opposite to one another), and brought toward one another in a spaced-apart relationship. In this way, the electrochromic monomer composition may be dispensed or injected onto one of the flexible substrates at the point where the two flexible substrates are released from their respective rolls and brought toward one another, while being contemporaneously exposed to electromagnetic radiation for a time sufficient to transform the electrochromic monomer composition into a polychromic solid film.

The dispensing of the electrochromic monomer composition may be effected through a first injection nozzle positioned over one of the rolls of flexible substrate. A weathering barrier forming material, such as a curing epoxide like an ultraviolet curing epoxide, may be dispensed in an alternating and synchronized manner onto that flexible substrate through a second injection nozzle positioned adjacent to the first injection nozzle. By passing in the path of these nozzles as a continuously moving ribbon, a flexible substrate may be contacted with the separate polymerizable compositions in appropriate amounts and positions on the flexible substrate.

In manufacturing flexible electrochromic assemblies having a dimension the full width of the roll of flexible substrate, a weathering barrier forming material may be dispensed from the second injection nozzle which may be positioned inboard (typically about 2 mm to about 25 mm) from the leftmost edge of the roll of flexible substrate. The first injection nozzle, positioned adjacent to the second injection nozzle, may dispense the electrochromic monomer composition onto most of the full width of the roll of flexible substrate. A third injection nozzle, also dispensing weathering barrier forming material, may be positioned adjacent to, but inboard from, the rightmost edge of that roll of flexible substrate (typically about 2 mm to about 25 mm). In this manner, and as described above, a continuous ribbon of a flexible electrochromic assembly may be formed (upon exposure to electromagnetic radiation) which, in turn, may be taken up onto a take-up roller. By so doing, a flexible electrochromic assembly having the width of the roll of flexible substrate, but of a particular length, may be obtained by unrolling and cutting to length an electrochromic assembly of a particular size.

Should it be desirable to have multiple flexible electrochromic assemblies positioned in the same taken-up roll, multiple nozzles may be placed appropriately at positions throughout the width of one of the rolls of flexible substrate, and the dispensing process carried out accordingly.

In that regard, a small gap (e.g., about 5 mm to about 50 mm) should be maintained where no dispensing occurs during the introduction of the electrochromic monomer composition and the weathering barrier forming material onto the substrate so that a dead zone is created where neither the electrochromic monomer composition nor the weathering barrier forming material is present. Once the weathering barrier and polychromic solid film have formed (see infra), the electrochromic assembly may be isolated by cutting along the newly created dead zones of the flexible assemblies. This zone serves conveniently as a cutting area to form electrochromic assemblies of desired sizes.

And, the zones outboard of the respective weathering barriers serve as convenient edges for attachment of a means for introducing an applied potential to the flexible electrochromic assemblies, such as bus bars. Similarly, the bisection of the dead zones establishes a convenient position onto which the bus bars may be affixed.

While each of the weathering barrier forming material and the electrochromic monomer composition may be transformed into a weathering barrier and a polychromic solid film, respectively, by exposure to electromagnetic radiation, the required exposures to complete the respective transformations may be independent from one another. The weathering barrier forming material may also be thermally cured to form the weathering barrier.

The choice of a particular electromagnetic radiation region to effect in situ cure may depend on the particular electrochromic monomer composition to be cured. In this regard, typical sources of electromagnetic radiation, such as ultraviolet radiation, include: mercury vapor lamps; xenon arc lamps; "H", "D", "X", "M", "V" and "A" fusion lamps (such as those commercially available from Fusion UV Curing Systems, Buffalo Grove, Ill.); microwave generated ultraviolet radiation; solar power and fluorescent light sources. Any of these electromagnetic radiation sources may use in conjunction therewith reflectors and filters, so as to focus the emitted radiation within a particular electromagnetic region. Similarly, the electromagnetic radiation may be generated directly in a steady fashion or in an intermittent fashion so as to minimize the degree of heat build-up. Although the region of electromagnetic radiation employed to in situ cure the electrochromic monomer compositions into polychromic solid films is often referred to herein as being in the ultraviolet region, that is not to say that other regions of radiation within the electromagnetic spectrum may not also be suitable. For instance, in certain situations, visible radiation may also be advantageously employed.

Bearing in mind that some or all of the components of the electrochromic monomer composition may inhibit, retard or suppress the in situ curing process, a given source of electromagnetic radiation should have a sufficient intensity to overcome the inhibitive effects of those components so as to enable to proceed successfully the transformation of the electrochromic monomer composition into the polychromic solid film. By choosing a lamp with a reflector and, optionally, a filter, a source which itself produces a less advantageous intensity of electromagnetic radiation may suffice. In any event, the chosen lamp preferably has a power rating of at least about 100 watts per inch (about 40 watts per cm), with a power rating of at least about 300 watts per inch (about 120 watts per cm) being particularly preferred. Most preferably, the wavelength of the lamp and its output intensity should be chosen to accommodate the presence of ultraviolet stabilizing agents incorporated into electrochromic monomer compositions. Also, a photoinitiator or photosensitizer, if used, may increase the rate of in situ curing or shift the wavelength within the electromagnetic radiation spectrum at which in situ curing will occur in the transformation process.

During the in situ curing process, the electrochromic monomer composition will be exposed to a source of electromagnetic radiation that emits an amount of energy, measured in $KJ/m^2$, determined by parameters including: the size, type and geometry of the source; the duration of the exposure to electromagnetic radiation; the intensity of the radiation (and that portion of radiation emitted within the region appropriate to effect curing); the absorbance of electromagnetic radiation by any intervening materials, such as substrates, conductive coatings and the like; and the distance the electrochromic monomer composition lies from the source of radiation. Those of ordinary skill in the art will readily appreciate that the polychromic solid film transformation may be optimized by choosing appropriate values for these parameters in view of the particular electrochromic monomer composition.

The source of electromagnetic radiation may remain stationary while the electrochromic monomer composition passes through its path. Alternatively, the electrochromic monomer composition may remain stationary while the source of electromagnetic radiation passes thereover or therearound to complete the transformation into a polychromic solid film. Still alternatively, both may traverse one another, or for that matter remain stationary, provided that the electrochromic monomer composition is exposed to the electrochromic radiation for a time sufficient to effect such in situ curing.

Commercially available curing systems, such as the Fusion UV Curing Systems F-300 B [Fusion UV Curing Systems, Buffalo Grove, Ill.], Hanovia UV Curing System [Hanovia Corp., Newark, N.J.] and RC-500 A Pulsed UV Curing System [Xenon Corp., Woburn, Mass.], are well-suited to accomplish the transformation. Also, a Sunlighter UV chamber fitted with low intensity mercury vapor lamps and a turntable may accomplish the transformation.

The required amount of energy may be delivered by exposing the electrochromic monomer composition to a less powerful source of electromagnetic radiation for a longer period of time, through for example multiple passes, or conversely, by exposing it to a more powerful source of electromagnetic radiation for a shorter period of time. In addition, each of those multiple passes may occur with a source at different energy intensities. In any event, those of ordinary skill in the art should choose an appropriate source of electromagnetic radiation depending on the particular electrochromic monomer composition, and place that source at a suitable distance therefrom which, together with the length of exposure, optimizes the transformation process. Generally, a slower, controlled cure, such as that achieved by multiple passes using a less intense energy source, may be preferable over a rapid cure using a more intense energy source, for example, to minimize shrinkage during the transformation process. Also, it is desirable to use a source of electromagnetic radiation that is delivered in an intermittent fashion, such as by pulsing or strobing, so as to ensure a thorough and complete cure without causing excessive heat build-up.

In transforming electrochromic monomer compositions into polychromic solid films, shrinkage may be observed during and after the transformation process of the electrochromic monomer composition into a polychromic solid film. This undesirable event may be controlled or lessened to a large extent by making appropriate choices among the components of the electrochromic monomer composition. For instance, appropriately chosen polyfunctional monomers or cross-linking agents may enhance resistance to shrinkage during the transformation process. In addition, a conscious control of the type and amount of plasticizer used in the electrochromic monomer composition may also tend to enhance resistance to shrinkage. While shrinkage may also be observed with polychromic solid films that have been subjected to environmental conditions, especially conditions of environmental accelerated aging, such as thermal cycling and low temperature soak, a conscious choice of components used in the electrochromic monomer composition may tend to minimize this event as well. In general, shrinkage may be decreased as the molecular weight of the monomer employed is increased, and by using index matched inert fillers, such as glass beads or fibres.

Electrochromic devices may be manufactured with polychromic solid films of a particular thickness by preparing partially-cured polychromic solid films between the glass substrates of electrochromic assemblies with spacers or a thermoplastic spacing means having been placed on one or both of the substrates. This partially-cured polychromic solid film should have a thickness slightly greater than that which the resulting polychromic solid film will desirably assume in the completed device. The electrochromic assemblies should then be subjected to compression, such as that provided by an autoclave/vacuum bagging process, and thereafter be exposed to electromagnetic radiation to complete the transformation into a polychromic solid film with the desired film thickness.

Figure 18:
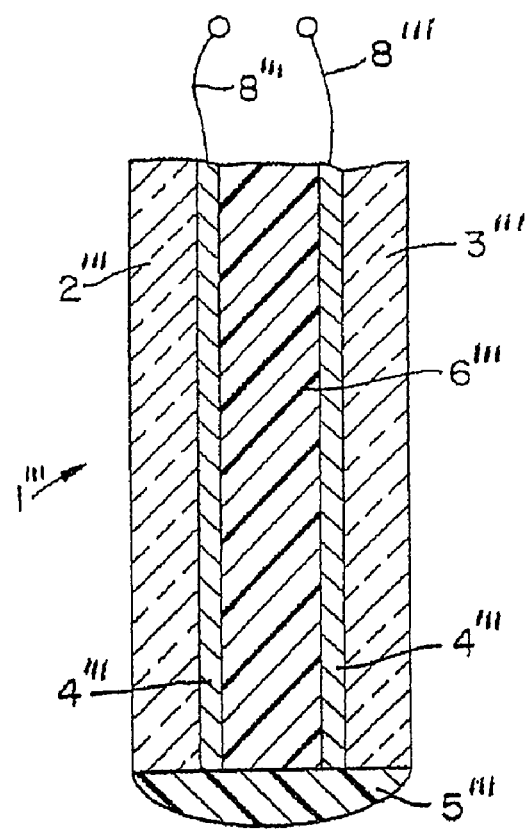
FIG. 18 depicts a sectional view of an electrochromic device employing an electrochromic polymeric solid film.
Figure 19:
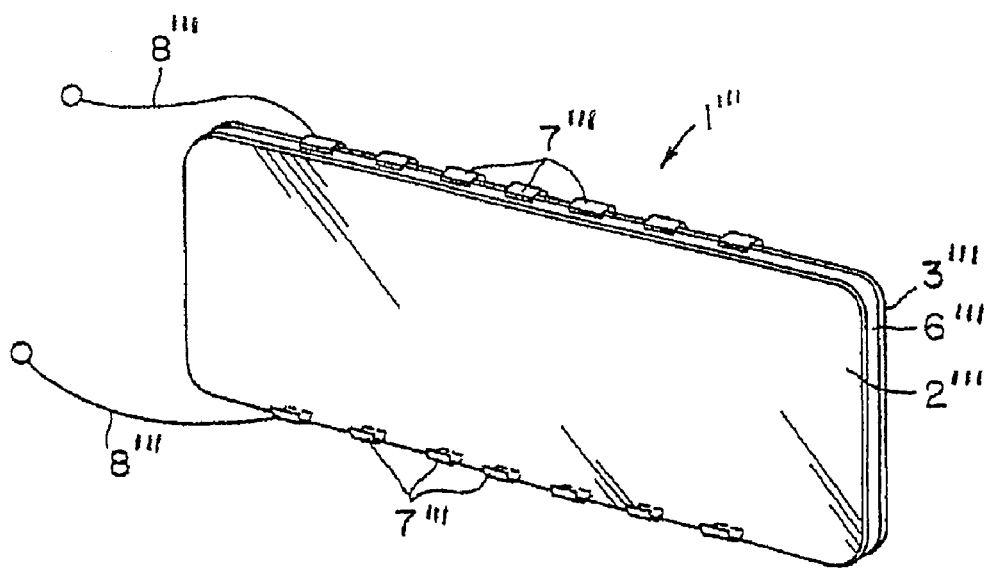
FIG. 19 depicts a perspective view of an electrochromic glazing assembly.

FIGS. 18 and 19 show an electrochromic device assembled from the polychromic solid films of U.S. patent application Ser. No. 08/193,557, filed Feb. 8, 1994 (now abandoned) ("the '557 application"). The electrochromic assembly 1''' includes two substantially planar substrates 2''', 3''' positioned substantially parallel to one another. It is preferable that these substrates 2''', 3''' be positioned as close to parallel to one another as possible so as to avoid double imaging, which is particularly noticeable in mirrors, especially when the electrochromic media—i.e., the polychromic solid film—is colored to a dimmed state.

A source of an applied potential need be introduced to the electrochromic assembly 1''' so that polychromic solid film 6''' may color in a rapid, intense and uniform manner. That source may be connected by electrical leads 8''' to conducting strips, such as bus bars 7'''. The bus bars 7''' may be constructed of a metal, such as copper, stainless steel, aluminum or solder, or of conductive frits and epoxies, and should be affixed to a conductive coating 4''', coated on a surface of each of the substrates 2''', 3'''. An exposed portion of the conductive coating 4''' should be provided for the bus bars 7''' to adhere by the displacement of the coated substrates 2''', 3''' in opposite directions relative to each other—lateral from, but parallel to—, with polychromic solid film 6''' positioned between, and in abutting relationship with, the conductive surface of the two substrates.

As noted above, coated on a surface of each of these substrates 2''', 3''' is a substantially transparent conductive coating 4'''. The conductive coating 4''' is generally from about 300 Å to about 10,000 Å in thickness, having a refractive index in the range of about 1.6 to about 2.2. Preferably, a conductive coating 4''' with a thickness of about 1,200 Å to about 2,300 Å, having a refractive index of about 1.7 to about 1.9, is chosen depending on the desired appearance of the substrate when the polychromic solid film situated therebetween is colored.

The conductive coating 4''' should also be highly and uniformly conductive in each direction to provide a substantially uniform response as to film coloring once a potential is applied. The sheet resistance of these transparent conductive substrates 2''', 3''' may be below about 100 ohms per square, with about 6 ohms per square to about 20 ohms per square being preferred. Such substrates 2''', 3''' may be selected from among those commercially available as glass substrates, coated with indium tin oxide ("ITO") from Donnelly Corporation, Holland, Mich., or tin oxide-coated glass substrates sold by the LOF Glass division of Libbey-Owens-Ford Co., Toledo, Ohio under the tradename of "TEC-Glass" products, such as "TEC 10" (10 ohms per square sheet resistance), "TEC 12" (12 ohms per square sheet resistance) and "TEC 20" (20 ohms per square sheet resistance) tin oxide-coated glass. Moreover, tin oxide coated glass substrates, commercially available from Pittsburgh Plate Glass Industries, Pittsburgh, Pa. under the "SUNGATE" tradename, may be advantageously employed herein. Also, substantially transparent conductive coated flexible substrates, such as ITO deposited onto substantially clear or tinted "MYLAR", may be used. Such flexible substrates are commercially available from Southwall Corp., Palo Alto, Calif.

The conductive coating 4''' coated on each of the substrates 2''', 3''' may be constructed from the same material or different materials, including tin oxide, ITO, ITO-FW, ITO-HW, ITO-HWG, doped tin oxide, such as antimony-doped tin oxide and fluorine-doped tin oxide, doped zinc oxide, such as antimony-doped zinc oxide and aluminum-doped zinc oxide, with ITO being preferred.

The substantially transparent conductive coated substrates 2''', 3''' may be of the full-wave length-type ("FW") (about 6 ohms per square to about 8 ohms per square sheet resistance), the half-wave length-type ("HW") (about 12 ohms per square to about 15 ohms per square sheet resistance) or the half-wave length green-type ("HWG") (about 12 ohms per square to about 15 ohms per square sheet resistance). The thickness of FW is about 3,000 Å in thickness, HW is about 1,500 Å in thickness and HWG is about 1,960 Å in thickness, bearing in mind that these substantially transparent conductive coated substrates 2''', 3''' may vary as much as about 100 to about 200 Å. HWG has a refractive index of about 1.7 to about 1.8, and has an optical thickness of about five-eighths wave to about two-thirds wave. HWG is generally chosen for electrochromic devices, especially reflective devices, such as mirrors, whose desired appearance has a greenish hue in color when a potential is applied.

Optionally, and for some applications desireably, the spaced-apart substantially transparent conductive coated substrates 2''', 3''' may have a weather barrier 5''' placed therebetween or therearound. The use of a weather barrier 5''' in the electrochromic devices of U.S. patent application Ser. No. 08/193,557, filed Feb. 8, 1994 (now abandoned) ("the '557 application") is for the purpose of preventing environmental contaminants from entering the device during long-term use under harsh environmental conditions rather than to prevent escape of electrochromic media, such as with an electrochemichromic device. Weather barrier 5''' may be made from many known materials, with epoxy resins coupled with spacers, plasticized polyvinyl butyral (available commercially under the "SAFLEX" tradename from Monsanto Co., St. Louis, Mo.), ionomer resins (available commercially under the "SURLYN" tradename from E.I. du Pont de Nemours and Co., Wilmington, Del.) and "KAPTON" high temperature polyamide tape (available commercially from E.I. du Pont de Nemours and Co., Wilmington, Del.) being preferred. In general, it may be desirable to use within the electrochromic device, and particularly for weather barrier 5''', materials such as nitrile containing polymers and butyl rubbers that form a good barrier against oxygen permeation from environmental exposure.

In the sandwich lamination technique, see supra, it is the thickness of the polychromic solid film itself, especially when a highly viscous electrochromic monomer composition is used, optionally coupled with either spacers or a thermoplastic spacing means, assembled within the electrochromic devices of U.S. patent application Ser. No. 08/193,557, filed Feb. 8, 1994 (now abandoned) ("the '557 application") that determines the interpane distance of the spaced-apart relationship at which the substrates are positioned. This interpane distance may be influenced by the addition of spacers to the electrochromic monomer composition, which spacers, when added to an electrochromic monomer composition, assist in defining the film thickness of the resulting polychromic solid film. And, the thickness of the polychromic solid film may be about 10 μm to about 1000 μm, with about 20 μm to about 200 μm being preferred, a film thickness of about 37 μm to about 74 μm being particularly preferred, and a film thickness of about 53 μm being most preferred depending of course on the chosen electrochromic monomer composition and the intended application.

By taking appropriate measures, electrochromic devices manufactured with polychromic solid films may operate so that, upon application of a potential thereto, only selected portions of the device—i.e., through the polychromic solid film—will color in preference to the remaining portions of the device. In such segmented electrochromic devices, lines may be scored or etched onto the conductive surface of either one or both of substrates 2''', 3''', in linear alignment so as to cause a break in electrical continuity between regions immediately adjacent to the break, by means such as chemical etching, mechanical scribing, laser etching, sand blasting and other equivalent means. By so doing, an addressable pixel may be created by the break of electrical continuity when a potential is applied to a pre-determined portion of the electrochromic device. The electrochromic device colors in only that pre-determined portion demonstrating utility, for example, as an electrochromic mirror, where only a selected portion of the mirror advantageously colors to assist in reducing locally reflected glare or as an electrochromic information display device.

To prepare an electrochromic device containing a polychromic solid film, the electrochromic monomer composition may be dispensed onto the conductive surface of one of the substrates 2''' or 3'''. The conductive surface of the other substrate may then be placed thereover so that the electrochromic monomer composition is dispersed uniformly onto and between the conductive surface of substrates 2''', 3'''.

This assembly may then be exposed, either in a continuous or intermittent manner, to electromagnetic radiation, such as ultraviolet radiation in the region between about 200 nm to about 400 nm for a period of about 2 seconds to about 10 seconds, so that the electrochromic monomer composition is transformed by in situ curing into polychromic solid film 6'''. The intermittent manner may include multiple exposures to such energy.

Once the electrochromic device is assembled with polychromic solid film 6''', a potential may be applied to the bus bars 7''' in order to induce film coloring. The applied potential may be supplied from a variety of sources including, but not limited to, any source of alternating current ("AC") or direct current ("DC") known in the art, provided that, if an AC source is chosen, control elements, such as diodes, should be placed between the source and each of the conductive coatings 4''' to ensure that the potential difference between the conductive coatings 4''' does not change polarity with variations in polarity of the applied potential from the source. Suitable DC sources are storage batteries, solar thermal cells, photovoltaic cells or photoelectrochemical cells.

An electrochromic device, such as an electrochromic shade band where a gradient opacity panel may be constructed by positioning the bus bars 7''' along the edges of the substrates in such a way so that only a portion—e.g., the same portion—of each of the substrates 2''', 3''' have the bus bars 7''' affixed thereto. Thus, where the bus bars 7''' are aligned with one another on opposite substrates 2''', 3''', the introduction of an applied potential to the electrochromic device will cause intense color to be observed in only that region of the device onto which an electric field has been created—i.e., only that region of the device having the bus bars 7''' so aligned. A portion of the remaining bleached region will also exhibit color extending from the intensely colored region at the bus bar/non-bus bar transition gradually dissipating into the remaining bleached region of the device.

The applied potential generated from any of these sources may be introduced to the polychromic solid film of the electrochromic device in the range of about 0.001 volts to about 5.0 volts. Typically, however, a potential of about 0.2 volts to about 2.0 volts is preferred, with about 1 volt to about 1.5 volts particularly preferred, to permit the current to flow across and color the polychromic solid film 6''' so as to lessen the amount of light transmitted therethrough. The extent of coloring—i.e., high transmittance, low transmittance and intermediate transmittance levels—at steady state in a particular device will often depend on the potential difference between the conductive surface of the substrates 2''', 3''', which relationship permits the electrochromic devices of U.S. patent application Ser. No. 08/193,557, filed Feb. 8, 1994 (now abandoned) ("the '557 application") to be used as "gray-scale" devices, as that term is used by those of ordinary skill in the art.

A zero potential or a potential of negative polarity (i.e., a bleaching potential) may be applied to the bus bars 7''' in order to induce high light transmittance through polychromic solid film 6'''. A zero potential to about −0.2 volts will typically provide an acceptable response time for bleaching; nevertheless, increasing the magnitude of the negative potential to about −0.7 volts will often enhance response times. And, a further increase in the magnitude of that potential to about −0.8 volts to about −0.9 volts, or a magnitude of even more negative polarity as the art-skilled should readily appreciate, may permit polychromic solid film 6''' to form a light-colored tint while colored to a partial- or fully-dimmed state.

In electrochromic devices where the polychromic solid film is formed within the assembly by exposure to electromagnetic radiation, the performance of the device may be enhanced by applying the positive polarity of the potential to the substrate that faced the electromagnetic radiation during the transformation process. Thus, in the case of electrochromic mirrors manufactured in such a manner, the positive polarity of the potential should be applied to the conductive surface of the clear, front glass substrate, and the negative polarity of the potential applied to the conductive surface of the silvered, rear glass substrate, to observe such a beneficial effect.

In the context of an electrochromic mirror assembly, a reflective coating, having a thickness in the range of 250 Å to about 2,000 Å, preferably about 1,000 Å, should thereafter be applied to one of the transparent conductive coated glass substrates 2''' or 3''' in order to form a mirror. Suitable materials for this layer are aluminum, palladium, platinum, titanium, gold, chromium, silver and stainless steel, with silver being preferred. As an alternative to such metal reflectors, multi-coated thin film stacks of dielectric materials or a high index single dielectric thin film coating may be used as a reflector. Alternatively, one of the conductive coatings 4''' may be a metallic reflective layer which serves not only as an electrode, but also as a mirror.

It is clear from the teaching herein that should a window, sun roof or the like be desirably constructed, the reflective coating need only be omitted from the assembly so that the light which is transmitted through the transparent panel is not further assisted in reflecting back therethrough.

Similarly, an electrochromic optically attenuating contrast filter may be manufactured in the manner described above, optionally incorporating into the electrochromic assembly an anti-reflective means, such as a coating, on the front surface of the outermost substrate as viewed by an observer (see e.g., Lynam V); an anti-static means, such as a conductive coating, particularly a transparent conductive coating of ITO, tin oxide and the like; index matching means to reduce internal and interfacial reflections, such as thin films of an appropriately selected optical path length; and/or light absorbing glass, such as glass tinted to a neutral density, such as "GRAYLITE" gray tinted glass (commercially available from Pittsburgh Plate Glass Industries, Pittsburgh, Pa.) and "SUNGLAS" Gray gray tinted glass (commercially available from Ford Glass Co., Detroit, Mich.), to augment contrast enhancement. Moreover, polymer interlayers, which may be tinted gray, such as those used in electrochromic constructions as described in Lynam III, may be incorporated into such electrochromic optically attenuating contrast filters.

Electrochromic optical attenuating contrast filters may be an integral part of a device or may be affixed to an already constructed device, such as cathode ray tube monitors. For instance, an optical attenuating contrast filter may be manufactured from a polychromic solid film and then affixed, using a suitable optical adhesive, to a device that should benefit from the properties and characteristics exhibited by the polychromic solid film. Such optical adhesives maximize optical quality and optical matching, and minimize interfacial reflection, and include plasticized polyvinyl butyral, various silicones, polyurethanes such as "NORLAND NOA 65" and "NORLAND NOA 68", and acrylics such as "DYMAX LIGHT-WELD 478". In such contrast filters, the electrochromic compounds are chosen for use in the polychromic solid film so that the electrochromic assembly may color to a suitable level upon the introduction of an applied potential thereto, and no undesirable spectral bias is exhibited. Preferably, the polychromic solid film should dim through a substantially neutral colored partial transmission state to a substantially neutral colored full transmission state.

Polychromic solid films may be used in electrochromic devices, particularly glazings and mirrors, whose functional surface is substantially planar or flat, or that are curved with a convex curvature, a compound curvature, a multi-radius curvature, a spherical curvature, an aspheric curvature, or combinations of such curvature. For example, flat electrochromic automotive mirrors may be manufactured using the polychromic solid films of U.S. patent application Ser. No. 08/193, 557, filed Feb. 8, 1994 (now abandoned) ("the '557 application"). Also, convex electrochromic automotive mirrors may be manufactured, with radii of curvature typically in the range of about 25" to about 250", preferably in the range of about 35" to about 100", as are conventionally known. In addition, multi-radius automotive mirrors, such as those described in U.S. Pat. No. 4,449,786 (McCord), may be manufactured using the polychromic solid films of U.S. patent application Ser. No. 08/193,557, filed Feb. 8, 1994 (now abandoned) ("the '557 application"). Multi-radius automotive mirrors may be used typically on the driver-side exterior of an automobile to extend the driver's field of view and to enable the driver to safely see rearward and to avoid blind-spots in the rearward field of view. Generally, such mirrors comprise a higher radius (even flat) region closer to the driver and a lower radius (i.e., more curved) region outboard from the driver that serves principally as the blind-spot detection zone in the mirror. Indeed, such polychromic solid film-containing electrochromic multi-radius automotive mirrors may benefit from the prolonged coloration performance of polychromic solid films and/or from the ability to address individual segments in such mirrors.

Often, a demarcation means, such as a silk-screened or otherwise applied line of black epoxy, may be used to separate the more curved, outboard blind-spot region from the less curved, inboard region of such mirrors. The demarcation means may also include an etching of a deletion line or an otherwise established break in the electrical continuity of the transparent conductors used in such mirrors so that either one or both regions may be individually or mutually addressed. Optionally, this deletion line may itself be colored black. Thus, the outboard, more curved region may operate independently from the inboard, less curved region to provide an electrochromic mirror that operates in a segmented arrangement. Upon the introduction of an applied potential, either of such regions may color to a dimmed intermediate reflectance level, independent of the other region, or, if desired, both regions may operate together in tandem.

An insulating demarcation means, such as demarcation lines, dots and/or spots, may be placed within electrochromic devices, such as mirrors, glazings, optically attenuating contrast filters and the like, to assist in creating the interpane distance of the device and to enhance overall performance, in particular the uniformity of coloration across large area devices. Such insulating demarcation means, constructed from, for example, epoxy coupled with glass spacer beads, plastic tape or die cut from plastic tape, may be placed onto the conductive surface of one or more substrates by silk-screening or other suitable technique prior to assembling the device. The insulating demarcation means may be geometrically positioned across the panel, such as in a series of parallel, uniformly spaced-apart lines, and may be clear, opaque, tinted or colorless and appropriate combinations thereof, so as to appeal to the automotive stylist.

If the interpane distance between the substrates is to be, for example, about 250 µm, then the insulating demarcation means (being substantially non-deformable) may be screened, contacted or adhered to the conductive surface of a substrate at a lesser thickness, for example, about 150 µm to about 225 µm. Of course, if substantially deformable materials are used as such demarcation means, a greater thickness, for example, about 275 µm to about 325 µm, may be appropriate as well. Alternatively, the insulating demarcation means may have a thickness about equal to that of the interpane distance of the device, and actually assist in bonding together the two substrates of the device.

In any event, the insulating demarcation means should prevent the conductive surfaces of the two substrates (facing one another in the assembled device) from contacting locally one another to avoid short-circuiting the electrochromic system. Similarly, should the electrochromic device be touched, pushed, impacted and the like at some position, the insulating demarcation means, present within the interpane distance between the substrates, should prevent one of the conductive surfaces from touching, and thereby short-circuiting, the other conductive surface. This may be particularly advantageous when flexible substrates, such as ITO-coated "MYLAR", are used in the electrochromic device.

Although spacers may be added to the electrochromic monomer composition and/or distributed across the conductive surface of one of the substrates prior to assembling the device, such random distribution provides a degree of uncertainty as to their ultimate location within the electrochromic device. By using such a screen-on technique as described above, a more defined and predictable layout of the insulating demarcation means may be achieved.

Using such insulating demarcation means, one or both of the substrates, either prior to or after assembly in the device, may be divided into separate regions with openings or voids within the insulating demarcation means interconnecting adjacent regions so as to permit a ready introduction of the electrochromic monomer composition into the assembly.

A demarcation means may be used that is conductive as well, provided that it is of a smaller thickness than the interpane distance and/or a layer of an insulating material, such as a non-conductive epoxy, urethane or acrylic, is applied thereover so as to prevent conductive surfaces from contacting one another and thus short-circuiting the electrochromic assembly. Such conductive demarcation means include conductive frits, such as silver frits like the # 7713 silver conductive frit available commercially from E.I. de Pont de Nemours and Co., Wilmington, Del., conductive paint or ink and/or metal films, such as those disclosed in Lynam IV. Use of a conductive demarcation means, such as a line of the # 7713 silver conductive frit, having a width of about 0.09375" and a thickness of about 50 μm, placed on the conductive surface of one of the substrates of the electrochromic device may provide the added benefit of enhancing electrochromic performance by reducing bus bar-to-bus bar overall resistance and thus enhancing uniformity of coloration, as well as rapidity of response, particularly over large area devices.

In view of the above description of the instant invention, it is evident that a wide range of practical opportunities is provided by the teaching herein. The following examples illustrate the benefits and utility of the present invention and are provided only for purposes of illustration, and are not to be construed so as to limit in any way the teaching herein.

Other components may also be added to the electrolyte, with such components preferably being in solution in liquid-phase electrolytes. These components may include, but are not limited to, ultraviolet stabilizing agents, infrared radiation reducing agents, color tinting agents (e.g., dyes or colorants) and combinations thereof. Suitable ultraviolet stabilizing agents and color tinting agents are recited in Lynam III, the disclosure of which is hereby incorporated herein by reference. For example, a blue-colored dye of the phthalocyanine-type, such as "NEOPEN" 808 (commercially available from BASF Corp., Parsippany, N.J.), may be added to the electrolyte as a color tinting agent.

Because many redox reaction promoters show a substantial absorbance in the ultraviolet region of the electromagnetic spectrum from about 250 nm to about 350 nm and the electrochromic solid film itself may be deleteriously affected by exposure to ultraviolet radiation, it is often desirable to shield the redox reaction promoters and electrochromic solid film from ultraviolet radiation. Thus, by introducing an ultraviolet stabilizing agent to the electrolyte, or using a solvent which itself acts to absorb ultraviolet radiation, the lifetime of the electrochromic device may be extended. It may be particularly advantageous to include ultraviolet stabilizing agents in the electrolyte for electrochromic mirrors and electrochromic devices whose intended use may result in exposure to outdoor weathering conditions, such as that encountered by the exterior of a motor vehicle.

Although many materials known to absorb ultraviolet radiation may be employed herein, preferred ultraviolet stabilizing agents include "UVINUL" 400 [2,4-dihydroxybenzophenone (manufactured by BASF Corp., Wyandotte, Mich.)], "UVINUL" D 49 [2,2'-dihydroxy-4,4'-dimethoxybenzophenone (BASF Corp.)], "UVINUL" N 35 [ethyl-2-cyano-3,3-diphenylacrylate (BASF Corp.)], "UVINUL" N 539 [2-ethyl hexyl-2-cyano-3,3'-diphenylacrylate (BASF Corp.)], "UVINUL" M 40 (2-hydroxy-4-methoxybenzophenone (BASF Corp.)], "UVINUL" M 408 [2-hydroxy-4-octoxy-benzophenone (BASF Corp.)], "TINUVIN" P [2-(2H-benzotriazole-2-yl)-4-methylphenyl (manufactured by Ciba Geigy Corp., Hawthorne, N.Y.)], "TINUVIN"327 [(2-(3',5'-di-t-butyl-2'-hydroxyphenyl)-5-chloro-benzotriazole (Ciba Geigy Corp.)], "TINUVIN" 328 [2-(3',5'-di-n-pentyl-2'-hydroxyphenyl)-benzotriazole (Ciba Geigy Corp.)], "CYASORB" UV 24 (2,2'-dihydroxy-4-methoxy-benzophenone (manufactured by American Cyanamid Co., Wayne, N.J.)] and combinations thereof, where a suitable range of the ultraviolet stabilizing agents is from about 0.2% (w/v) to about 40% (w/v), with about 5% (w/v) to about 15% (w/v) being preferred. The ultraviolet stabilizing agent should be chosen with an eye toward avoiding an adverse affect on performance and electrolyte function.

In addition, ultraviolet absorbing interlayers may be coated onto, or adhered to, the first substrate and/or second substrate, particularly the first substrate, to assist in shielding the electrochromic element from the degradative effect of ultraviolet radiation. Suitable ultraviolet absorbing interlayers include those recited in Lynam III.

Moreover, to assist in extending the lifetime of the electrochromic device, the electrochromic solid film may be placed onto the inward surface of the second substrate—i.e., coated onto either the reflective element or the substantially transparent conductive electrode coating depending on the particular construction. Location of the electrochromic solid film on the inward surface of the second substrate may be desirable where an electrochromic rearview mirror suitable for use on the exterior of a motor vehicle is intended to be exposed to outdoor weathering, including exposure to ultraviolet radiation.

It may also be desirable to employ ultraviolet absorbing glass or laminates thereof for the first substrate or for the second substrate in an electrochromic mirror, particularly for the first substrate, or for the first substrate and/or the second substrate in an electrochromic device. Suitable ultraviolet absorbing glass include that which is recited in Lynam IV. In addition, it may be desirable to employ tin oxide, doped tin oxide, zinc oxide or doped zinc oxide as a substantially transparent conductive electrode coating on the inward surface of the first substrate, ultraviolet stabilizing agents in the electrolyte, ultraviolet absorbing interlayers, ultraviolet absorbing glass and combinations thereof in conjunction with positioning the electrochromic solid film on the inward surface of the second substrate. Such constructions, particularly with additional ultraviolet stabilizing agents included in the electrolyte as described supra, facilitate screening and/or absorption of ultraviolet radiation by the components used in the electrochromic mirror or electrochromic device, including the first substrate, the conductive electrode coating thereon, and the electrolyte and its components that are positioned effectively in front of the potentially ultraviolet sensitive electrochromic solid film.

Addition of ultraviolet stabilizing agents may be particularly advantageous when the electrochromic solid film 7 is coated onto conductive electrode 4' on the inward surface of substrate 3. (See FIG. 5.) In this construction, the ultraviolet stabilizing agents may act to screen and/or absorb incident ultraviolet radiation before it reaches the electrochromic solid film 7. By so doing, the chance of irradiating the potentially photochromic or otherwise ultraviolet radiation vulnerable electrochromic solid film 7 may be reduced or even substantially eliminated. In contrast, when coated onto substantially transparent conductive electrode 4 on the inward surface of substrate 2 (see FIG. 4), the electrochromic solid film 7 may be directly irradiated by any incident ultraviolet light that passes through substrate 2. The ultraviolet screening and/or absorbing affect of the electrolyte, which in this construction is now positioned behind the electrochromic solid film 7, has less of an opportunity to shield the electrochromic solid film 7 from incident ultraviolet light (although the electrolyte may effectively absorb any ultraviolet light which is reflected from the reflective element on substrate 3).

Those of ordinary skill in the art may make appropriate choices among the various materials available as described herein for the substrates, coatings, electrochromic solid films and electrolyte components—e.g., redox reaction promoters, sources of alkali ions and/or protons, solvents, and other components—to prepare electrochromic mirrors and electrochromic devices capable of generating a substantially non-spectral selective gray color suitable for the desired application. In addition, while glass is a suitable choice of material from which the substrates may be constructed, other materials may be used, such as optical plastics like acrylic, polycarbonate, polystyrene and allyl diglycol carbonate (commercially available from Pittsburgh Plastic Glass Industries, Pittsburgh, Pa. under the tradename "CR-39").

Reference to the figures will now be made in order to more faithfully describe the electrochromic devices, particularly the electrochromic mirrors, of the present invention.

Figures 3A, 3B:
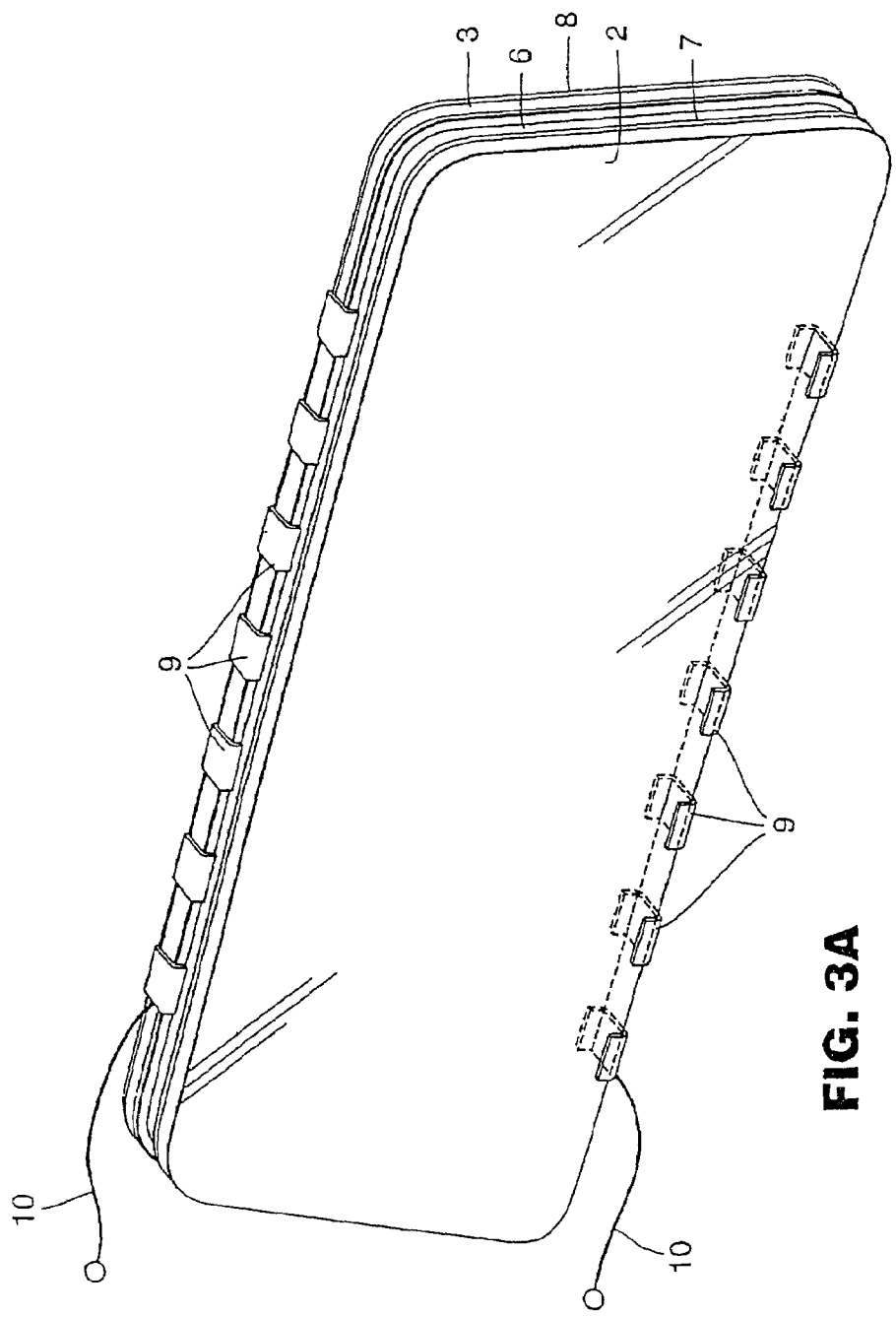
FIG. 3A depicts a perspective view of an electrochromic mirror—i.e., an interior rearview automobile mirror—according to the present invention.
FIG. 3B depicts a cross-sectional view of the electrochromic mirror of FIG. 3A.
Figure 4:
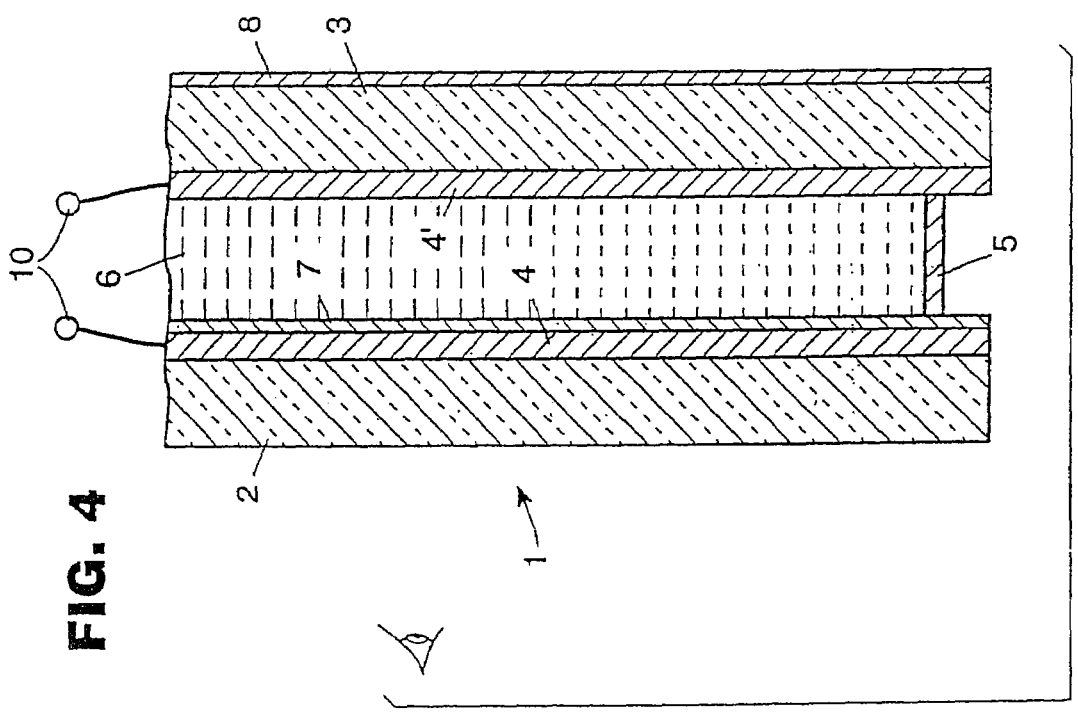
FIG. 4 depicts another cross-sectional view of the electrochromic mirror of FIGS. 3A and 3B.

With reference to FIGS. 3A, 3B and 4, it may be seen that the electrochromic element 1 includes a front substrate 2 and a rear substrate 3, each of which is typically glass. However, as described in detail hereinafter, in certain mirror constructions only the front or first substrate 2 needs to be at least substantially transparent, and in those constructions the rear or second substrate 3 need not be transparent at all. (See FIG. 5.) In fact, substrate 3 may be a polished metal plate, a metal-coated glass substrate or a conductive ceramic material.

By convention, the first substrate 2 (the frontmost or outermost substrate) is the substrate of the electrochromic device positioned closest to any principal source of incoming or incident electromagnetic radiation and, in an electrochromic mirror, the second substrate 3 is the substrate onto which a layer of reflective material 8 is coated. Put another way, the first substrate 2 is the substrate into which a driver of or passenger in a motor vehicle may first look through to view an image. In an electrochromic device, such as a glazing, a window or a sun roof for a motor vehicle, the first substrate 2 is the substrate exposed directly to, and often in contact with, the outdoor environment and is exposed directly to solar ultraviolet radiation.

Substrates 2, 3 should be positioned substantially parallel to one another if planar (or positioned substantially tangentially parallel to one another if bent), or as close to parallel (or tangentially parallel) to one another as possible so as to minimize image separation which may lead to double imaging. Double imaging is particularly noticeable when mirrors are colored to a dimmed state. Double imaging may be further minimized in mirror constructions as described hereinafter.

Onto each of the inward surfaces of substrates 2, 3 is coated a conductive electrode coating 4 or 4'. The conductive electrode coatings 4, 4' may be constructed from the same material or different materials, including transparent electronic conductors, such as tin oxide; indium tin oxide ("ITO"); half-wave indium tin oxide ("HW-ITO"); full-wave indium tin oxide ("FW-ITO"); doped tin oxides, such as antimony-doped tin oxide and fluorine-doped tin oxide; doped zinc oxides, such as antimony-doped zinc oxide and aluminum-doped zinc-oxide, with tin oxide, doped tin oxide, zinc oxide or doped zinc oxide being preferred where long-term ultraviolet resilience is desired in the device.

In certain mirror constructions, the conductive electrode coating 4' need not be substantially transparent. Rather, the layer of reflective material that serves as the reflective element of the mirror (with any other coatings used to form a thin film stack) may also serve as conductive electrode coating 4', thereby allowing a potential to be applied to the electrochromic element 1. Suitable materials for this layer of reflective material include metals, such as aluminum, palladium, platinum, titanium, chromium, silver, nickel-based alloys and stainless steel, with a high reflector (having a reflectance greater than about 70%), like silver or aluminum, being preferred. However, where resistance to scratching and environmental degradation is a concern, a medium reflector (having a reflectance within the range of about 40% to about 70%), like chromium, stainless steel, titanium and nickel-based alloys, is preferred. As an alternative to the use of these metals as a reflective element, multi-coated thin film stacks of inorganic oxides, halides, nitrides or the like, or a thin film layer of high index material may also be used.

The conductive electrode coatings 4, 4' may be thin films of metal, such as silver, aluminum and the like, with a thickness of less than about 200 Å, which may be as low as less than about 100 Å, so that the conductive electrode coatings 4, 4' are sufficiently conductive yet sufficiently transmissive. It may be desirable to index match a thin film of metal through the use of a thin film layer of a transparent metal oxide, metal nitride, metal halide or the like, such as indium oxide, zinc oxide, tin oxide, magnesium fluoride, titanium nitride, silicon dioxide, tungsten oxide or titanium dioxide, either as an overcoat or an undercoat to the thin film of metal to assist in reducing its reflectance, and increasing its transmittance, of incident visible light [see e.g., commonly assigned U.S. Pat. No. 5,239,406 (Lynam) ("Lynam VI")].

For example, a layer of a metal, such as silver, preferably having a thickness of less than about 200 Å and a sheet resistance of less than about 12 ohms per square (more preferably, less than about 10 ohms per square, and most preferably, less than about 8 ohms per square), may be overcoated with a metal oxide transparent conductor [such as a thin film layer of indium oxide (itself either undoped or doped with tin to form indium tin oxide)] and/or undercoated with a metal oxide layer [such as a thin film layer of indium oxide (itself either undoped or doped with tin to form indium tin oxide)] to form a substantially transmitting multi-layer transparent conductor on a glass surface. The sheet resistance of the multi-layer transparent conducting stack is preferably less than about 10 ohms per square, more preferably less than about 8 ohms per square, and most preferably less than 6 ohms per square. The transmission of visible light through the multi-layer transparent conductor coated glass substrate (which ordinarily comprises glass/metal oxide/metal/metal oxide or glass/metal/metal oxide such that the outermost metal oxide layer overcoating the thin metal layer serves as a barrier coating to reduce or prevent direct contact between the potentially electrochemically vulnerable metal layer and any electroactive medium, such as an electrochemically active liquid, thickened liquid and the like, that contacts the multi-layer transparent stack) is preferably greater than about 70%, more preferably greater than about 80%, and most preferably greater than about 85%.

Though silver is a preferred metal in such multi-layer transparent conducting stacks, aluminum may also be employed, particularly where the optical design of the multi-layer stack is optimized to maximize overall light transmission. Also, the outermost overcoating metal oxide layer should be at least somewhat, and preferably significantly, conducting so as not to form an electrical insulating overcoat on the metal layer. The sheet resistance for such a metal oxide layer should be less than about 2,000 ohms per square, with less than about 1,000 ohms per square being preferred and less than about 500 ohms per square being more preferred. This overcoating metal oxide layer may be any at least partially conducting, substantially transparent metal oxide such as tin oxide (doped or undoped), indium oxide (doped or undoped), zinc oxide (doped or undoped) and cadmium stannate. The thickness for the overcoating metal oxide layer (as well as the thickness of any undercoating metal oxide layer) is preferably less than about 500 Å, more preferably less than about 300 Å, and most preferably less than about 200 Å.

Such multi-layer transparent conducting stacks are preferably deposited using in-line sputter deposition chambers with either planar or rotary magnetron targets, and with deposition of the metal oxide layers being achieved either by reactive deposition of an oxide coating by sputtering from a metal target (or from a conductive, pressed oxide target) in an oxygen-rich atmosphere, or by radio-frequency ("RF") sputtering from an oxide target. An example of a multi-layer transparent conducting stack is glass/ITO/Ag/ITO, with the thickness of the ITO layers being in the range of about 100 to about 300 Å and the thickness of the silver layer being in the range of about 80 to about 200 Å.

An economical electrochromic rearview mirror may be fabricated by using clear glass as a front substrate, substrate 2, (preferably constructed from float glass) which is coated on its inwardly facing surface with a substantially transmitting, multi-layer transparent conductor comprising at least a thin metal layer overcoated with a transparent conductor metal oxide. For instance, a soda-lime glass substrate coated with indium tin oxide (having a thickness of about 150 Å)/silver (having a thickness of about 150 Å)/indium tin oxide (having a thickness of about 150 Å) may be used for the front substrate, substrate 2. The rear substrate, substrate 3, is coated with a metal reflector (such as silver, aluminum, chromium, titanium, nickel-based alloys like Hastelloy, iron-based alloys like stainless steel, and the like), which also serves as the electrical conductor on substrate 3. An electrochromic medium is disposed between the two confronting inwardly facing conductor surfaces. An example of such a construction is glass/indium tin oxide (having a thickness of about 150 Å)/silver (having a thickness of about 150 Å)/indium tin oxide (having a thickness of about 150 Å)//electrolyte//tungsten oxide (having a thickness of about 6,000 Å)/aluminum (having a thickness of about 2,000 Å)/chromium (having a thickness of about 1,000 Å)/glass, which construction is economical to manufacture as the total thickness of the metal oxide transparent conducting ITO layer is only about 300 Å. This total thickness compares favorably to the use of a half wave or full wave ITO layer with a thickness of about 1,500 Å or 3,000 Å, respectively.

The sheet resistance of the conductive electrode coated glass substrates 2, 3 should be less than about 100 ohms per square, with less than about 20 ohms per square being preferred. (However, as described in greater detail hereinafter, for reasons of economy it may sometimes be preferable to use substantially transparent conductive electrodes having a sheet resistance of greater than about 20 ohms per square.) Conductive electrode coated glass substrates are available commercially. For instance, ITO-coated glass substrates made from a glass substrate having deposited thereon a conductive coating of indium oxide that has been doped with tin oxide may be obtained from Donnelly Corporation, Holland, Mich. In addition, tin oxide-coated glass substrates, known as "TEC-Glass" products, may be obtained from Libbey-Owens-Ford Co., LOF Glass Division, Toledo, Ohio.

The "TEC-Glass" products are manufactured by an on-line chemical vapor deposition process: This process pyrolytically deposits onto clear float glass a multi-layer thin film structure, which includes a microscopically thin coating of fluorine-doped tin oxide (having a fine grain uniform structure) with additional undercoating thin film layers disposed between the fluorine-doped tin oxide layer and the underlying glass substrate. This structure inhibits reflected color and increases light transmittance. The resulting "TEC-Glass" product is a non-iridescent glass structure having a haze within the range of from about 0.1% to about 5%; a sheet resistance within the range of from about 10 to about 1,000 ohms per square or greater; a daylight transmission within the range of from about 77% to about 87%; a solar transmission within the range of from about 64% to about 80%; and an infrared reflectance at a wavelength of about 10 μm within the range of from about 30% to about 87%. See e.g., U.S. patent application Ser. No. 08/061,742, filed May 17, 1993, now U.S. Pat. No. 5,424,865, the disclosure of which is hereby incorporated herein by reference.

Examples of the "TEC-Glass" products include "TEC 10" (10 ohms per square sheet resistance), "TEC 12" (12 ohms per square sheet resistance) and "TEC 20" (20 ohms per square sheet resistance) tin oxide-coated glass. More specifically, "TEC 10", for instance, is made from an on-line pyrolytically-coated float glass, onto which has been coated a fluorine-doped tin oxide layer containing as an undercoat an anti-iridescence means. This anti-iridescence means includes a double layer composed of a layer of silica-silicone deposited onto a layer of tin oxide.

The specific resistivity of the conductive electrode coatings 4, 4' useful in the present invention may be between about $5 \times 10^{-3}$ to about $1 \times 10^{-6}$ ohm. centimeter, depending on the material from which the conductive electrode coatings 4, 4' are constructed, and on the method of deposition and formation of the conductive electrode coatings 4, 4'. For instance, where the conductive electrode coatings 4, 4' are ITO, the specific resistivity is typically within the range of about $1 \times 10^{-4}$ to about $3 \times 10^{-4}$ ohm. centimeter. And where the conductive electrode coatings 4, 4' are doped tin oxide, the specific resistivity is typically within the range of about $3 \times 10^{-4}$ to about $5 \times 10^{-3}$ ohm. centimeter. Where the conductive electrode coating 4' is a metal, the specific resistivity is typically less than about $5 \times 10^{-5}$ ohm. centimeter. And where the conductive electrode coating 4' is silver, the specific resistivity is typically less than about $3 \times 10^{-5}$ ohm. centimeter. The thickness of the metal should be such that the sheet resistance of conductive electrode coating 4' is less than about 0.75 ohms per square, preferably less than about 0.5 ohms per square and more preferably less than about 0.25 ohms per square. Preferably, the thickness of the metal used for conductive electrode coating 4' should be within the range of about 200 Å to about 5,000 Å, with a thickness within the range of 500 Å to about 2,500 Å being preferred and a thickness within the range of about 750 Å to about 1,500 Å being most preferred.

The substantially transparent conductive electrode coating 4 on the inward surface of substrate 2 is preferably highly transmissive in the visible spectrum; that is, with a light transmittance within the range of at least about 60% to greater than about 80%. Likewise, when the conductive electrode coating 4' on the inward surface of substrate 3 is to be highly transmissive, similar high light transmittance is desirable.

The conductive electrode coatings 4, 4' should also be highly and uniformly conductive in each direction to provide a substantially uniform response when a potential is applied to the electrochromic element 1. And, the conductive electrode coatings 4, 4' should be inert (physically, chemically and electrochemically inert) to the constituents of the electrochromic solid film 7 and the electrolyte 6.

Where the electrochromic solid film 7 is deposited as a coating onto the inward surface of either of conductive electrode coated glass substrates 2, 3, it is a barrier coating between whichever of the conductive electrode coatings 4, 4' it is deposited on and the electrolyte 6, as well as a barrier coating between the conductive electrode coatings 4, 4' themselves.

The electrochromic solid film 7 may be deposited using a variety of film deposition means including, but not limited to, vacuum deposition techniques, such as thermal evaporation, electron beam evaporation, sputter deposition, ion plating, laser-assisted deposition, microwave-assisted deposition and ion-assisted deposition; thermal spraying; pyrolytic deposition; chemical vapor deposition ("CVD"), including atmospheric CVD, plasma enhanced CVD, low pressure CVD and the like; wet chemical deposition, including dip coating, spin coating and spray coating; and thick film methods such as those used in the application of pastes and inks. Suitable deposition results may be obtained with wet chemical deposition as taught by and described in U.S. Pat. No. 4,855,161 (Moser); U.S. Pat. No. 4,959,247 (Moser); U.S. Pat. No. 4,996,083 (Moser); U.S. Pat. No. 5,252,354 (Cronin) and U.S. Pat. No. 5,277,986 (Cronin), the disclosures of each of which are hereby incorporated herein by reference.

It may be beneficial to deposit the electrochromic solid film using vacuum deposition, preferably with an electron beam evaporation technique where the electrochromic solid film 7 is tungsten oxide and is to be placed in direct contact with, or deposited (for example, with an alternate evaporation filament, crucible, boat or an alternate electron beam gun assembly, or the like) as a layer on, the inward surface of substrate 3, which is already coated with a layer of reflective material that serves the dual role as a reflective element and a conductive electrode coating 4'.

The layer of reflective material, which also serves as a conductive electrode coating 4', with or without any adhesion enhancing undercoat layers (discussed hereinafter), may be deposited on the inward surface of substrate 3, with tungsten oxide deposited as an overcoat, without the need to refixture, break vacuum or the like. Thus, it is seen that such a dual purpose reflective element may be deposited with manufacturing ease and economy. This is particularly so when compared with conventional mirror constructions where the reflective element is coated over the rearmost (non-inward) surface of a substrate (which itself is coated with a substantially transparent conductive electrode coating on the opposite, inward surface) in one operation, and thereafter loaded into a vacuum chamber to deposit tungsten oxide onto the other surface of the substrate, which is coated with a substantially transparent conductive electrode.

When vacuum depositing the electrochromic solid film 7 by evaporation or the like, a backfill pressure in a vacuum chamber within the range of about $1 \times 10^{-4}$ torr to greater than about $5 \times 10^{-4}$ torr may be used. This backfill pressure may typically be achieved by evacuating the vacuum chamber to some lower base pressure (e.g., less than about $5 \times 10^{-5}$ torr) and then backfilling the vacuum chamber with a gas such as nitrogen, argon, krypton, oxygen, water vapor and the like, or combinations thereof, to elevate the pressure in the vacuum chamber to a desired backfill pressure. Alternatively, the vacuum chamber may be pumped from atmospheric pressure down to about a pressure within the range of about $1 \times 10^{-4}$ torr to greater than about $5 \times 10^{-4}$ torr, and tungsten oxide, for instance, may then be evaporated onto the desired surface of substrates 2, 3. It may be desirable during such vacuum deposition to monitor and to control the pressure within the vacuum chamber using pumps, valves and closed loop controls as is known in the vacuum deposition art.

It may be useful to maintain a relatively constant backfill gas pressure during evaporative deposition of the inorganic oxide solid electrochromic film layer, or of other layers such as an adhesion promoter layer and a reflector layer. For example, when evaporating tungsten oxide in the presence of a backfill gas pressure at a desired set backfill pressure, it is usually desirable to first pump the chamber from atmospheric pressure to a base pressure of about 0.1 times the desired backfill pressure. By so doing, the, backfill pressure should remain constant during deposition and not be perturbed by outgasing from chamber walls, fixtures and, the like.

Figure 7:
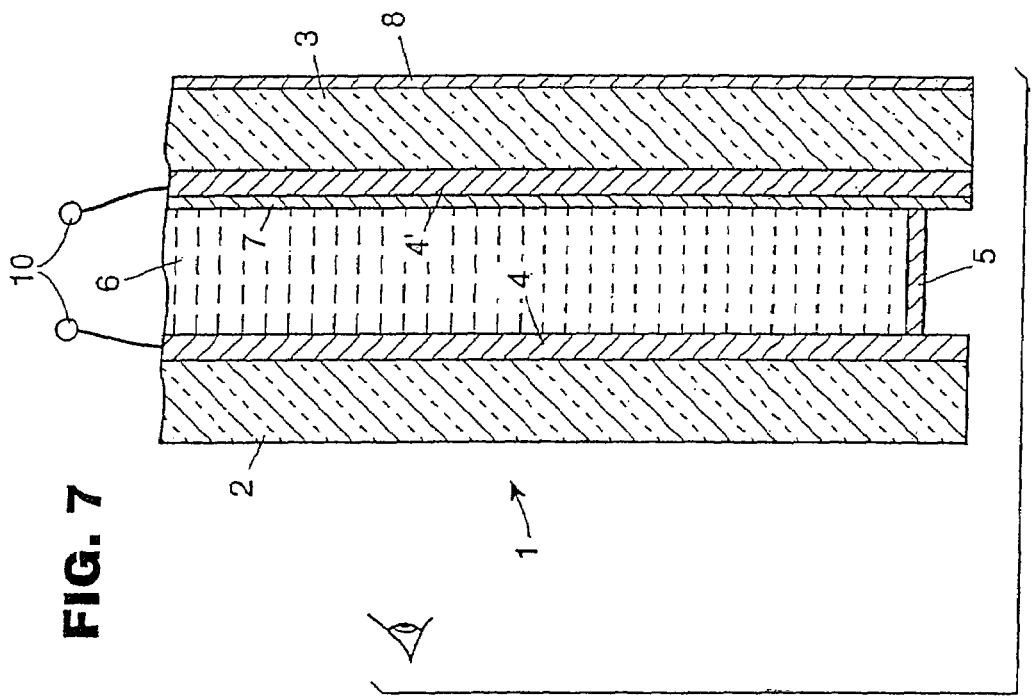
FIG. 7 depicts a cross-sectional view of yet another electrochromic mirror construction according to the present invention.

With reference to FIG. 4, the conductive electrode coatings 4, 4' in the mirror construction so depicted are substantially transparent. Likewise, in the mirror construction depicted in FIG. 7, conductive electrode coatings 4, 4' and substrate 3 are substantially transparent.

Figure 5:
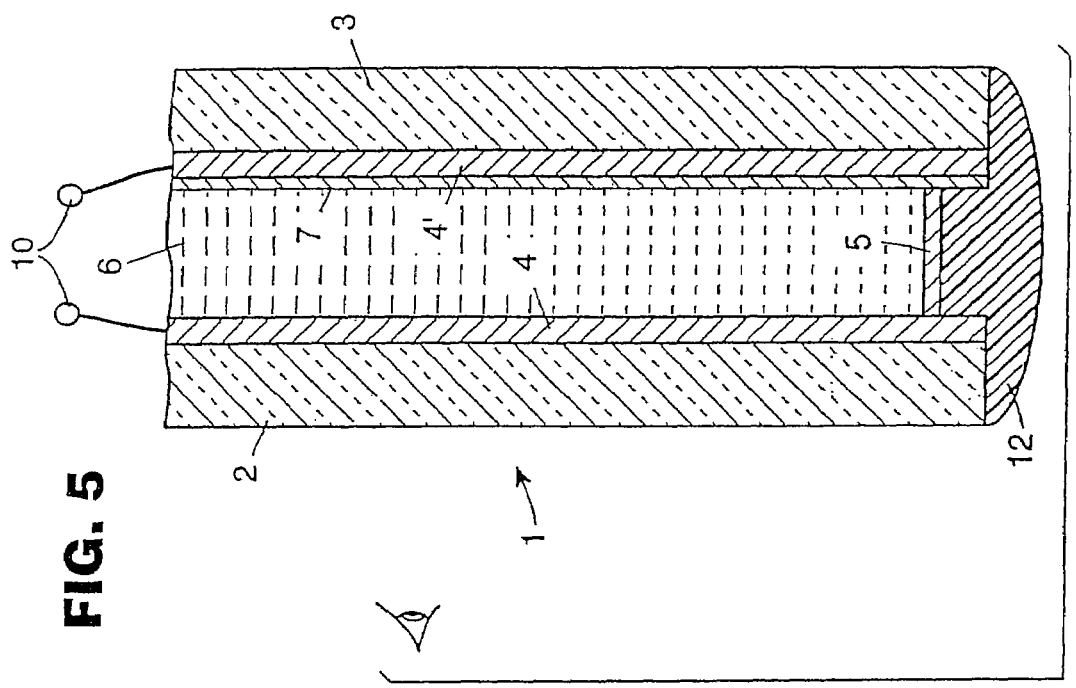
FIG. 5 depicts a cross-sectional view of another electrochromic mirror construction according to the present invention. In this construction, a secondary weather barrier 12 has been applied to the joint, at which sealing means 5 joins substrates 2, 3.

With reference to FIG. 5, however, only the conductive electrode coating 4 of the first substrate 2 in the mirror construction so depicted need be substantially transparent; that is, the conductive electrode coating 4' need not be substantially transparent. In addition, the second substrate 3 need not be substantially transparent. In this aspect of the present invention, the layer of reflective material may be coated directly onto the inward surface of the second substrate 3 to serve as the conductive electrode coating 4' as well.

Onto one of conductive electrode coatings 4, 4' is deposited a coating of an electrochromic solid film 7, such as an inorganic transition metal oxide, like tungsten oxide. As noted herein, where photochromism may be a concern, the electrochromic solid film 7 should be positioned at the inward surface of substrate 3 (which surface is coated with conductive electrode coating 4'). By so doing, the electrochromic solid film 7 should benefit from the ultraviolet screening and/or absorbing capabilities of the components of the mirror positioned in front of it and closer to incident light.

Silver or aluminum are suitable choices for conductive electrode coating 4' of substrate 3 because either metal may serve as a reflective element for the mirror and metal coatings in general are significantly more conductive than semiconducting oxides, such as ITO or doped tin oxide. As a consequence of using a thin film of metal as conductive electrode coating 4', the substantially transparent conductive electrode coating 4 of substrate 2 may be chosen with an eye toward higher sheet resistance, such as, for example, about 40 to about 100 ohms per square. This is desirable because conductive electrode coatings of higher sheet resistance are typically thinner and less expensive than conductive electrode coatings of lower sheet resistance. ITO or doped tin oxide are suitable choices for substantially transparent conductive electrode coating 4 used in conjunction with a thin film of metal as a reflective element, such as silver or aluminum, that is to serve as conductive electrode coating 4'. In addition, the use of such a thin film of metal as conductive electrode coating 4' permits the conductive strip or clip connectors (known as "bus bars") to be reduced in length, even to a point contact, on conductive electrode coating 4', rather than being used about a substantial portion of the periphery. That is, bus bars 9 may be attached at only a portion of the thin film of metal and still apply an adequate potential across the conductive electrode coatings 4, 4'.

Moreover, use of the reflective element of the mirror as the conductive electrode coating 4' is also appealing from a production standpoint. Such use reduces material and manufacturing costs since an additional electrode layer or reflective element need not be provided. In addition, this dual purpose reflective element/conductive electrode coating is environmentally appealing because it is no longer necessary to enhance resistance to degradation, such as environmental degradation, by applying a paint overcoat, which may be lead-based. In addition, such conventional reflective elements located on the rearmost surface of the mirror construction are typically opaque, and, as described hereinafter, such opacity may result in additional manufacturing effort should an "on demand display" be desirable in a particular mirror construction.

Between the layer of reflective material, typically silver, and the surface of substrate 3 to which it is applied, may desirably be coated a thin film adhesion enhancing means to act as an adhesion promoter ("adhesion promoter"). (See FIG. 6.) The adhesion promoter 11 enhances long-term adhesion of the layer of reflective material to the surface of substrate 3. It is known in the art that there are certain difficulties in adhering a reflective material such as silver to a substrate such as glass, especially where the reflective material is to be deposited by a vacuum deposition process such as evaporation. The adhesion promoter 11 of the present invention overcomes these difficulties and provides a practical way of applying a coating which will function as a dual purpose reflective element/conductive electrode in an electrochromic mirror.

Suitable adhesion promoters 11 include thin films of metal and metal oxides that provide enhanced adhesion over a silver to glass interface, such as chromium, stainless steel, nickel-based alloys (e.g., Hastelloy), titanium, monel, nichrome, molybdenum, metal oxides (e.g., silver oxide, aluminum oxide, indium oxide, indium tin oxide, tin oxide, doped tin oxide, zinc oxide, doped zinc oxide and chromium oxide) and the like. The use of thin films of metal or conducting metal oxides (such as indium tin oxide and doped tin oxides) as adhesion promoters as described herein is advantageous in view of their low cost (due to the relative simplicity of evaporating metal onto a surface of a substrate to form metal or metal oxide coatings), their electrical conductivity that augments that of conductive electrode coating 4', and their mechanical hardness. In addition, use of such thin films of metal or conducting metal oxides as adhesion promoters which undercoat the layer of reflective material assist in maintaining the conductivity of the bus bars 9. This is particularly advantageous in the event a bus bar (e.g., a clip connector) should pierce through the layer of reflective material, because the adhesion promoter is a conductive material that sustains electrical continuity.

An adhesion promoter 11 may be an undercoat of a thin film of a single metal, a metal oxide, or a combination of a metal and a metal oxide. A method for promoting adhesion of the layer of reflective material to a surface of substrate 3 involves deposition, such as by vacuum evaporation or sputtering of a metal, typically silver, initially in an oxygen-rich atmosphere. In this atmosphere, a thin film of silver oxide is applied onto a surface of substrate 3. Then, by progressively decreasing the oxygen atmosphere to zero, a progressively decreased amount of oxide is formed with respect to the metal content in the thin film deposited on the substrate 3. Finally, with little to no oxygen remaining in the atmosphere, a thin film of silver may be built-up upon the previously formed undercoat of its own oxide/gradient oxide to form an adhesion-promoting layer between the surface of substrate 3 and the layer of reflective material. Likewise, chromium may be deposited initially as a thin film of chromium oxide in an atmosphere of enhanced partial pressure of oxygen, followed by deposition of a thin film of metallic chromium by depleting the supply of oxygen. Oxygen may be introduced again to permit the deposition of silver oxide, and finally with deposition of a thin film of metallic silver following in an inert atmosphere. The substrate may also be heated, such as to a temperature within the range of from about 100° C. to about 500° C. (and preferably within the range of from about 150° C. to about 400° C.), during reactive deposition of metal to form a metal oxide. Heating the substrate in this manner may assist reactive formation of the oxide from the metal and may further enhance adhesion. Moreover, a metal oxide, such as chromium oxide, silver oxide, aluminum oxide, indium oxide, tin oxide, titanium oxide or tantalum oxide, may be deposited, such as reactively deposited in an oxygen-rich atmosphere, by vacuum deposition (e.g., evaporation to sputtering) to form adhesion promoter 11.

The adhesion promoter 11 should have a thickness within the range of from about 10 Å to about 2,500 Å or greater, with about 50 Å to 1,000 Å being preferred.

Adhesion promoter 11 can be a single thin film coating or a stack of thin film coatings. For example, the inward facing surface of substrate 3 can first be coated with a conducting metal oxide adhesion promoter coating of indium tin oxide, which in turn is overcoated with a metal adhesion promoter coating of chromium, with this stack in turn being overcoated with a reflective coating of silver.

In addition to mirrors employing an electrochromic solid film, adhesion promoter 11 of the present invention may also be used in mirrors employing other types of electrochromic technology, such as electrochromic solution technology of the electrochemichromic type (e.g., Byker I, Byker II, Varaprasad I and Varaprasad III). Thus, adhesion promoter 11 may be used to construct electrochromic mirrors containing an electrochromic solution in which a single coating or stack of coatings functions as a dual purpose reflective element/conductive electrode.

For some applications, it may be desirable to prevent build-up of deposited materials (such as, tungsten oxide and/or silver) at a portion or portions of the inward surface of substrates 2 or 3 inboard from an edge thereof. In this regard, a magnetizable metal mask may be placed over the portion(s) where it is desired to prevent build-up of such deposited materials. The magnetizable metal mask may then be held at that portion of the substrate under a magnetic influence while the material is deposited. For example, a magnetizable metal mask may be placed at the desired location on the inward surface of substrate 3 prior to coating the inward surface thereof with an adhesion promoter (e.g. chromium), a layer of reflective material (e.g., silver) and a layer of an electrochromic solid film (e.g., tungsten oxide). A magnet may be placed on the rearmost surface of substrate 3 behind that location on the inward surface of substrate 3 to ensure that the mask is held in place. Upon removal of the mask after completion of deposition of the chromium/silver/tungsten oxide stack onto the inward surface of substrate 3, a deposition-free portion of that surface is formed.

As stated supra, the spaced-apart glass substrates 2, 3 have a sealing means 5 positioned therebetween to assist in defining the interpane spacing in which the electrochromic solid film 7 and the electrolyte 6 are located. The sealing means 5 may be constructed of any material inert (physically, chemically and electrochemically inert) to the electrochromic solid film 7 and the components of the electrolyte 6, as well as to any other material used in the device. To that end, the sealing means 5 may be chosen from the following materials including, but not limited to, various thermosetting materials, such as epoxy resins and silicones, various thermoplastic materials, such as plasticized polyvinyl butyral, polyvinyl chloride, paraffin waxes, ionomer resins, various inorganic materials and the like. For a further recitation of suitable sealing materials, see commonly assigned U.S. Pat. No. 5,233,461 (Doman).

The thickness of the sealing means 5 may vary from about 10 μm to about 1,000 μm. Preferably, however, this thickness is about 50 μm to about 100 μm.

In addition, the sealing means 5 may prevent escape of the electrolyte 6, when in a liquid-phase, from the electrochromic element 1 or penetration of environmental contaminants into the electrolyte, whether in a liquid-phase or in a solid-phase. Of course, when the electrolyte is in a solid-phase, leakage or seepage of the electrolyte from the mirror is not a concern, but contamination may be.

Desirably, the sealing means 5 comprises a polymer seal formed by the cure of a latent cure adhesive formulation, such as a latent cure epoxy. Such latent cure adhesive formulations, as known in the adhesives arts, comprise an adhesive system (for example, a latent cure epoxy system). A latent cure adhesive system is sometimes referred to as a one-package system since it is supplied in an uncured or only partially cured form in a single package and thus does not require the mixing together of two or more components (such as a resin and a separate hardener as is common with many adhesive systems like two-component epoxy systems). This obviates the need to mix together two or more components when forming the sealing means 5.

Latent cure epoxies typically have a relatively long pot life (e.g., hours to days at room temperature), and so do not appreciably set up and harden at room temperature. However, when exposed to an elevated temperature (which depends on the chosen resin and latent curing agent and typically, for the preferred systems used in this present invention, with the activation temperature being at least about 60° C., and more preferably at least about 90° C.), they cure rapidly to attain their intended cure and bond-strength. Thus, latent cure epoxies have a temperature of activation, below which substantial cure is not initiated, but above which relatively rapid cure is achieved. Such systems may be advantageously employed as the seal material in the electrochromic cells of the present invention. Also, latent cure adhesives are particularly amenable to commercial scale manufacture of electrochromic devices such as electrochromic rearview mirrors (whether by silkscreening or by direct dispensing from a needle valve dispenser). These latent cure adhesives have a long pot life so that a batch of adhesive may be used over many hours of production with the assurance that the adhesive will not unduly age due to room temperature cure (which can lead to inconsistency and potential unreliability in the seal so formed). These latent cure adhesives allow for ease and economy of manufacture since by using such one-package, latent cure systems, silkscreens and dispenser systems will not become clogged or obstructed due to room temperature-induced hardening of the seal adhesive system, and the viscosity of the adhesive system remains relatively constant throughout the production day. Clean-up is also facilitated due to a reduction and near elimination of prematurely hardened adhesive on silkscreens or within, for instance, dispenser tubing, needles, and the like.

One-package, latent cure adhesive formulations useful in forming the sealing means 5 may typically include a resin (preferably, an epoxy resin such as EPON Resin 828 commercially available from Shell Chemical Company, Houston, Tex.), and a latent curing agent (such as a dicyandiamide, a modified amine, an organic acid anhydride, a microencapsulated amine, an epoxide adduct encapsulated in a polymerized polyfunctional epoxide, and an adipic dihydrazide). Latent curing agents are commercially available, such as from Air Products and Chemicals Incorporated, Allentown, Pa. under the tradenames ANCAMINE® 2014AS and ANCAMINE® 2014FG. These latent curing agents are modified amines. Other latent curing agents, such as imidazole-based systems, may also be used. These imidazole-based latent curing agents are also commercially available from Air Products and Chemicals Incorporated under the tradenames IMCURE® (such as, IMCURE® AMI-2) and CUREZOL™ (such as, CUREZOL™ 2E4MZ, 1B2MZ, 2PZ, C17Z, 2MZ Azine, 2PHZ-5 and 2MA-OK). Also, latent curing agents are commercially available from AJINOMOTO Incorporated, Teaneck, N.J. under the tradename AJICURE®, examples of which include AJICURE® PN-23 and AJICURE® MY-24. Latent cure adhesives, such as latent cure epoxies, optionally and desirably, include fillers (such as, silica-based fillers like IMSIL A-8, which is commercially available from UNIM Specialty Minerals Incorporated, Elco, Ill., and calcium carbonate-based fillers like SS-14066 HUBERCARB OPTI-FILL, which is commercially available from J. M. Huber Corporation, Quincy, Ill.), and coupling agents (useful as adhesion promoters) like the silane coupling agents listed in Table I below:

TABLE I

| SILANE/ COMMERCIAL SUPPLIER | CHEMICAL NAME |
|---|---|
| Z6020, Dow Corning | N-(2-aminoethyl)-3-aminop-propyltrimethoxy silane |
| Z6032, Dow Corning | N-[2-vinyl,benzylamino-ethyl]-3-aminopropyltrixmethoxy silane |
| Z6076, Dow Corning | 3-chloropropyltrimethoxy silane |
| A187, Union Carbide | γ-glycidoxypropyltrimethoxy silane |
| A1100, Union Carbide | γ-aminopropyltriethoxy silane |
| A174, Union Carbide | γ-methacryloxypropyltrimethoxy silane |
| Aldrich Chemicals | 2-dichloropropyltrimethoxy silane |
| Aldrich Chemicals | diphenyldiethoxy silane |
| Q1-6101, Dow Corning | proprietary organic trimethoxy silane |

Coloring agents (such as, carbon black and heavy metal- or iron-based pigments) and spacer beads (such as, glass) may also be included. A particularly useful latent cure adhesive formulation for the commercial production of electrochromic rearview mirrors with good manufacturing economics and with excellent double image performance exhibited by the mated substrates comprises:

| Component | Type | Parts Per Hundred Parts of Resin | Type |
|---|---|---|---|
| Resin | EPON 8281 | — | Epoxy |
| Latent Curing Agent | ANCAMINE ®2014FG | 28 | Modified Amine |
| Filler | Calcium Carbonate | 30 | |
| Coloring Agent | Carbon Black | 1 | |
| Spacer Beads | Glass | 1 | |

This latent-cure adhesive formulation may either be silkscreened to form the sealing means 5 or may be applied using an automatic fluid dispensing system, such as a high speed, computer controlled fluid dispensing system supplied by ASYMTEK, Carlsbad, Calif. under the tradename AUTOMOVE 400, and the like. Use of a latent curing agent (which produces long-term stability at room temperature but rapid cure at elevated temperatures) in the adhesive formulation used to establish the sealing means 5 is particularly advantageous w/when using an automatic fluid dispensing system. In such a system, constancy and control of the fluid viscosity is facilitated, and consistency and precision of the bead of fluid adhesive dispensed around the perimeter of the substrate is also facilitated. Latent curing agents are particularly desirable when precision dispensing valves are used, such as a rotary positive displacement ("RPD") valve like the DV-06 valve commercially available from ASYMTEK.

Once the latent cure adhesive is screened or dispensed around the edge perimeter of a substrate, and after the second substrate is juxtaposed therewith to establish a cell with an interpane spacing, the latent cure adhesive may be rapidly cured by exposure to elevated temperatures, typically greater than about 60° C. Epoxy adhesive systems that use ANCAMINE® latent curing agents and that are cured by exposure to a temperature of at least about 110° C. for a period of time of about one hour, or less, perform excellently. What's more, the cured seal exhibits resilience when exposed to boiling water for a period of time in excess of 96 hours. The double image performance for such ANCAMINE®-cured mirror cells was also found to be superior to comparable two-component epoxy systems in that, during typical production of electrochromic rearview mirrors, double imaging measured from cells using the latent curing agent to effect a cure to form the sealing means 5 was consistently lower than comparably processed electrochromic rearview mirrors which used a two-component epoxy to form the sealing means 5. Also, the glass transition temperature ($T_g$) for the sealing means 5 formed by cure of a one-package, latent cure adhesive is preferably less than about 140° C., more preferably less than about 120° C. and most preferably less than about 100° C.

One package adhesive and sealing systems, that are supplied with a latent curing agent already incorporated in the adhesive formulation, are also commercially available. Such one part curing adhesives incorporate an integral hardener or catalyst and typically include a liquid epoxy resin and a dicyandiamide hardener. Examples include a one part epoxy adhesive commercially available from A1 Technology, Princeton, N.J., under the tradenames EH7580, ME 7150-SMT or ME 7155-ANC; a one part epoxy adhesive commercially available from American Cyanamid, Wayne N.J. under the tradename CYBOND 4802; and a one part epoxy commercially available from CHEMREX, Commerce City, Colo., under the tradename CHEMREX 7459-9772. Also, one part aerobic adhesive and sealing systems, which depend on oxygen or moisture in the air to activate or achieve cure, may also be used to form the sealing means 5. An example of such a one part aerobic adhesive and sealing system is moisture-activated silicone.

Double image performance in rearview mirrors is greatly assisted by the use of a vacuum-assisted sealing technique. An example of such a technique is a vacuum bag technique where, spacer means, such as spacer beads, are disposed across the surfaces of the substrates being mated, and a vacuum is used to better assure substrate to substrate conformity. It is preferable for at least one substrate (usually the first or front substrate) to be thinner than the other, and preferably for at least one substrate to have a thickness of 0.075" or less, with a thickness of 0.063" or less being more preferable, and with a thickness of 0.043" or less being most preferable. This improvement in double image performance is particularly desirable when producing convex or multi-radius outside mirror parts, and when producing large area parts (such as, Class 8 heavy truck mirrors), and especially when vacuum backfilling is used in their production.

Using a vacuum-assisted sealing technique, an uncured sealing adhesive (with spacer beads optionally included therein) may be dispensed around the periphery of a first substrate. Spacer beads, preferably glass beads capable of withstanding a load, are sprinkled across a surface of the second substrate and the first substrate is juxtaposed thereon. This mated assembly is then temporarily affixed (by temporary clamps, a temporary fixture, and the like), and placed within a vacuum bag (such as, a heavy duty "MYLAR" bag). The bag is then evacuated to a vacuum using a vacuum pump. Atmospheric pressure now evenly bears down on the surfaces of the substrates to be mated forcing conformance of the substrates to each other and to the precision glass spacers that are selected to establish the intended interpane spacing. The temporarily-fixed assembly (still within the vacuum bag) and thus under a pressure of at least 2 lbs./in$^2$ is then placed into an oven which is at atmospheric pressure (or into a heated autoclave which may be at several atmospheres pressure) so that the seal adhesive is caused to cure and to set. This may be performed either with vacuum retained by sealing the bag so as to render it airtight or with the hose to the vacuum pump still attached. Once the seal, typically an epoxy, cures and sets, the conformance of the substrates to the spacer beads and to each other is retained by the now-cured adhesive seal, even when the vacuum bag is vented and the fabricated part removed.

For exterior mirrors that have an area of at least about 140 cm$^2$, it is desirable to place at least some rigid spacer means (such as precision glass beads) at locations within the interpane space between the substrates in the laminate electrochromic cell. Preferably, such spacer beads are chosen to have a refractive index within the range of about 1.4 to about 1.6 so that they optically match the refractive index of the substrates (typically glass) and the electrolyte. These rigid spacer beads not only assist conformity and uniformity of interpane spacing, but also help maintain the integrity of peripheral seals on exterior rearview mirrors assemblies that use a liquid or thickened liquid. For instance, the peripheral seal may burst if an installer or vehicle owner presses on the mirror at its center and causes a hydraulic pressure build-up at the perimeter seal due to the compression of the fluid or thickened fluid at the part center. Use of such spacer beads, particularly when located at the center of the part within the interpane space, are beneficial in this regard whether the exterior rearview mirror is a flat mirror, convex mirror or multi-radius mirror, and is particularly beneficial when at least the first or front substrate (the substrate touched by the vehicle operator or service installer) is relatively thin glass, such as with a thickness of about 0.075" or less. Use of, for example, two substrates, each having a thickness of about 0.075" or less, for exterior rearview mirrors, including large area mirrors of area greater than about 140 cm$^2$, has numerous advantages including reduced weight (reduces vibration and facilitates manually- and electrically-actuated mirror adjustment in the mirror housing), better double-image performance, and more accurate bending for convex/multi-radius parts.

Also, for the sealing means 5, it is advantageous to use a somewhat flexible polymer seal material to reduce double imaging from mated substrates, and to improve hot/cold thermal shock performance for assemblies using a solid electrolyte. For example, the sealing means 5 may be a silicone such as, a one component, black, addition curing silicone polymer system (like those commercially available from Loctite Corporation, Newington, Conn. under the tradename VISLOX V-205) or a primerless, one-part, flowable adhesive that develops a strong, self-priming bond to glass (and coated glass) substrates (like those commercially available from Dow Corning, Midland, Mich. under the tradename Q3-6611). Alternatively, a thixotropic, one-part silicone elastomer adhesive, such as X3-6265 commercially available from Dow Corning, may be used to form the sealing means 5. Flexible epoxy resins may also be used to form the sealing means 5.

Standard epoxy resins based on bisphenol A and commonly used curing agents are typically brittle and need to be modified to give a tough and flexible cured system. Flexibilization of the resin system may be internally (commonly referred to as flexibilizing, which may be achieved through the use of long-chain aliphatic amines as parts of curing agents; the addition of aminated or carboxylated rubbers; the addition of carboxy-terminated polyesters; the addition of long-chain organic compounds containing hydroxyl-functional groups; the use of long-chain aliphatic epoxide materials including epoxidized oils), and externally using plasticizers. Internal flexibilization is preferable, such as is achieved when a typical epoxy resin (for example, with an epoxide equivalent weight of about 185) is flexibilized by addition of a difunctional primary amine curing agent, such as polyoxypropylene diamine commercially available from Texaco Chemical Company, Houston, Tex. under the tradename JEFFAMINE™ 400, and the like. Desirably, about 25-50 parts of any of the above-noted flexibilizers per hundred parts of resin may be used. Such flexibilized epoxy systems have a % elongation at break within the range of about 50 to about 150, compared to less than about 10, for rigid epoxies. In addition, urethane adhesive systems, such as FLEXOBOND 431 (which is a clear, two-part urethane system, commercially available from Bacon Industries, Watertown, Mass.) may be used.

Optionally, and desirably when oxygen permeable seal materials such as silicones are used, a double-seal may be used. In this case, a first seal (often, the inner seal when silicone and flexible systems are used) is screened/dispensed and a second seal of a different material (often, a rigid epoxy when the first seal is flexible) is screened/dispensed separately and distinctly from the first seal. Thus, for example, a bead of uncured silicone is screened/dispensed inboard, and around, the perimeter of a substrate, and a bead of uncured epoxy is then dispensed outboard of the silicone bead and around the edge of the substrate. Next, a second substrate is mated with the first substrate so that the double seal adhesive is sandwiched therebetween, and then both adhesive seals are cured in an oven to form the desired cured, double seal.

Figure 14A:
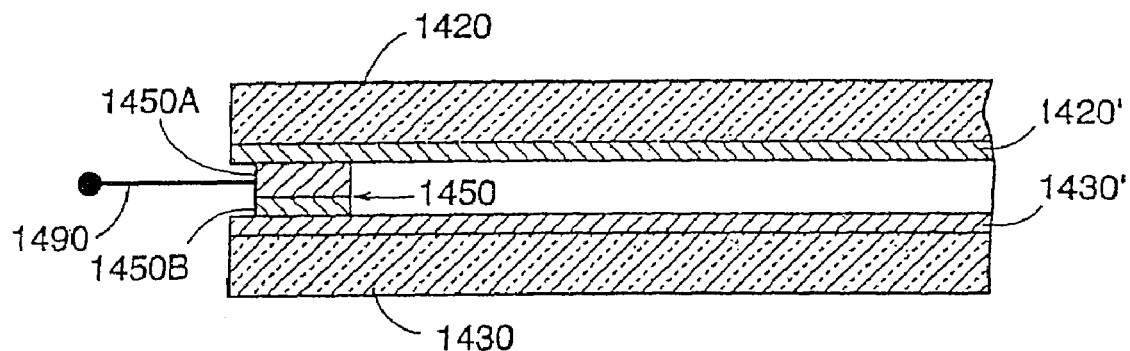
FIGS. 14A and B depict cross-sectional views of electrochromic devices, which illustrate different seal constructions that may be employed in accordance with the present invention.
Figure 14B:
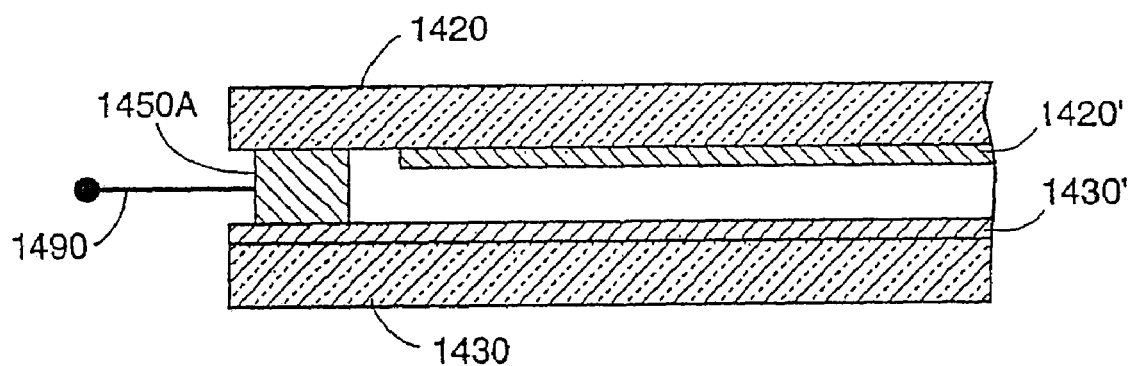

Also, whether the sealing means 5 is a single seal or a double seal, it may be desirable for the seal material to comprise a cured conductive adhesive so that the seal, or at least a portion thereof, may provide, in whole or at least in part, an electrical bus bar function around the perimeter of a substrate of the assembly. When using such a combined seal and bus bar, care should be taken to avoid electrically shorting the inward facing surfaces of substrates 2 and 3. To obviate this, a seal construction, such as that shown in FIG. 14-A, may be used. With reference to FIG. 14-A, substrates 1420 and 1430 are coated on their inwardly facing surfaces with electrical conductor electrodes 1420' and 1430'. The substrates 1420, 1430 are mated together with the compound seal 1450. The compound seal 1450 includes a conducting seal layer 1450A (formed, for example, of a conducting epoxy such as is described below) and a non-conducting, electrically insulating seal layer 1450B (formed, for example, of a conventional, non-conducting epoxy), which serves to insulate the two conducting electrodes from electrically shorting via conducting seal layer 1450A. Since the compound seal 1450 essentially circumscribes the edge perimeter of the part, the conducting seal layer 1450A (to which electrical potential may be connected to via the electrical lead 1490) serves as an electrically conductive bus bar that distributes applied electrical power more evenly around and across the electrochromic medium (not shown) sandwiched between the substrates 1420 and 1430.

Where the electrical conductor electrode 1420', 1430' on at least one of the opposing surfaces of the substrates 1420, 1430 is removed (or was never coated) in the region of the peripheral edge (as shown in FIG. 14-B), a unitary conducting seal (as opposed to the compound seal of FIG. 14-A) may be used. Reference to FIG. 14-B shows the electrically conducting seal 1450A joining the electrical conductor electrode 1430' on the surface of substrate 1430 to a bare, uncoated surface of opposing substrate 1420. Since the contact area of the conducting seal layer 1450A to the substrate 1420 is devoid of the electrical conductor electrode 1420', the conducting seal layer 1450A does not short the electrodes 1420' and 1430'. Conducting seal layer 1450A serves the dual role of bus bar and seal, yielding economy and ease in device fabrication and production. Conducting seal layer 1450A may form a single seal for the cell or may be one of a double seal formed, for example, when a conventional, non-conducting epoxy is used inboard of that conducting seal.

Figure 6:
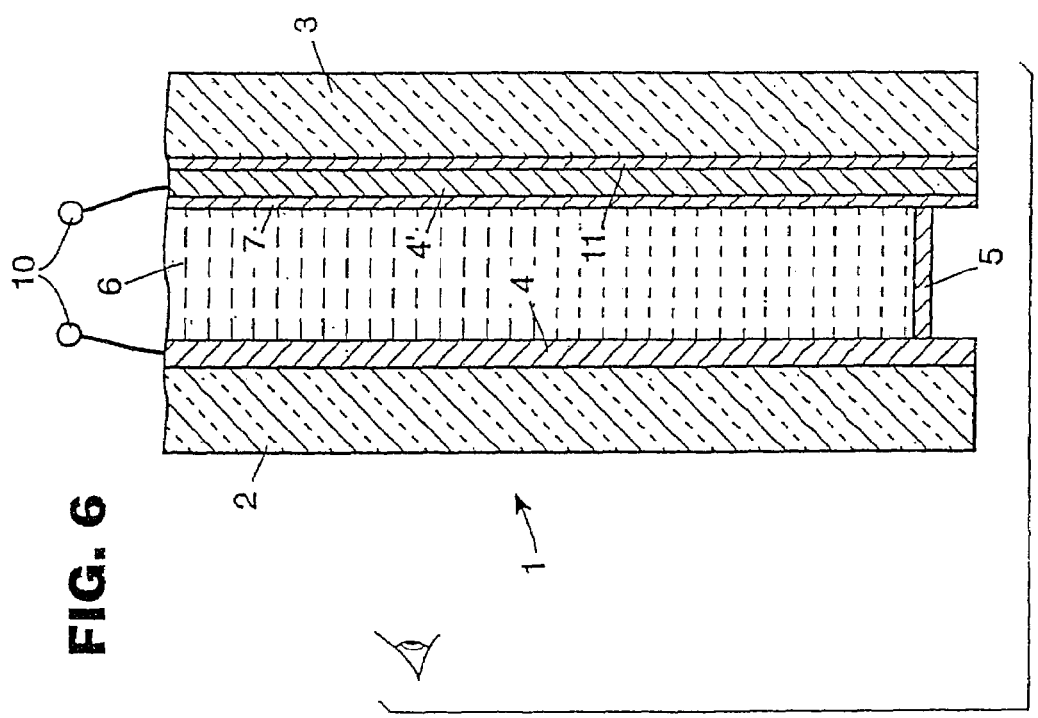
FIG. 6 depicts a cross-sectional view of still another electrochromic mirror construction according to the present invention. This mirror construction is similar to the mirror construction of FIG. 5, except that an adhesion promoter 11 is coated between substrate 3 and conductive electrode coating 4'.

Such a construction is particularly amenable to devices, such as those depicted in FIGS. 5 and 6. For instance, in a rearview mirror, a fixture can form a mask around the edge substrate perimeter, while an adhesion layer of chromium followed by a reflector layer of aluminum followed by an electrochromic layer of tungsten oxide are deposited. Once removed from such a coating fixture, the edges, as masked by the coating fixture, are uncoated and present a bare glass surface for joining via a conductive epoxy seal to an opposing transparent conductor coated substrate. In such a configuration, the conductive seal can serve as a bus bar for the transparent conductor coated substrate it contacts without shorting to the reflector/adhesion layers on the opposite substrate. Preferably, a fast curing, single component, silver filled, electrically conductive epoxy adhesive is used in such a construction, such as is commercially available from Creative Materials Incorporated, Tyngsboro, Mass. under the tradename CMI 1063T2A. Alternatively, 102-05F and 114-11 (also commercially available from Creative Materials Incorporated) electrically conductive inks may be used, which are solvent-resistant, electrically conductive adhesives (with a silver content of greater than about 85%, when cured).

Alternatively, a silver conductor polymer thick film composition, such as the one commercially available from E.I. du Pont de Nemours, Wilmington, Del. under the designation 5025, may be used. Du Pont 5025 is a screen-printable conductive ink that has an air dried sheet resistivity of about 12-15 m'Ω/square/mil. Thermoset silver inks may also be used, and are preferred over the air dried variety in terms of conductivity and sealing performance. Such thermoset silver inks are single-component, epoxy based inks, typically with a silver content greater than about 50%, with greater than about 75% being preferred, and are fired by exposure to a temperature of about 150° C. for a period of time of about one hour. A suitable thermoset conductive epoxy is 5504N, which is commercially available from Du Pont. Also, electrically conductive adhesives such as AREMCO-BOND 525 (commercially available from Aremco Products, Incorporated, Ossining, N.Y.), may be used. AREMCO-BOND 525 is an electrically conductive adhesive that cures when fired at a temperature of about 350° F. for a period of time of about one hour.

To enhance the integrity of a long-lasting seal in terms of seal resiliency, any electrochromic solid film 7 deposited toward the peripheral edges of one of the substrates 2, 3 may be removed so that a seal may be formed directly between a conductive electrode coating 4 of substrate 2 and a conductive electrode coating 4' of substrate 3—i.e., directly between at least a portion of the conductive electrode coated glass substrates 2, 3. This may be accomplished, for example, by depositing tungsten oxide onto larger sheets of glass and then cutting substrates therefrom. By so doing, the tungsten oxide coating extends to the cut edge of the substrate. A variety of removal means may then be employed to remove that portion of the coating from the substrate—up to less than about 2 mm to about 6 mm or thereabouts—inward from the peripheral edges of the substrates. These removal means may include chemical removal, such as with water or with a slightly acidic or basic aqueous solution; physical removal, such as with a blade; laser etching; sandblasting and the like. The conductive electrode coatings 4, >>>4' at the peripheral edge may also be removed in like fashion along with the tungsten oxide overcoat.

Alternatively, substrates 2, 3 may be pre-cut to a desired size and shape prior to depositing an electrochromic solid film 7 thereon. These pre-cut substrates may be loaded into a masking fixture to prevent deposition of the electrochromic solid film 7 a pre-determined distance from the edges of the substrates—such as, inward from the edge up to less than about 2 mm to about 6 mm. The masking system may also allow for small tab-out portions to facilitate electrical connection with the conductive electrode coatings 4, 4' and the electrochromic solid film 7 deposited in one and the same deposition operation. Of course, it may be possible to employ movable fixturing or to break vacuum and rearrange fixtures should tab-outs not be desired.

Moisture is known to permeate through electrochromic solid films, such as tungsten oxide. Thus, where sealing means 5 is positioned entirely or partially over the electrochromic solid film 7, a secondary weather barrier 12 may be advantageously employed about the periphery of the joint of the assembled laminate (see FIG. 5) to optimize seal integrity which may be compromised by such moisture permeation or permeation of other environmental degradants. Suitable materials for use as a secondary weather barrier 12 include adhesives, such as silicones, epoxies, epoxides and urethanes, which may be ultraviolet curable, room temperature curable or heat curable.

Commercially available adhesives include the cycloalkyl epoxides sold under the "CYRACURE" tradename by Union Carbide Chemicals and Plastics Co., Inc., Danbury, Conn., such as the "CYRACURE" resins UVR-6100 (mixed cycloalkyl epoxides), UVR-6105 (3,4-epoxycyclohexylmethyl-3,4-epoxycyclohexane carboxylate), UVR-6110 (3,4-epoxycyclohexylmethyl-3,4-epoxycyclohexane carboxylate) and UVR-6128 [bis-(3,4-epoxycyclohexyl)adipate], and the "CYRACURE" diluents UVR-6200 (mixed cycloalkyl epoxides) and UVR-6216 (1,2-epoxyhexadecane); those epoxides commercially available from Dow Chemical Co., Midland, Mich., such as D.E.R. 736 epoxy resin (epichlorohydrin-polyglycol reaction product), D.E.R. 755 epoxy resin (diglycidyl ether of bisphenol A-diglycidyl ether of polyglycol) and D.E.R. 732 epoxy resin (epichlorohydrin-polyglycol reaction product), and the NOVOLAC epoxy resins such as D.E.N. 431, D.E.N. 438 and D.E.N. 439 (phenolic epoxides), and those epoxides commercially available from Shell Chemical Co., Oak Brook, Ill., like the "EPON" resins 825 and 1001F (epichlorohydrin-bisphenol A type epoxy resins).

Other commercially available adhesives that are particularly well-suited for use herein as a secondary weather barrier 12 include those epoxides commercially available under the "ENVIBAR" tradename from Union Carbide Chemicals and Plastics Co., Inc., Danbury, Conn., such as "ENVIBAR" UV 1244T (cycloalkyl epoxides).

A secondary weather barrier 12 may be formed around the sealed joint between substrates 2, 3 at any point of contact between the sealing means 5 and the electrochromic solid film 7, using in the case of ultraviolet curable adhesives, commercially available curing systems, such as the Fusion UV Curing Systems F-300 B and F-450 [Fusion UV Curing Systems, Buffalo Grove, Ill.], Hanovia UV Curing System [Hanovia Corp., Newark, N.J.], RC-500 A Pulsed UV Curing System [Xenon Corp., Woburn, Mass.] and a Sunlighter UV chamber fitted with low intensity mercury vapor lamps and a turntable.

A source of an applied potential may be introduced to the electrochromic element 1 of the electrochromic minor by the electrical leads 10, which may be wire, solder and the like. The electrical leads 10 may typically be connected or affixed to bus bars 9, which themselves may typically be connected or affixed to the conductive electrode coatings 4, 4'. The bus bars 9 may be constructed from a variety of conducting materials including metals, alloys, solder such as ultrasonically-applied solder (e.g., Cerasolzer™ manufactured by the Asahi Glass Co., Tokyo, Japan), metal ribbon connecters, conducting polymers (e.g., conducting rubbers and conducting epoxies), conducting frits, such as silver frits [e.g., silver conductive frit #7713 (commercially available from E.I. du Pont de Nemours and Company, Wilmington, Del.)] and the like. A non-exhaustive recitation of such conducting materials may be found in Lynam IV. Bus bar materials such as conducting silver frits or solders may even overlap onto the cut edge of the substrate to facilitate connection of electrical leads in the flush assemblies of the invention.

Figure 11A:
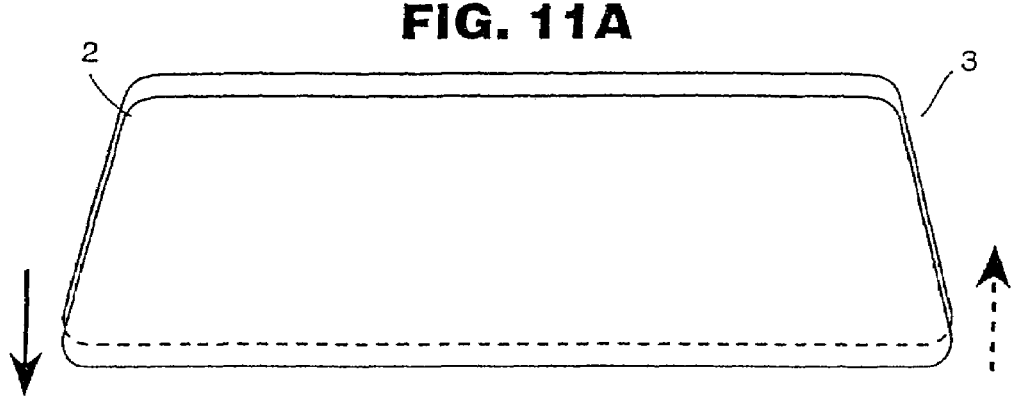
FIGS. 11A, B and C depict the orientation of the substrates in different constructions of the electrochromic mirrors and electrochromic devices of the present invention.
Figure 11B:
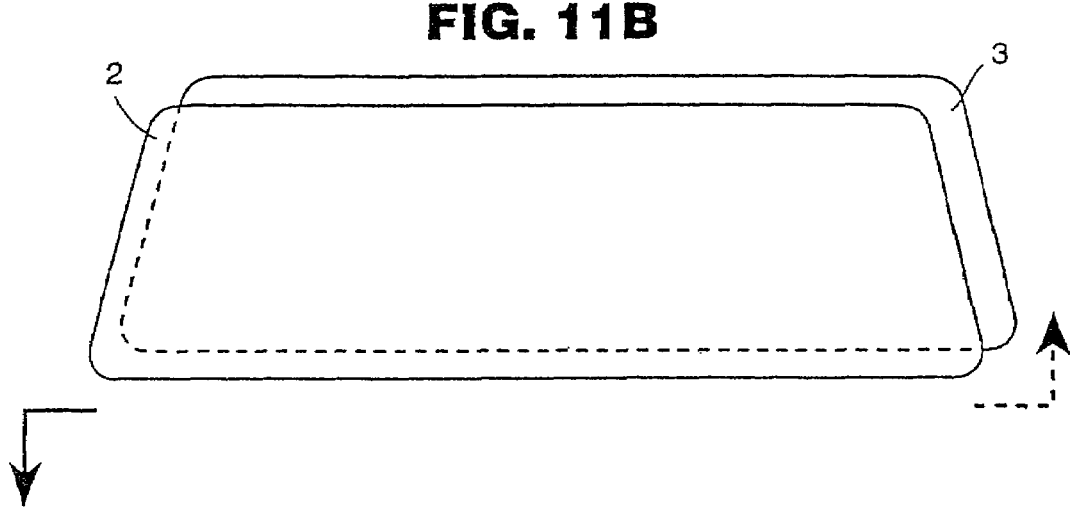
FIG. 11B depicts a lateral displacement and a perpendicular displacement of the first substrate and the second substrate.
Figure 11C:
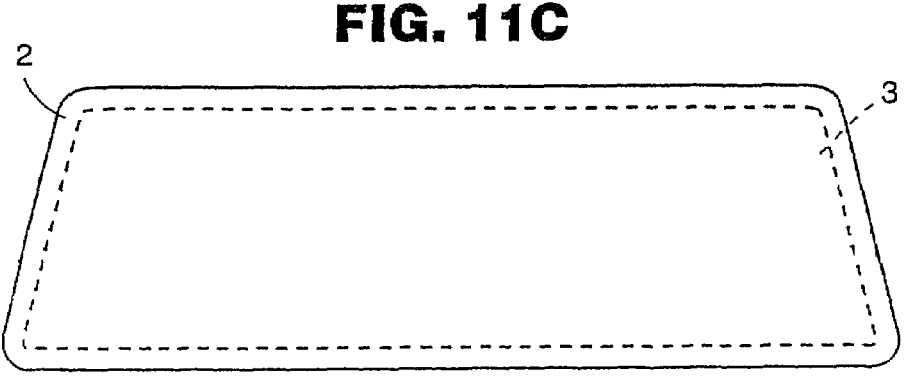
FIG. 11C depicts an arrangement of the first substrate and the second substrate, wherein the dimensions of the length and width of the first substrate are slightly greater than those of the second substrate. In this arrangement, the peripheral edge of the first substrate extends beyond the peripheral edge of the second substrate.
Figure 12:
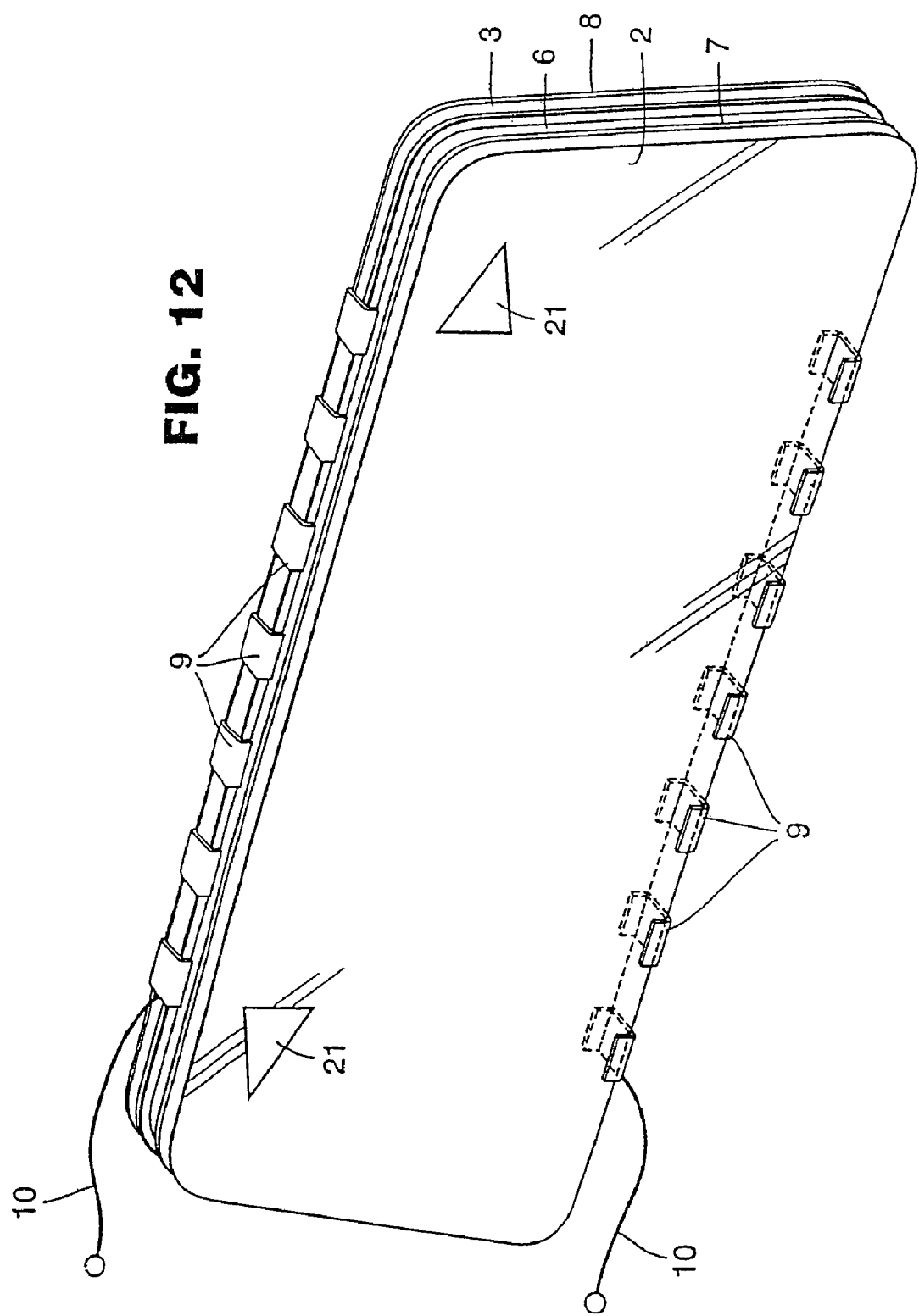
FIG. 12 depicts a perspective view of an electrochromic mirror constructed with turn signal indicia.

An exposed portion of the conductive electrode coatings 4, 4' may be provided through displacement in opposite directions relative to one another—i.e., laterally from, but parallel to, the cavity which is created by the substrates 2, 3 and the sealing means 5—of the substrates 2, 3 onto which the bus bars 9 may be affixed or adhered. (See FIG. 11A.) In addition, substrates 2, 3 may be off-set to provide an exposed portion of the conductive electrode coatings 4, 4' through displacement in opposite directions relative to one another followed by perpendicular displacement relative to one another. (See FIG. 11B.) The dimensions of substrates 2, 3 may also be such that, for example, substrate 2 may have a greater width and/or length than substrate 3. Thus, simply by positioning substrates 2, 3 in spaced-apart relationship and so that their central portions are aligned will allow for peripheral edges of the substrate with greater dimensions to extend beyond the peripheral edges of the substrate with smaller dimensions. Thus, a portion of conductive electrode coating 4 or 4' will be exposed, depending on whichever of substrates 2, 3 is dimensioned with a larger width and/or length. (See FIG. 11C.)

An exposed portion of the conductive electrode coatings 4, 4' may also be provided in a flush design, where the substrates 2, 3 are sized and shaped to like dimensions. In such a flush design, the first substrate 2 and the second substrate 3 may each be notched at appropriate positions along their respective edges. The notches so provided present convenient areas for bus bars and/or point contacts to which are connected or affixed electrical leads 10 for the introduction of an applied potential thereto.

It may also be desirable to apply a layer of reflective material onto the inward surface of substrate 3, and with substrate 3 notched in at least one appropriate position along its edges. In this way, direct access is available to the conductive electrode coated inward surface of substrate 2. Likewise, substrate 2 may be notched at a position appropriately spaced from the notch or notches on substrate 3 to provide access to the conductive electrode coated inward surface of substrate 3. These notches provide convenient areas for electrical leads 10 to be connected or affixed, and allow for such connection or affixation to be made within the overall dimensions of the mirror assembly. For example, one or both of the substrates 2, 3 may be notched along one or more edges, and bus bars 9 may then be affixed over the exposed portion of conductive electrode coatings 4, 4' of substrates 2, 3. Electrical leads 10 may then be joined to the bus bars 9. The electrical connection may be made to the inward surfaces of substrates 2, 3 without requiring further electrical connection on the peripheral edge of the mirror assembly. As such, the electrical connection to conductive electrode coatings 4, 4' will be hidden from view by the reflective element and/or the mirror case or housing.

Alternatively, one or more localized lobe(s) may be provided at appropriate positions along the respective edges of substrates 2, 3 to facilitate direct access to the conductive coated inward surfaces of substrates 2, 3.

The bus bars 9 may also comprise thin metal films, preferably with a thickness within the range of about 500 Å to about 50,000 Å or greater. These thin metal film bus bars may be deposited onto conductive electrode 4 and/or 4' by vacuum deposition, such as by evaporation or sputtering, and typically have a width within the range of about 0.05 mm to about 6 mm (and preferably with a thickness in the range of 0.05 µm to about 5 µm or greater) and are inboard from the perimeter edge of the substrate.

To form the thin metal film bus bars, a mask may be affixed over the central region of the substantially transparent conductive electrode coated substrate leaving at least a portion, and preferably most, of the perimeter region unmasked. Then a thin film of metal, such as chromium and/or silver, or other metals such as copper, titanium, steel, nickel-based alloys, and the like, may be deposited using a vacuum deposition process across the entire surface, coating both the masked central region and the unmasked perimetal region. Thereafter, the mask may be removed leaving the central region of the substrate transparent and with a conducting thin metal film bus bar deposited on at least a portion of the perimetal region. For manufacturing economy, it may be desirable to establish thin metal film bus bars on the inward surface of substrate 2, conductive electrode coating 4' and electrochromic solid film 7 in a unitary vacuum deposition process step. Thus, it may be convenient to overlay in central alignment, for example, substrate 3 (being uncoated glass) onto the substantially transparent conductive electrode coated surface of substrate 2, where substrate 3 is sized and shaped about 2 mm to about 4 mm smaller in both length and width than substrate 2 (see e.g., FIG. 11C). A peripheral edge of substrate 2 of about 2 mm to about 4 mm will then extend beyond the peripheral edge of substrate 3. In this instance, substrate 2 is made, for example, from ITO-coated glass, and substrate 3 is made from clear soda-lime glass. With this configuration, a vacuum deposition process may be used to deposit a thin metal film and, optionally, a metal oxide thereover, across the entire surface.

Upon completion of the deposition process, the substrates 2, 3 may be separated from one another. The formation of a thin metal film bus bar consisting of a chromium/silver coating about the peripheral edge of substrate 2 may then be seen where, because of its smaller dimensions, substrate 3 has served the role of a mask to the major, central region of substrate 2 during deposition. That is, when substrate 3 is removed, the major, central region of substrate 2 has not been coated during the deposition and the transparency of the major, central region of substrate 2 is maintained. Because this thin metal film bus bar is highly conductive and extends about the entire periphery of substrate 2, electric potential may be supplied by means of a point electrical contact (optionally with local removal of any metal oxide) without the need for a large metal clip or ribbon connector wire as has been conventionally used heretofore. Moreover, because the thin metal film bus bar consists of a chromium/silver coating it forms a highly reflective perimeter coating which may be used to conceal any seal and/or electrical connection for the electrochromic cell. [See U.S. Pat. No. 5,060,112 (Lynam), the disclosure of which is hereby incorporated herein by reference.]

In addition, the surface of substrate 3 which was exposed during deposition is now coated with a chromium/silver/tungsten oxide stack, which may be used as the inward surface in forming an electrochromic cell. The cut edge of substrate 3 is also coated with a chromium/silver coating during the unitary vacuum deposition process due to the inevitable overspray which occurs in such a process. This chromium/silver coating around the cut edge of substrate 3 may itself conveniently be used to establish an electrical connection to apply potential to electrochromic solid film 7.

The applied potential may be supplied from a variety of sources including, but not limited to, any source of alternating current (AC) or direct current (DC) known in the art, provided that, if an AC source is chosen, control elements, such as diodes, should be placed between the source and the conductive electrode coatings 4, 4' to ensure that the potential difference between the conductive electrode coatings 4, 4' does not change with variations in polarity of the applied potential from the source. Suitable DC sources include storage batteries, solar thermal cells, photovoltaic cells or photoelectrochemical cells.

The applied potential generated from any of these sources may be introduced to the electrochromic element 1 within the range of about 0.001 volts to about 5.0 volts. Typically, however, an applied potential of about 0.2 volts to about 2.0 volts is preferred to cause the electrochromic element to dim to a colored state—i.e., to change the amount of light transmitted therethrough. For electrochromic solid films like tungsten oxide, the negative polarity of the potential should be applied onto whichever of substrates 2, 3 the electrochromic solid film 7 is deposited.

Also, in constructions where a metal conductor layer or a metal conductor/reflector layer is contacted with an electrochemically active medium (such as an electrolyte prepared in accordance with this invention or an electrochemichromic solution like those disclosed in, for instance, Byker I and Varaprasad I), it is preferable to apply a cathodic potential (i.e., a negative applied potential) to the metal layer to achieve coloration of the electrochromic device (e.g., an electrochromic rearview mirror). In order to bleach such electrochromic devices, it is preferable to apply a potential of zero volts to the metal conductor layer.

The teaching of the present invention is well-suited for use in electrochromic mirrors whose functional surface is substantially planar or flat. For example, flat electrochromic mirrors for motor vehicles may be manufactured with the electrochromic element of the present invention.

In addition, the present teaching is well-suited for use in electrochromic mirrors having a curved functional surface, with a convex curvature, a compound curvature, a multi-radius curvature, aspherical curvature, an aspheric curvature, or combinations of such curvature. (See FIG. 13.) Convex electrochromic mirrors for motor vehicles may be manufactured with the electrochromic element of the present invention, with radii of curvature typically within the range of about 25" to about 250", preferably within the range of about 35" to about 120", as are conventionally known.

Multi-radius mirrors for motor vehicles, such as those described in U.S. Pat. No. 4,449,786 (McCord), may also be manufactured in accordance with the present invention. Multi-radius mirrors for motor vehicles may typically be used on the driver-side exterior of a motor vehicle to extend the driver s field of view and to enable the driver to see safely and to avoid blind-spots in the rearward field of view. Generally, such mirrors have a region of a higher radius (i.e., substantially planar or flat) closer or inboard to the driver that serves principally as the primary driver's rear vision function and a region of a lower radius (i.e., more curved) farther or outboard from the driver that serves principally as the blind-spot detection zone in the mirror.

In forming spherical mirrors, such as convex exterior mirrors, or aspherical mirrors such as the multi-radius mirror 44 in FIG. 13, the radius of curvature for the substrates to be used for the laminate assembly formed by the electrochromic element 1 between substrates 2, 3 should be matched. Moreover, in aspherical mirrors, the two substrates 2, 3 in the laminate assembly should be matched so that the local radius in one substrate, for example in the first substrate 2, is located over, and oriented to align with, its corresponding local radius in the other substrate, for example, in the second substrate 3. (See FIG. 13.)

To achieve such radius of curvature matching, a desired shape for the substrates of the aspherical mirrors may be cut from a flat substrate of dimensions greater than that of the desired multi-radius shape. This initial flat substrate ("a flat minilite") may have a rectangular, square or circular shape, or may be of the general shape of the desired multi-radius shape, or any other convenient alternative shape. Glass lites from which the flat minilites may be cut are desirably substantially colorless or tinted soda-lime sheets of glass. In addition, depending on the particular mirror construction and whether the desired bent shape derived from the flat minilite is to be employed as the front substrate 2 or the rear substrate 3, glass lites/flat minilites, from which the desired bent shape may be derived, may be coated with a substantially transparent conductive electrode coating, such as ITO or fluorine-doped tin oxide. As noted supra, fluorine-doped tin oxide coated glass is commercially available from Libbey-Owens-Ford Co. under the "TEC-Glass" tradename.

Once cut, the oversized flat minilites may be bent to the desired multi-radius using either conventional slump bending or press bending. Also, individual minilites may be bent to compound curvature or two flat minilites may be bent together as a matched pair. To manufacture a matched pair of bent minilites, two flat minilites may be stacked on top of one another, loaded in a tandem orientation into a bending press and bent together to the desired curvature (which may be spherical or aspherical) in one bending process step.

Where individual bent minilites are to be manufactured, any one bent minilite manufactured in any one bending process step is intended to match any other bent minilite. In electrochromic mirrors, it may be advantageous to use the twin bent minilites manufactured in tandem one on top of the other in the one bending operation step as a given matched pair to assemble a laminate construction.

The desired substrates may be cut from bent minilites to the dimension and shape suitable for use in the intended laminate construction of the particular electrochromic mirror. To the extent that the cullet trimmed away from the bent minilite manufactured as described supra conforms least to the intended radius design, bending oversized minilites is recommended. However, and particularly where the bending operation is to be attentively supervised, the desired dimensioned shape may first be cut from flat glass lites, with the desired dimensioned shape then bent to the desired multi-radius curvature.

It may be advantageous to cut multi-radius front and rear substrates from their respective bent minilites to facilitate proper alignment of a local radius on the first substrate relative to its corresponding local radius on the second substrate. In this regard, a matched pair of bent minilites may be assembled into a laminate construction with the first substrate laterally displaced from the second substrate, yet sustaining local to local radius alignment there between. In addition, should there be an asymmetry in radius, one perimeter length, LC, of the bent minilite may be identified as the lower radius (more curved) part of the minilite compared with its opposite perimeter length, LF, identified as the higher radius (more flat) part of that same bent minilite. Likewise, for its twin match in a matched pair of bent minilites, there may exist corresponding LC' and LF' perimeter lengths.

Suitable jigs or the like may be used to assemble a laminate construction of an electrochromic mirror with their corresponding perimeter lengths aligned. For example, LC may be aligned a few millimeters (e.g., 3 mm) inboard relative to LC' so that their local radii are mutually aligned and the desired electrical connection is established along LC' and LF. This may be accomplished by cutting a measured portion (e.g., 3 mm) of bent glass away from along LC and LF' and using jigs to align the now-cut edge of LC to the same measured distance (e.g., 3 mm) inboard from LC', with the respective substrates juxtaposed. Because of this alignment, local radius conformity between the substrates in a laminate construction may be established.

Alternatively, the bent minilites may be cut from oversized minilites so that one cut substrate may be laid on top of another cut substrate aligned in substantially flush relationship so that local to local radius conformity may be maintained and electrical connection may be established [see Lynam IV, the disclosure of which is hereby incorporated herein by reference].

While not required, the minilites may be sufficiently oversized to allow more than one substrate to be cut out from a given minilite, if the bending tool is appropriately designed. By so doing, the substrate cutting process benefits from economies of scale. For example, two substrates may be cut from the one sufficiently oversized bent minilite. These side-by-side matched twin substrates may be used as substrates 2, 3 to construct the same electrochromic laminate assembly, or they may be used to serve as a substrate in any electrochromic laminate assembly.

Also, certain substantially transparent conductive electrode coatings, such as doped tin oxides, are aerobically inert, and as such may be bent in an ordinary air atmosphere without taking precautions to exclude oxygen. However, suitable precautions should be taken to avoid any crazing, hazing or optical deterioration of the conductive electrode coatings 4, 4' during the bending process. Other substantially transparent conductive electrode coatings, such as ITO, may be bent from flat sheet stock using techniques such as those described in U.S. Pat. No. 4,490,227 (Bitter), the disclosure of which is hereby incorporated herein by reference. After or during heat treatment of ITO, such as in a bending/annealing process which produces spherical and aspherical shaped substrates suitable for assembling laminate constructions for electrochromic mirrors or when firing ceramic frit bus bar material such as silver conductive frit #7713 (Du Pont), it may be desirable to establish a reducing atmosphere, as described in Bitter, such as a hydrogen-rich atmosphere, like that established with forming gas.

Glass lites and minilites may also be manufactured into spherical and/or aspherical shaped substrates without first being coated with a conductive electrode. In such instances, after the spherical and/or aspherical bent minilites or shaped substrates are manufactured, a conductive electrode coating, such as ITO, may thereafter be deposited onto the concave surface of the substrate 2 and the convex surface of the substrate 3.

A demarcation means 22 may be used in the multi-radius mirrors as described herein to separate the more curved, outboard region 55 (i.e., that portion of an exterior driver-side multi-radius mirror outboard and farthest from the driver) used by the driver principally as the blind-spot detection zone from the less curved, more flat inboard region 65 (i.e., closer to the driver) used by the driver principally for the primary rear vision function. (See FIG. 13.)

The demarcation means 22 may be a black or darkly colored continuous line or closely interspaced dots, dashes or spots (silk-screened or otherwise applied), which divides the outboard region from the inboard region of the multi-radius mirror. This black or darkly colored dividing line (or its aforestated equivalent) may assist the driver of a motor vehicle to discern the difference between images in the outermost, more curved region from those in the innermost, more flat region of the mirror. The thickness of this dividing line should be within the range of about 0.1 mm to about 3 mm, with about 0.5 mm to about 2 mm being preferred.

The demarcation means 22 may be constructed from an organic material, such as a polymer like an epoxy; an inorganic material, such as a ceramic frit; or a mixed organic/inorganic material. Such demarcation means 22 may be constructed to include, far example, an epoxy coupled with glass spacer beads, or plastic tape or a die cut from plastic tape. The demarcation means may be placed onto the conductive electrode coatings 4, 4' of either or both of substrates 2, 3 by silk-screening or other suitable technique prior to assembling the device. Also, the demarcation means 22 may be applied to any or all of the surfaces of substrates 2, 3—i.e., the inward surfaces of substrates 2, 3 or the opposite, non-inward surfaces of substrates 2, 3. Additives may be included in the material used as a demarcation means to provide or enhance color, such as a dark color, like black, or dark blue or dark brown; to enhance stability (e.g., ultraviolet stabilizing agents such as described herein); or to increase adhesion (e.g., coupling agents, such as silane-, titanium-, or zirconium-based coupling agents). Alternatively, a dividing line may be established by etching a surface of substrate 2 and/or 3 (such as by sand blasting, laser etching or chemical etching) with optional staining of the etched-surface to develop a dark colored dividing line.

Where ceramic frits are used as a demarcation means and/or where bus bars are formed by applying a silver conductive frit [e.g., #7713 (Du Pont)] around the periphery and inboard from the edge of the inward surface(s) of substrate 2 and/or substrate 3, it may be convenient to silk-screen or otherwise apply the material to either or both of the substrates 2, 3 prior to bending. In this way, the bending operation serves the dual purpose of bending and firing/curing the ceramic frit onto the substrates. In addition, where epoxies or other organic-based materials are used as the demarcation means and/or materials which act as bus bars, it may be convenient to silk-screen or otherwise apply the material to either or both of the substrates prior to final cure of the material used as the sealing means so that the sealing means, the demarcation means and/or material which acts as bus bars may be fired/cured in one and the same operation step. A dividing line may also be established within the cavity formed between substrates 2, 3.

A driver textural warning 23, such as the conventional textural warning "objects in mirror are closer than they appear", may be included in the outermost more curved portion 55 of an electrochromic multi-radius exterior mirror according to this invention. (See FIG. 13.) Alternatively, a driver textural warning may be included in the innermost less curved region 65. Heretofore, such warnings have been established through sandblasting or as described in O'Farrell. Alternatively, textural warnings may be applied by silk-screening onto a surface of one of the substrates 2, 3 of the mirror assembly or by other suitable techniques, such as laser etching, onto the reflective element of the mirror which is coated onto a surface of substrate 3.

On demand displays 14 may be positioned behind the reflective element of the mirror (see FIGS. 9 and 10) and become activated by user input or by input from a sensor, such as a supplementary vision device (e.g., camera, sensor, proximity detector, blind-spot detector, infrared and microwave detector), temperature sensor, fuel sensor, fault detector, compass sensor, global positioning satellite detector, hazard detector or the like. In addition, a vehicle function (such as a turn signal, hand brake, foot brake, high beam selection, gear change, memory feature selection and the like) may activate the on demand display. The on demand display may also be activated by a function such as a compass, clock, a message center, a speedometer, an engine revolution per unit meter and the like. In the context of their use in conjunction with rearview mirrors for motor vehicles, an on demand display, when not active or activated, should desirably remain at least substantially unobservable or undetectable by the driver and/or passengers. Similarly, in other applications with which these on demand displays may be desirably used, they should remain at least substantially unobservable or undetectable when not activated.

On demand displays 14 should be an emitting electronic display, such as a vacuum fluorescent display, a light emitting diode, a gas discharge display, a plasma display, a cathode ray tube, an electroluminescent display and the like.

Conventionally, the reflective element in electrochromic mirrors is constructed by coating the rearmost (non-inward) surface of the second substrate 3, with a reflective element using a wet chemical silver line mirror coating. This rearmost surface is typically coated with a layer of silver 8, and then protected with a thin film layer of copper 19 which itself is overcoated with a protective material 20, typically a paint such as a lead-based paint. In this construction, the light transmissivity through the mirror is substantially opaque—i.e., substantially less than about 0.01%; To place a display, camera, sensor or the like behind such a conventional mirror, a "window" 13 through which light may pass must be created as described hereinafter.

Figure 9:
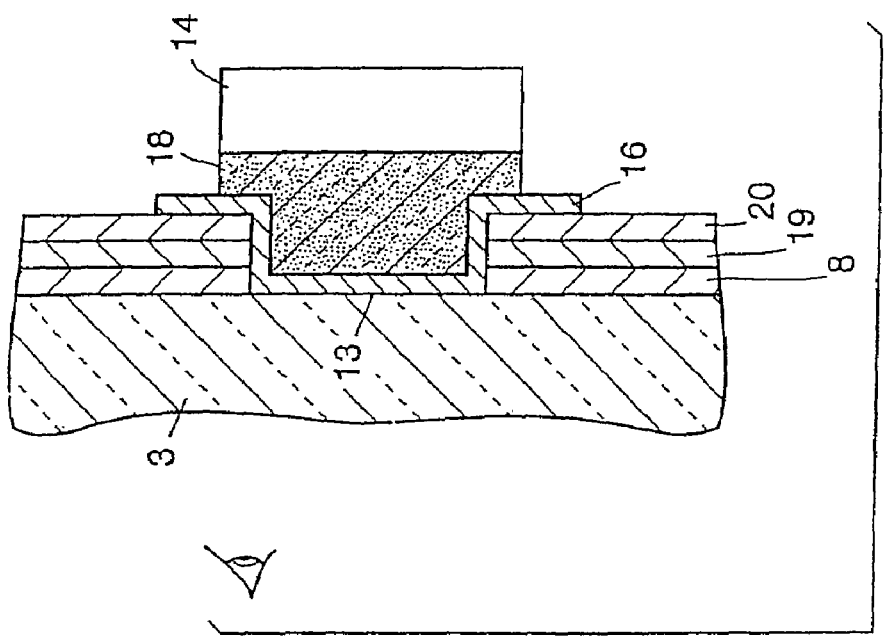
FIG. 9 depicts a cross-sectional view of an electrochromic mirror constructed with an on demand display using a glass cover sheet over the display window in the mirror construction.
Figure 10:
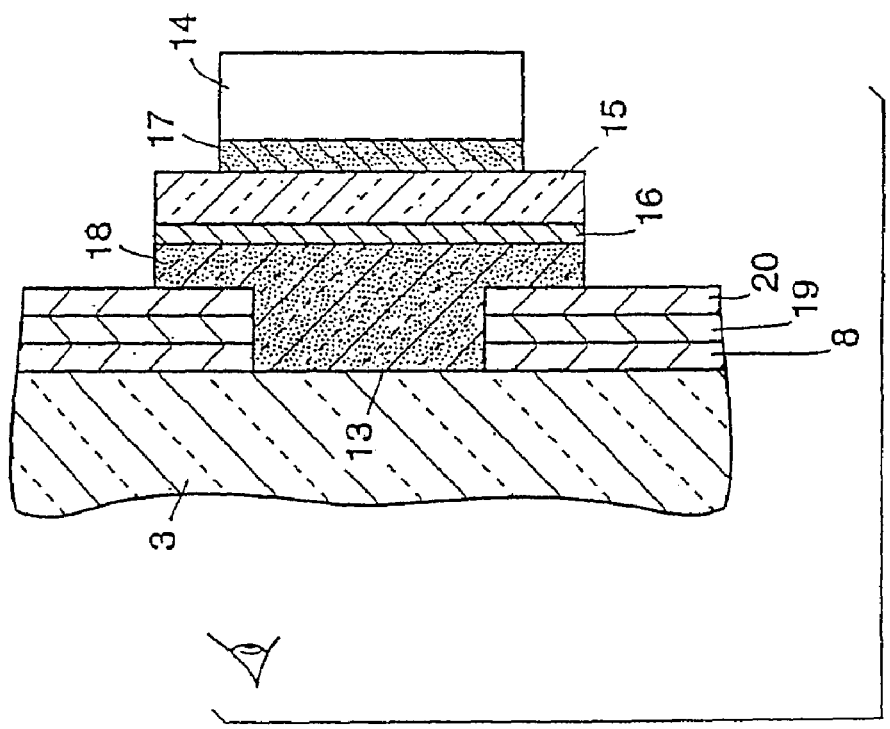
FIG. 10 depicts a cross-sectional view of another electrochromic mirror constructed with an on demand display.

With reference to FIGS. 8, 9 and 10, it may be seen that on demand display capability may be introduced to a mirror through the window 13 that has been previously created therein [typically, by sand blasting, mechanical erosion (e.g., with a spinning rubber), laser etching, chemical etching and the like] by coating a layer of reflective material, such as a thin film of a metal 16 (e.g., a medium reflector, such as chromium, titanium, stainless steel and the like, having a thickness preferably less than about 750 Å), onto the rearmost (non-inward) surface of substrate 3 at the portion of the substrate where the window 13 exists. (See FIG. 10.) It may be preferable to use a medium reflector, such as chromium, titanium, stainless steel and the like, because such medium reflectors are durable, scratch resistant and resistant to environmental degradation without the need for additional overcoat layers like paints, lacquers, or other oxide coatings. Nevertheless, such overcoat layers may, of course, be used. Also, a high reflector such as silver or aluminum may be used, if desired. The window 13, now being only partially opaque in light transmissivity, is substantially light reflecting.

This partially transmitting/substantially reflecting window may be established through evaporating or sputtering (using vacuum deposition techniques) chromium metal over the window to a thickness of up to about 750 Å. By so doing, light transmittance within the range of about 1% to about 10% may be achieved, while also achieving light reflectance within the range of about 40 t to about 65%. This method, however, introduces increased manufacturing costs (e.g., by first creating the window in the silver line-coated rearmost surface of substrate 3 and then vacuum depositing thereover the thin film of chromium). Also, the differences in reflectivity between the higher reflectance off the silver reflective element and the lower reflectance off the partially transmitting, lesser reflecting window may be detectable by or noticeable to an observer.

An alternative method involves the use of a partially transmitting (i.e., light transmission within the range of at least about 1%- to about 20%), substantially reflecting (i.e., light reflectance within the range of least about 40% to greater than about 70%) metal foil or reflector-coated polymer sheet or film 15, such as metalized polymer sheet or film, like aluminum or chromium coated acrylic sheet or polyester "MYLAR" film (commercially available from Du Pont). Such a foil, or sheet or film 15, reflector coated with a thin film of metal 16 may be contacted with, or adhered to using an optical adhesive 18, preferably an index matching adhesive such as described hereinafter, the window 13 in the layer of reflective material on substrate 3.

Likewise, an appropriately sized glass cover sheet 15 (or a polymer cover sheet) which is coated with a thin film of metal 16 that is partially light transmitting (preferably, about 1% to about 20%), and yet substantially light reflecting (preferably, at least about 40% to greater than about 70%) may be contacted with, or adhered to using an optical adhesive 18 as described herein, the window 13 in the layer of reflective material on substrate 3. (See FIG. 9.) The glass cover sheet 15 may be any desired shape and should be sufficiently large to at least cover the entire window 13 created in the silver-coated, rearmost surface of substrate 3 (which may be suitable to accommodate, for example, compass displays, like the compass displays described in O'Farrell and Larson).

It may be convenient to coat glass lites with a high reflector, such as a thin film coating of aluminum or silver, to a thickness that achieves the desired partial light transmittance and substantial light reflectance. Alternatively, a medium reflector, such as a thin film coating of chromium, stainless steel, titanium or the like, may be used to coat the glass lites.

An inorganic oxide coating, such as silicon dioxide, titanium dioxide, zinc oxide or the like, may also be overcoated onto the thin film metal reflector coating to impart resilience, resistance against environmental degradation, enhance scratch resistance and enhance optical performance. Likewise, a thin film of magnesium fluoride, or a combination of thin films of dielectric materials such as described supra, may be used to overcoat the thin film metal reflector coating. A clear coat of a lacquer, such as an acrylic- or a urethane-based lacquer or the like, is still another choice which may be used to overcoat the thin film metal reflector coating.

Once formed, the partially transmitting/substantially reflecting glass lites may be subdivided into a multitude of smaller sized cover sheets to cover the window in the reflector on the rearmost (non-inward) surface of substrate 3. More specifically, a square, circle or rectangle may be cut to dimensions of about 1 to about 6 mm or larger than the dimensions of the window for the display. The square- or rectangular-shaped glass cover sheets may then be contacted with, or adhered to, the rearmost (non-inward) surface of substrate 3 to cover the previously established window for the display.

An optical adhesive 18 that is index matched to the refractive index of glass (i.e., about 1.52) may be used to adhere the glass cover sheet 15 to the rearmost (non-inward) surface of substrate 3. Such optical adhesives maximize optical quality and optical index matching, and minimize interfacial reflection, and include plasticized polyvinyl butyral, various silicones, polyurethanes such as "NORLAND NOA 65" and "NORLAND NOA 68", and acrylics such as "DYMAX LIGHT-WELD 478". The glass cover sheet 15 may be positioned with its semitransparent metal reflector coating 16 closest to the rearmost (non-inward) surface of substrate 3 so that the mirror construction comprises an assembled stack of the glass cover sheet 15/semitransparent reflector metal coating 16/optical adhesive 18/rearmost (non-inward) surface of substrate 3. In this construction, the optical adhesive is used as both an adhesive and as a protectant for the semitransparent metal reflector-coating 16 of the glass cover sheet 15. Such a use of semitransparent reflector-coated glass cover sheets 15/16 lends itself to economical and automated assembly. Also, the cover sheet may be made from glass that is coated with a dichroic mirror or made from polymer reflector material ("PRM"), as described hereinafter.

As an alternative to localized reflector coating with a thin metal film as shown in FIG. 10, or localized use of cover sheets, foils, films, and the like as shown in FIG. 9, at the non-inward surface of substrate 3 at window 13, similar localized reflector means can be employed at the inward facing surface of substrate 3 at the location of window 13:

An emitting display 14 may also be positioned behind the rearmost (non-inward) surface of the glass cover sheet 15 (which itself is positioned behind substrate 3 of the electrochromic mirror assembly). In this regard, it may be desirable to use a thin glass for the cover sheet 15 to minimize multiple imaging and/or double imaging. The thickness of the cover sheet need not be thicker than about 0.063", with suitable thicknesses being about 0.063"; about 0.043"; about 0.028"; about 0.016" and about 0.008". However, if desired the thickness of the cover sheet 15 may be greater than about 0.063".

Again with reference to FIG. 5, where the layer of reflective material is coated onto the inward surface of substrate 3, improved optical performance may be observed without reducing the thickness of substrate 3. In such constructions, a relatively thick glass (having a thickness of greater than about 0.063") may be used for substrate 3 with a thin glass (having a thickness of about 0.063" or less) used for substrate 2 while maintaining good mechanical properties due to the relatively greater stiffness of substrate 3. Improved optical performance may also be observed due to the relative closeness of the layer of reflective material (coated onto the inward surface of substrate 3) and the frontmost (non-inward) surface of substrate 2.

An illustration of this aspect of the present invention may be seen where substrate 3 is fabricated from "TEC 10" glass (having a sheet resistance of about 10 ohms per square), with a thickness of about 3 mm, and substrate 2 is fabricated from soda-lime glass (coated with HW-ITO having a sheet resistance of about 12 ohms per square as a substantially transparent conductive electrode coating 4), with a thickness of about 0.043". In this construction, the fluorine-doped tin oxide surface of the substrate 3 fabricated from "TEC 10" glass is positioned inward (and overcoated with a metal reflector/conductive electrode coating 4') and the HW-ITO coated surface of substrate 2 is also positioned inward so that the coated substrates 2, 3 face one another.

A silicon or similar elemental semiconductor material may also be used as a reflective element 8 coated onto either the rearmost (non-inward) surface or the inward surface of substrate 3. Methods for making elemental semiconductor mirrors for motor vehicles are taught by and described in commonly assigned co-pending U.S. patent application Ser. No. 07/700,760, filed. May 15, 1991, now U.S. Pat. No. 5,535,056 ("the '760 application"), the disclosure of which is hereby incorporated herein by reference. Where it is desired that the high reflectance off the elemental semiconductor reflector be within the range of at least about 60% to greater than about 70%, an undercoat of a thin film layer of silicon dioxide between a thin film layer of silicon and the surface of the substrate onto which it is coated may be used to enhance reflectivity performance [see e.g., the '760 application, and U.S. Pat. No. 4,377,613 (Gordon) and U.S. Pat. No. 4,419,386 (Gordon), the disclosures of each of which are hereby incorporated herein by reference].

In addition, the layer of silicon and/or an undercoat of silicon dioxide may be deposited using techniques such as vacuum deposition, spray deposition, CVD, pyrolysis and the like. For example, in-line deposition on a float glass line, and preferably in-bath, in-line deposition on a float glass line (as known in the glass manufacturing art) using CVD may be employed to deposit silicon layers and silicon/silicon dioxide thin film stacks onto float glass to provide a reflector for substrate 3 that is both highly reflecting and partially transmitting. A further advantage of these elemental semiconductor coatings is that they are bendable.

For example, a glass coated with a reflective element may be constructed by depositing onto a glass substrate a first layer of elemental silicon at an optical thickness of about 6,950 Å, followed by deposition of a second layer of silicon dioxide at an optical thickness of about 1,050 Å, which in turn is followed by deposition of a third layer of elemental silicon at an optical thickness of about 1,600 Å. Such a construction has a luminous reflectance of about 69% before heating and bending; and a luminous reflectance of about 74% after heating and bending. A substantially transparent conductive electrode coating, such as doped tin oxide (e.g., fluorine-doped tin oxide) and the like, may be coated over the third layer of elemental silicon to construct a highly reflecting, electrically conducting glass substrate suitable for use in electrochromic mirrors and electrochromic devices where the coated substrate may be bent without unacceptable deterioration in its optical and electrical properties. Preferably, reflector-coated substrates constructed using multi-layer stacks, such as a glass/silicon/silicon dioxide/silicon stack (with or without additional undercoating or overcoating stack layers), may be deposited in-bath, on-line onto glass being manufactured on a float glass line.

It may also be advantageous to employ bendable reflector-coated substrates and techniques for manufacturing the same as taught by and described in the '760 application, and multi-layer stacks, such as the glass/silicon/silicon dioxide/silicon stack as described supra, with or without an additional overcoating of a substantially transparent conductive electrode coating such as fluorine-doped tin oxide and the like. Bendable coatings may be advantageous in minimizing manufacturing requirements since depositing a thin film of metal generally requires the steps of first bending the non-reflector coated substrate and then coating the bent substrate with the layer of reflective material.

As described supra, it may be advantageous to construct electrochromic mirrors whose reflective element 8 is located within the laminate assembly. This may be achieved by coating the inward surface of substrate 3 with a layer of reflective material 8, such as silver, so that the silver coating (along with any adhesion promoter layers 11) is protected from the outside environment. For example, a layer of reflective material 8 may be vacuum deposited onto the inward surface of substrate 3 in one and the same process step as the subsequent deposition of the electrochromic solid film 7 onto substrate 3. This construction and process for producing the same not only becomes more economical from a manufacturing standpoint, but also achieves high optical performance since uniformity of reflectance across the entire surface area of the mirror is enhanced. The thin film stack [which comprises the electrochromic solid film 7 (e.g., tungsten oxide), the layer of reflective material 8 (e.g. silver or aluminum) and any undercoat layers between the layer of reflective material 8 and substrate 3] should have a light reflectance within the range of at least about 70% to greater than about 80%, with a light transmission within the range of about 1% to about 20%. Preferably, the light transmission is within the range of about 3% to about 20%, and more preferably within the range of about 4% to about 8%, with a light reflectance greater than about 80%.

The inward facing surface of substrate 3 may be coated with a multi-layer partially transmitting/substantially reflecting conductor comprising a partially transmitting (preferably, in the range of about 1% to about 20%)/substantially reflecting (preferably, greater than about 70% reflectance, and more preferably, greater than about 80% reflectance) metal layer (preferably, a silver or aluminum coating) that is overcoated with an at least partially conducting transparent conductor metal oxide layer [comprising a doped or undoped tin oxide layer, a doped or undoped indium oxide layer (such as indium tin oxide) or the like]. Optionally, an undercoating metal oxide (or another at least partially transmitting metal compound layer, such as a metal nitride like titanium nitride) may be included in the stack which comprises the multi-layer conductor. This multi-layer conductor functions as reflective element 8, and can be overcoated with electrochromic solid film 7 during fabrication of an electrochromic mirror incorporating on demand displays. Alternatively, the multi-layer conductor described supra may be used on the inward surface of substrate 3, with the electrochromic solid film 7 coated onto the inward surface of substrate 2.

A light reflectance of at least 70% (preferably, at least 80%) for the reflective element to be used in an electrochromic mirror incorporating on demand displays is desirable so that the bleached (unpowered) reflectivity of the electrochromic mirror can be at least 55% (preferably, at least 65%) as measured using SAE J964a, which is the recommended procedure for measuring reflectivity of rearview mirrors for automobiles. Likewise, a transmission through the reflective element of, preferably, between about 1% to 20% transmission, but not much more than about 30% transmission (measured using Illuminant A, a photopic detector, and at near normal incidence) is desirable so that emitting displays disposed behind the reflective element of the electrochromic mirror are adequately visible when powered, even by day but, when unpowered and not emitting, the displays (along with any other components, circuitry, backing members, case structures, wiring and the like) are not substantially distinguishable or visible to the driver and vehicle occupants.

With reference to FIGS. 9 and 10, emitting displays 14, such as vacuum fluorescent displays, light emitting diodes, gas discharge displays, plasma displays, cathode ray tubes, electroluminescent displays and the like may also be placed in contact with, or adhered to using an adhesive 17, 18 such as an epoxy, the rear of substrate 3. Generally, such emitting displays may only be observable when powered so as to emit light.

A variety of emitting displays 14 may be used in this connection including, but not limited to, double heterojunction AlGaAs very high intensity red LED lamps, such as those solid state light emitting display LED lamps which use double heterojunction Al/GaAs/GaAs material technology [commercially available from Hewlett Packard Corporation, Palo Alto, Calif. under the designation "T-1¾ (5 mm) HLMP-4100-4101"].

Alternatively, vacuum fluorescent displays, such as 12V battery driven high luminance color vacuum fluorescent displays may be advantageously used (commercially available from Futaba Corporation of America, Schaumburg, Ill. under the designations S-2425G, S-24-24G, S-2396G and S-2397G]. It may also be advantageous to use displays 14 that operate efficiently at about 12V or lower since these voltages are particularly amenable to motor vehicles. Also, ultrahigh luminance vacuum fluorescent displays, suitable for heads-up-display applications in motor vehicles may be used with appropriate circuitry, such as Type 3-LT-10GX [commercially available from Futaba Corporation]. Suitable vacuum fluorescent displays are also commercially available from NEC Electronics Incorporated, Mountain View, Calif., such as under the designation Part No. FIP2QM8S.

It may also be desirable, particularly where the reflective element is at least partially light transmitting, to use a light absorbing means, such as a black-, brown- or blue-colored or other suitably colored absorbing coating, tape, paint, lacquer and the like, on portions of the rearmost (non-inward) surface of substrate 3 where displays are not mounted. It may be desirable to use substantially opaque, and preferably dark colored tape or plastic film and the like, across the surface of substrate 3, such as by adhering to protective material 20, preferably across substantially the entire rear surface, except where any displays are to be positioned. By so doing, any secondary images or aesthetically non-appealing mirror case illumination due to stray light emittance from the display may be reduced.

Placement of apertures or cutouts in a tape or film backing may expedite the assembly of such mirrors by guiding the assembler to the point where the desired display or displays is to be mounted. The tape or film backing may also serve as an anti-scatter means to enhance safety and prevent injury by retaining any glass shards which may result due to mirror breakage, for example caused by impact from an accident.

Suitably colored paints, inks, plastic films or the like may be applied to the surface of substrate 3 where the display 14 is to be placed to change or effect the color of the display. Also, the display 14 may be adhered to a surface of the substrate using an adhesive 18, such as an index matching adhesive 17, 18, that may be dyed to effect color and/or contrast enhancement in the display [see e.g., Larson, the disclosure of which is hereby incorporated herein by reference].

Generally, and particularly when the electrochromic element is in its bleached, uncolored state, it may be desirable for the image of the display—e.g., an information display, such as a compass display, a clock display, a hazard warning display or the like—to have a luminance within the range of at least about 30 foot lamberts to about 80 foot lamberts (preferably, within the range of at least about 40 foot lamberts to about 60 foot lamberts), as measured with the display placed behind, and emitting through, the electrochromic mirror and with the electrochromic element in its fully transmitting, bleached state. With this level of luminance, such a display may be read easily even with bright ambient levels of light. Also, the electronic circuitry taught by and described in Larson may be used to appropriately dim the display to suit nighttime driving conditions and/or to compensate for any dimming of the electrochromic element. Generally, at night the luminance of the display is about 15-40%, preferably about 20-35% that of the daytime value.

During daytime lighting conditions, drivers of motor vehicles mounted with an electrochromic mirror (interior, exterior or both) benefit from relatively high reflectance (at least about 55%, with at least about 65% typically being preferred) when in the bleached "day" state. Any display positioned behind the electrochromic mirror should have a sufficiently high luminance to permit the display (which may be digital, alpha-numeric, analog or combinations thereof) to emit therethrough and be readable. The display 14 should be readable even when ambient conditions within the cabin of a motor vehicle (or outside, where electrochromic exterior rearview mirrors are used or where the electrochromic interior rearview mirror is mounted in a convertible with its top down) are bright, such as midday on a sunny, cloudless day. The mirrors of the present invention may achieve a light reflectance of at least about 55% for the high reflectance state where a high reflector in the form of a thin film metal coating is used with a sufficient thickness to allow for light to transmit through the electrochromic element 1, preferably within the range of about 1% to about 15% transmission, but not exceeding about 30% (as measured using Illuminant A and a photopic detector, with near normal incidence). More specifically, where silver is used as a high reflector, the mirrors of the present invention may achieve a light reflectance of at least about 65% for the high reflectance state with a light transmission therethrough within the range of about 1% to about 20% transmission (measured as described supra). The thin film metal coating may have a thickness within the range of about 200 Å to about 1,500 Å, preferably within the range of about 200 Å to about 750 Å.

It may also be desirable, particularly when used in conjunction with highly spectrally selective light emitting diodes and the like, to use PRM as a reflector placed between the display 14 and the rearmost (non-inward) surface of substrate 3. PRM is a spectrally selective, substantially reflecting (greater than about 50%) and significantly transparent polymer reflector material (see T. Alfrey, Jr. et al., "Physical Optics of Iridescent Multilayered Plastic Films", Polym. Eng'g. & Sci., 9(6), 400-04 (1969); W. Schrenk et al., "Coextruded Elastomeric Optical Interference Film", ANTEC '88, 1703-07 (1988); and see generally U.S. Pat. No. 3,711,176 (Alfrey, Jr.); U.S. Pat. No. 3,557,265 (Chisolm) and U.S. Pat. No. 3,565,985 (Schrenk). PRM is commercially available from Dow Chemical Co., Midland, Mich., such as under the designation PRM HU75218.03L, which is a 0.125" thick sheeting made of multiple polymer layers (e.g., 1305 layers), having differing refractive indices and transparent/transparent CAP layers. This PRM exhibits a light reflectance of about 58% and a generally neutral light transmittance. Another PRM, designated as PRM HU75218.08L, also is a 0.125" thick sheeting, made from multiple polymer layers (e.g., 1305 layers), with a light reflectance of about 58%. However, this PRM has transparent/red CAP layers which results in a transmission which has a distinctly red tint. As such, it may be particularly well-suited for use in conjunction with the mirrors of the present invention that employ in their construction red light emitting diodes, such as those typically employed in hazard warning devices.

An array of light emitting diodes may be positioned behind a window 13 in a mirror with an appropriately sized piece of PRM positioned between the emitting displays 14 and the rearmost (non-inward) surface of the substrate 3. By choosing a PRM with a selective transmission which permits the passage of the bandwidth of light emitted by the emitter but that substantially attenuates other wavelengths not within that bandpass of light, optical efficiency may be enhanced. Indeed, PRM itself may be an appropriate reflective element behind which display emitters may be disposed. While PRM may be vulnerable to scratching and susceptible to degradation from environmental exposure, substrates 2, 3 offer desirable protection from such damage. Use of PRM where the piece of PRM is larger than and covers the window created in the reflective element on substrate 3 (but is smaller than the entire surface area of substrate 3) is particularly attractive compared to the use of conventional dichroic mirrors [such as thin film dielectric stack dichroic mirrors (commercially available from Optical Coatings Labs, Santa Rosa, Calif.)] as the reflective element because of economic benefits.

Should it be desirable to use a PRM/emitting display, a substrate with or without a thin film of metal reflector coating that is substantially transmitting may be positioned in front of the PRM. Suitable optical adhesives, preferably index matching adhesives as described supra, may be used to construct a mirror that comprises a light emitting element which emits light through a sheet of PRM, which is positioned behind a glass substrate through which the emitted light also passes. Such a mirror would appear reflective when the light emitting element (e.g., a red LED such as described supra) is unpowered, yet would efficiently display a warning indicia when the light emitting element is powered, strobed or flashed. Also, PRM being a polymer material is relatively easily formed by molding, slumping, bending and similar polymer forming methods, so conformance to a compound curvature or convex curvature is facilitated.

In that aspect of the present invention directed to exterior rearview mirrors for motor vehicles, it may be advantageous to use in conjunction therewith signal lights, security lights, flood lights, remote actuation and combinations thereof as taught by and described in commonly assigned co-pending U.S. patent application Ser. No. 08/011,947, filed Feb. 1, 1993 ("the '947 application"), now U.S. Pat. No. 5,371,659, the disclosure of which is hereby incorporated herein by reference.

In accordance with the disclosure of U.S. patent application Ser. No. 08/011,947, filed Feb. 1, 1993 ("the '947 application"), now U.S. Pat. No. 5,371,659, a personal safety feature is provided for a vehicle in the form of a floodlight adapted to projecting light generally downwardly on an area adjacent a portion of the vehicle in order to create a lighted security zone in the area. Advantageously, the floodlight is preferably positioned in the housing of an exterior mirror having a reflective element also positioned in the housing. According to an aspect of the disclosure of U.S. patent application Ser. No. 08/011,947, filed Feb. 1, 1993 ("the '947 application"), now U.S. Pat. No. 5,371,659, an actuator is provided for the floodlight including a base unit in the vehicle and a remote transmitter. The base unit is responsive to a signal from the remote transmitter in order to actuate the floodlight. This allows the vehicle operator to actuate the floodlight from a distance in order to establish the security zone prior to approaching the vehicle.

According to another aspect of the disclosure of U.S. patent application Ser. No. 08/011,947, filed Feb. 1, 1993 ("the '947 application"), now U.S. Pat. No. 5,371,659, an actuator for the floodlight includes a lockout device in order to prevent actuation of the floodlight during operation of the vehicle. According to yet a further aspect of the disclosure of U.S. patent application Ser. No. 08/011,947, filed Feb. 1, 1993 ("the '947 application"), now U.S. Pat. No. 5,371,659, a signal light that is adapted to projecting light generally rearwardly of the vehicle is included in the exterior mirror housing. An actuator for the warning light is connected with the stoplight circuit, turn signal circuit, or both the stoplight and turn signal circuit, of the vehicle in order to actuate the warning light when either the stoplight or turn signal is being actuated.

According to yet another aspect of the disclosure of U.S. patent application Ser. No. 08/011,947, filed Feb. 1, 1993 ("the '947 application"), now U.S. Pat. No. 5,371,659, the floodlight is adapted to projecting a pattern of light from the housing on an area adjacent a portion of the vehicle that extends laterally onto the vehicle and downwardly and rearwardly of the vehicle. In this manner, a security zone is established from the vehicle door to the rear of the vehicle. The signal light is adapted to projecting a pattern of light extending laterally away from the vehicle and rearwardly of the vehicle. In this manner, the pattern generated by the signal light cannot be substantially observed by a driver of the vehicle. However, the pattern generated by the signal light may be observed by a driver of another vehicle passing the vehicle equipped according to the invention.

The floodlight and signal lights may be generated by a light emitting diode positioned in the housing, a vacuum fluorescent lamp positioned in the housing, an incandescent lamp positioned in the housing or a light source in the vehicle and a light pipe between the light source and the mirror housing.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The provision for remote actuation of the security light provides a deterrent to ward off persons lurking around the protected vehicle while the users are still at a safe distance from the vehicle. The provision for a lockout circuit ensures that the security light will not inadvertently be actuated while the vehicle is in motion. The disclosure of U.S. patent application Ser. No. 08/011,947, filed Feb. 1, 1993 ("the '947 application"), now U.S. Pat. No. 5,371,659, further, conveniently combines a signal light that acts in unison with the vehicle's turn signal, brake light, or both, with the security light in an exterior mirror assembly. The signal light may be designed to be observed by other vehicles passing the equipped vehicle but not directly by the driver of the equipped vehicle.

The electrochromic mirrors of the present invention may also include an anti-reflective means, such as an anti-reflective coating, on the front (non-inward) surface of the outermost or frontmost substrate as viewed by an observer (see e.g., Lynam V); an anti-static means, such as a conductive coating, particularly a substantially transparent conductive coating, such as ITO, tin oxide and the like; index matching means to reduce internal and interfacial reflections, such as thin films of an appropriately selected optical path length; and/or light absorbing glass, such as glass tinted to a neutral density, such as "GRAYLITE" gray tinted glass (commercially available from Pittsburgh Plate Glass Industries) and "SUNGLAS" gray tinted glass (commercially available from Ford Glass Co., Detroit, Mich.), which assists in augmenting contrast enhancement. Moreover, polymer interlayers, which may be tinted gray, such as those used in electrochromic devices as taught by and described in Lynam I, may be incorporated into the electrochromic mirrors described herein.

The mirrors of this present invention, particularly rearview mirrors intended for use on the exterior motor vehicles, may also benefit from an auxiliary heating means used in connection therewith such as those taught by and described in U.S. Pat. No. 5,151,824 (O'Farrell) and U.S. patent application Ser. No. 07/971,676, filed Nov. 4, 1992, now U.S. Pat. No. 5,446,576 ("the '676 application"), the disclosures of each of which are hereby incorporated herein by reference. Preferred among such heating means are positive temperature coefficient ("PTC") heater pads such as those commercially available from ITW Chromomatic, Chicago, Ill. These heater pads employ conductive polymers, such as a crystalline organic polymer or blend within which is dispersed a conductive filler like carbon black, graphite, a metal and a metal oxide, [see e.g., U.S. Pat. No. 4,882,466 (Friel)]. The heater pads exhibit a positive temperature coefficient; that is, their resistance increases when the surrounding temperature increases. Thus, the heater pads may be used as a self-regulating heating element.

As an alternative to a heater pad, a heater means, such as a resistance layer or heating film, may be deposited (such as through vacuum deposition, thick film printing, screen printing, dispensing, contact printing, flow coating and the like) onto the outward facing surface of substrate 3 (i.e., onto the rearmost surface of an electrochromic mirror assembly). Suitable heater means include a PTC material, a metal thin film layer (such, chromium, molybdenum, a nickel-based alloy like Inconel and Hastelloy, stainless steel, titanium and the like), and a transparent conductor thin film [such as tin oxide (doped or undoped) and indium tin oxide]. Such heater means are disclosed in the '676 application.

The heater means referred to above function both to assure rapid coloration and bleaching of an electrochromic rearview mirror when operated at low temperatures, and to remove any frost or dew which may accumulate on the outward facing surface of substrate 2 (i.e., the outermost surface of the rearview mirror that is contacted by outdoor elements like rain, snow, dew and the like). For example, a convex or multi-radius electrochromic outside mirror for an automobile may be fabricated by forming substrate 3 through bending a fluorine-doped tin oxide coated glass substrate (such as a "TEC-Glass" product like "TEC 20", "TEC 12" or "TEC 10") so that the transparent conductor doped tin oxide thin film coating is located on the concave surface of substrate 3. The opposite, convex surface of substrate 3 is coated with a metal reflector layer (such as silver, optionally being undercoated with a chromium adhesion promoter layer) and the reflector in turn is contacted with an electrochromic layer, such as tungsten oxide. This convex surface reflector coated/concave surface transparent conductor coated substrate 3 is then mated with an equivalently bent substrate 2 that is coated on its concave (inward facing) surface with a transparent conductor (such as fluorine doped tin oxide), and with an electrolyte between the mated substrates to form an electrochromic exterior rearview mirror. Next, bus bars (e.g., a conductive frit, solder or the like) are formed on opposing sides of the transparent conductor thin film heater on the rearmost, concave surface of substrate 3. When connected to the 12 volt battery/ignition electrical supply of a vehicle, the transparent conductor thin film heater on the rearmost, concave surface of substrate 3 heats the electrochromic medium and defrosts the front, outermost, concave surface of substrate 2.

If a display is to be mounted behind the reflective element, an appropriately sized and shaped aperture through the auxiliary heating means should be used to accommodate the display but not leave portions of the mirror unheated for de-icing or de-misting purposes. Likewise, should a heat distribution pad be used, such as an aluminum or copper foil as described in the '676 application, an appropriately sized and shaped aperture should also be provided therein to accommodate such displays. Where apertures are to be included in a PTC heater pad, a pattern of resistive electrodes which contact the conductive polymer, which may typically be applied by a silk-screening process as described in Friel, should be designed to accommodate the apertures in the pad. In addition, such a pattern may also be useful to thermally compensate for the apertures in the pad. Alternatively, the resistive electrode/conductive polymer combination may be applied, for example, directly onto the rearmost (non-inward) surface of substrate 3, or onto a heat distribution pad that is contacted and/or adhered thereto.

It may also be advantageous to provide mirrors in the form of a module, which module comprises the mirror itself and its electrical connection means (e.g., electrical leads); any heater pad (optionally, including a heat distribution pad) and associated electrical connection means; bezel frames; retaining members (e.g., a one-piece plate) and electrical connection means (see e.g., O'Farrell); actuators [e.g., Model No. H16-49-8001 (right-hand mirror) and Model No. H16-49-8051 (left-hand mirror), commercially available from Matsuyama, Kawoge City, Japan] or planetary-gear actuators [see e.g., U.S. Pat. No. 4,281,899 (Oskamo) and the '947 application, the disclosures of each of which are hereby incorporated herein by reference] or memory actuators that include memory control circuitry such as Small Electrical Actuator #966/001 which includes a 4 ear adjusting ring, 25 degree travel and an add-on memory control and is available from Industrie Koot B. V. (IKU) of Montfort, Netherlands; and brackets for mounting the module within the casing or housing of a mirror assembly such as taught by and described in the '947 application. Electrochromic mirrors may be assembled using these items to provide modules suitable for use with a mirror casing or housing that includes the electrochromic element, which incorporates the reflective element and any associated components such as heater means, bezel means, electrically or manually operable actuation means, mounting means and electrical connection means. These components may be pre-assembled into a module that is substantially sealed from the outside environment through the use of sealants like silicones, epoxies, epoxides, urethanes and the like. These components may also be formed and/or assembled in an integral molding process, such as with those processes described in U.S. Pat. No. 4,139,234 (Morgan) and U.S. Pat. No. 4,561,625 (Weaver), each of which describe suitable molding processes in the context of modular window encapsulation. An added-value electrochromic mirror module, including the actuators which allow adjustment and selection of reflector field of view when mounted within the outside mirror housings attached to the driver-side and passenger-side of a vehicle, may be pre-assembled and supplied to outside vehicular mirror housing manufacturers to facilitate ease and economy of manufacturing.

Many aspects of the present invention, particularly those relating to the use of PRM and emitting displays; glass cover sheets, foils and the like; and thin film metal coatings that are applied locally and that are substantially reflecting and partially transmitting, may of course be employed with non-electrochromic rearview mirrors for motor vehicles, such as conventional prismatic mirrors. For instance, with exterior rearview mirrors for motor vehicles, a driver-side rearview mirror and a passenger-side rearview mirror may be mounted in combination on a motor vehicle to be used to complement one another and enhance the driver's rearward field of view. One of such mirrors may be an electrochromic mirror and the other mirror may be a non-electrochromic mirror, such as a chromed-glass mirror, with both exterior mirrors benefiting from these aspects of the present invention. In addition, these aspects of the present invention may be employed in connection with a display window that has been established in a prismatic mirror.

Substrate 2 may be of a laminate assembly comprising at least two transparent panels affixed to one another by a substantially transparent adhesive material, such as an optical adhesive as described herein. This laminate assembly assists in reducing the scattering of glass shards from substrate 2 should the mirror assembly break due to impact. Likewise, substrates 2, 3 may each be of such a laminate assembly in a glazing, window, sun roof, display device, contrast filter and the like.

Also, the outermost surface of substrate 2 (i.e., the surface contacted by the outdoor elements including rain, dew and the like when, for example, substrate 2 forms the outer substrate of an interior or exterior rearview mirror for a motor vehicle constructed such as shown in FIGS. 1 to 13) can be adapted to have an anti-wetting property. For example, the outermost glass surface of an exterior electrochromic rearview mirror can be adapted so as to be hydrophobic. This reduces wetting by water droplets and helps to obviate loss in optical clarity in the reflected image off the exterior mirror when driven during rain and the like, caused by beads of water forming on the outermost surface of the exterior electrochromic mirror assembly. Preferably, the outermost glass surface of the electrochromic mirror assembly is modified, treated or coated so that the contact angle θ (which is the angle that the surface of a drop of liquid water makes with the surface of the solid anti-wetting adapted outermost surface of substrate 2 it contacts) is preferably greater than about 90°, more preferably greater than about 120° and most preferably greater than about 150°. The outermost surface of substrate 2 may be rendered anti-wetting by a variety of means including ion bombardment with high energy, high atomic weight ions, or application thereto of a layer or coating (that itself exhibits an anti-wetting property) comprising an inorganic or organic matrix incorporating organic moieties that increase the contact angle of water contacted thereon. For example, a urethane coating incorporating silicone moieties (such as described in Lynam II, the disclosure of which is hereby incorporated by reference) may be used. Also, to enhance durability, diamond-like carbon coatings, such as are deposited by chemical vapor deposition processes, can be used as an anti-wetting means on, for example, electrochromic mirrors, windows and devices.

It is clear from the teaching herein that should a glazing, window, sun roof, display device, contrast filter and the like be desirably constructed, the reflective element 8 need only be omitted from the assembled construction so that the light which is transmitted through the transparent substrate is not further assisted in reflecting back therethrough.

In the aspects, of the present invention concerning electrochromic devices, particularly electrochromic optical attenuating contrast filters, such contrast filters may be an integral part of an electrochromic device or may be affixed to an already constructed device, such as cathode ray tube monitors. For instance, an optical attenuating contrast filter may be manufactured using an electrochromic element as described herein and then affixing it to a device, using a suitable optical adhesive. In such contrast filters, the constituents of the electrochromic element should be chosen so that the contrast filter may color to a suitable level upon the introduction of an applied potential thereto, and no undesirable spectral bias is exhibited.

Also, an electrochromic reflector according to this invention can be used with a refracting means comprising a first refractor and a second refractor. The first refractor diverts incident light towards the electrochromic variably dimmable reflector. The second refractor is positioned so that light from the first refractor is incident thereon and directs light from the electrochromic reflector towards the observer (typically, the driver of a motor vehicle). A refracting means suitable for use in accordance with this invention is described in U.K. Patent GB 2,254,832B for "A Rear View Mirror Unit", the disclosure of which is hereby incorporated herein by reference.

Figure 15:
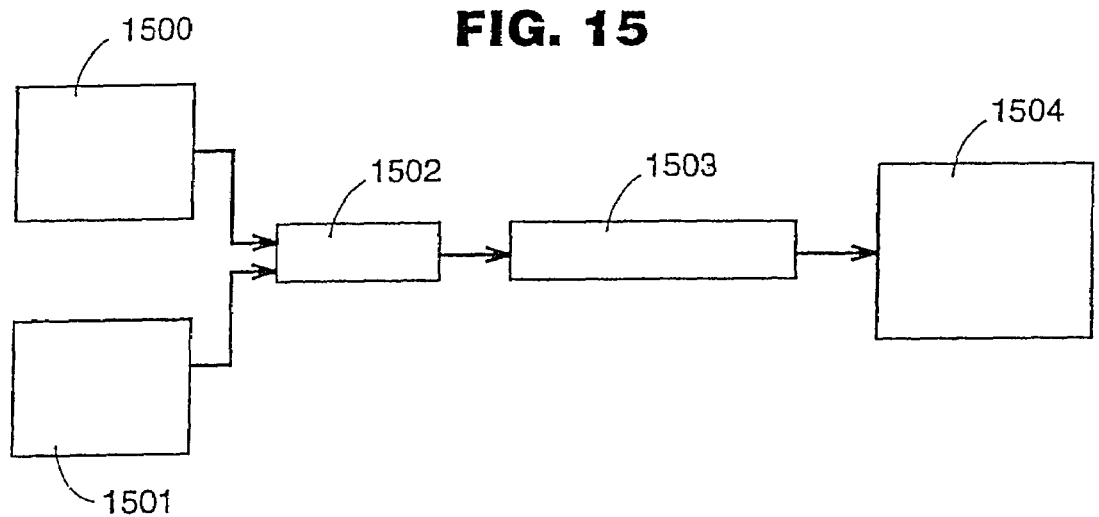
FIG. 15 is a schematic diagram of a synchronous manufacturing process for electrochromic mirrors according to the present invention.
Figure 16:
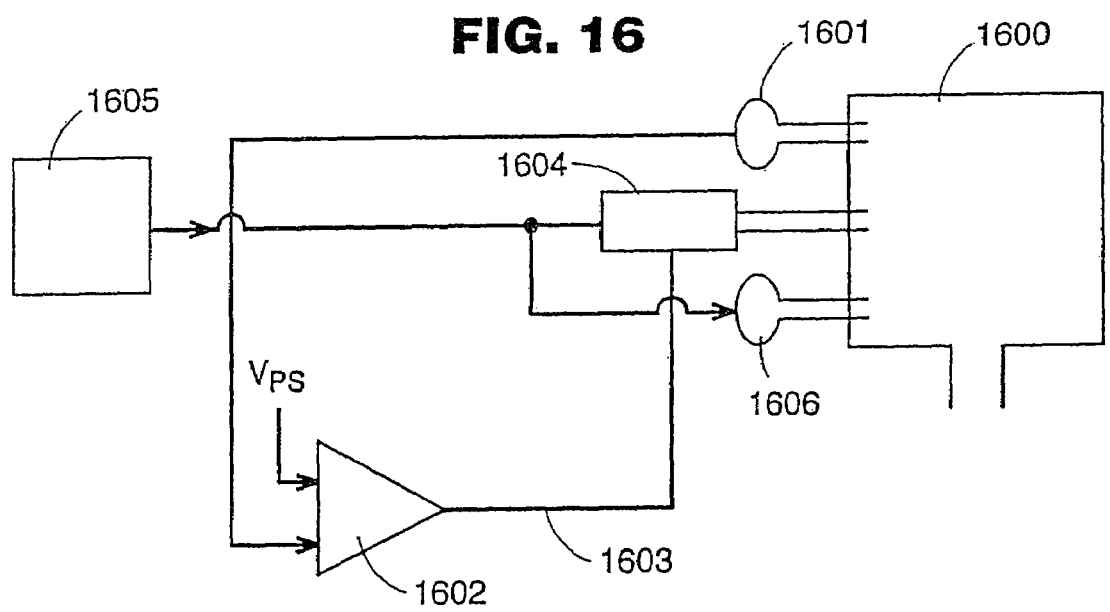
FIG. 16 is a schematic diagram of a constant pressure control system useful for evaporative deposition of solid electrochromic films.

A synchronous manufacturing process, such as the one represented in FIG. 15, may be used for the production of both interior and exterior electrochromic rearview mirrors. For example, uncoated glass shapes (which may be flat shapes, curved shapes or multi-radius shapes) already cut to the desired shape and size of the substrate 2 are loaded into the evaporative coater 1500 and a transparent conductor (such as indium tin oxide) is deposited thereon [such as by electron beam evaporation at a rate of about 3-5 Å/sec using an oxygen backfill pressure within the range of from about $5 \times 10^{-5}$ torr to about $9 \times 10^{-4}$ torr oxygen partial pressure and with the substrate heated to a temperature within the range of about 200° C. to about 450° C.]. Synchronous with this deposition, uncoated glass shapes already cut to the desired shape and size of the substrate 3 are loaded into the evaporative coater 1510. An adhesion layer of chromium, followed by a reflector layer of aluminum, followed by an electrochromic solid film layer of tungsten oxide are then deposited thereon. After substrate coating is complete, the substrates 2, 3 pass to a seal dispensing station 1520 where a high speed, computer-controlled automatic fluid dispensing system (such as AUTO-MOVE 400) is used to dispense a latent cure, one-package epoxy around the edge periphery of the transparent conductor coated surface of the substrate 2. Next, and with the substrates 2, 3 held in fixtures, the respective inwardly-facing surfaces are mated, with the weight of the fixture itself providing a temporary hold to keep the mated surfaces in place. The sandwiched parts are then moved to a conveyorized oven or lehr 1530, where the latent curing agent in the latent cure epoxy is activated by exposure to a temperature of at least about 110° C. Upon exiting the conveyorized oven or lehr 1530, the now permanently mated cell is removed from the fixtures (which are themselves reusable) and the cell is filled and finished at the fill/assembly station 1540. Use of such a synchronous manufacturing process, and particularly when a latent cure epoxy is used which is dispensed by an automatic fluid dispenser, with the epoxy cured in a conveyorized oven or lehr, is well-suited for economic, high volume, lean manufacturing of products, such as interior and exterior electrochromic rearview mirrors.

Many aspects of the present invention, especially those concerning mirror construction, use of elemental semiconductor layers or stacks (with or without an additional undercoat of silicon dioxide and/or an overcoat of doped tin oxide), PRM, anti-wetting adaptation, synchronous manufacturing, localized thin film coatings, multi-layer transparent conducting stacks incorporating a thin metal layer overcoated with a conducting metal oxide layer, conducting seals, variable intensity band pass filters, isolation valve vacuum backfilling, cover sheets and on demand displays, may of course be incorporated into electrochromic mirrors and electrochromic devices that employ electrochromic technology for the electrochromic element different from that which is taught and described herein, such as electrochromic solution technology of the electrochemichromic type (e.g., Byker I, Byker II, Varaprasad I and Varaprasad III) and electrochromic solid film technology (e.g., the '675 application, the '557 application and Lynam I), including electrochromic organic thin film technology, in which a thin film of organic electrochromic material such as a polymerized viologen is employed in the electrochromic element [see e.g., U.S. Pat. No. 4,473,693 (Wrighton)].

Also, an electrochromic solid film may be used which is formed of an inorganic metal oxide, such as a semiconductor electrode of transparent polycrystalline titanium dioxide ($TiO_2$), to which is attached a redox species (such as a viologen) using a chelate (spacer) such as salicylic acid chemiabsorbed to the $TiO_2$ by chelation to surface $Ti^{4+}$ atoms. When such a solid film [such as is described in Marquerettaz et al., J. Am. Chem. Soc., 116, 2629-30 (1994), the disclosure of which is hereby incorporated herein by reference] is deposited (preferably with a thickness of about 0.1 µm to about 10 µm) upon an electronic conducting layer, such as fluorine-doped tin oxide, an electron donor ($TiO_2$)— spacer (the salicylic acid bound to the $TiO_2$)— electron acceptor (the viologen bound to the salicylic acid) heterodyad is formed that is capable of efficient electrochromic activity. Such donor-spacer-acceptor complexes can include multiple acceptors, such as may be formed when a second acceptor (such as a quinone like anthraquinone) is linked to a first acceptor (such as a viologen). Such a donor-spacer-acceptor solid film can function as an electrochromic solid film, and may be advantageously employed in the electrochromic rearview mirrors, windows, sun roofs and other devices of this invention.

The electrochromic medium can comprise a variety of electrochromically active moieties attached, such as by chemical bonding, to an organic or inorganic matrix, and/or included in a polymer structure as electrochromically active sites. For example, an electrochromically active phthalocyanine-based, and/or phthalocyanine-derived, moiety that, preferably, is color-fast and UV stable in both its reduced and oxidized state, can be included in the electrochromic medium, preferably as part of a solid film. Electrochromically active phthalocyanines that can be incorporated in a solid, and/or formed as a solid, include transition metal phthalocyanines such as zirconium phthalocyanines and molybdenum phthalocyanines, such as described in J. Silver et al., Polyhedron, 8 (13/14), 1163-65 (1989), the disclosure of which is hereby incorporated herein by reference; solid state polymerized phthalocyanines such as are formed by thermal polymerization of dihydroxy(metallo)phthalocyanine compounds of Group IVa elements as disclosed by K. Beltios et al., J. Polym. Sci.: Part C: Polymer Letters, 27, 355-59 (1989), the disclosure of which is hereby incorporated herein by reference; silicon phthalocyanine-siloxane polymers such as described in J. Davison et al., Macromolecules, 11(1), 186-91 (January-February 1978), the disclosure of which is hereby incorporated herein by reference; and lanthanide diphthalocyanines such as lutetium diphthalocyanine such as described by G. Corker et al., J. Electrochem. Soc., 126, 1339-43 (1979), the disclosure of which is hereby incorporated herein by reference. Such phthalocyanine-based electrochromic media, preferably in solid form and, most preferably, UV stable in both their oxidized and reduced states, may be advantageously employed in the electrochromic rearview mirrors, windows, sunroofs, and other device of this invention.

Once constructed, the electrochromic device, such as an electrochromic mirror, may have a molded casing or housing placed therearound. This molded casing or housing may be pre-formed and then placed about the periphery of the assembly or, for that matter, injection molded therearound using conventional techniques, including injection molding of thermoplastic materials, such as polyvinyl chloride or polypropylene, or reaction injection molding of thermosetting materials, such as polyurethane or other thermosets. These techniques are well-known in the art [see e.g., Morgan and Weaver, respectively].

Also, where it is desirable to dispense a fluid medium, such as a potentially air-sensitive electrolyte, into the cell cavity (or interpane spacing) formed between substrates 2 and 3 in an empty electrochromic cell (such as an empty electrochromic rearview mirror cell), a vacuum backfilling method, such as described in Varaprasad IV, may be used.

For example, a vacuum backfill apparatus can be configured with a first bell-jar chamber capable of receiving an empty electrochromic rearview cell and a second chamber, separate from the first bell-jar chamber. The second chamber includes a container, such as a crucible, which holds the potentially air-sensitive electrolyte to be filled into the empty interpane cavity of the electrochromic mirror cell in the bell-jar chamber. The second chamber is initially maintained at an atmospheric pressure of inert gas (such as nitrogen). An isolation valve (such as a gate valve) separates this second inert gas-filled chamber from the first bell-jar chamber, that itself is initially at an atmospheric pressure of ordinary air. After loading an empty cell into the first bell-jar chamber, a vacuum pump is used to evacuate the air therefrom to create a high vacuum (i.e., a low partial pressure of the components of air such as oxygen, water vapor, carbon dioxide, nitrogen, etc.) within the first bell-jar chamber. A high vacuum is also created within the interpane cavity of the rearview mirror empty cell in the now evacuated first bell-jar chamber. Next, and only when the air within the bell-jar chamber has been substantially removed, the isolation valve between the bell-jar chamber and the electrolyte-containing crucible in the second chamber is opened. The vacuum pump now pumps on the second chamber to pump away the inert gas therein. As a result, both the bell-jar chamber and the second chamber are brought to a high vacuum.

Procedures described in Varaprasad IV for backfilling are now followed. During the venting step, the bell-jar chamber/second chamber is vented to an atmospheric pressure of inert gas (such as nitrogen). The isolation valve is then closed, once again isolating the second chamber (now refilled with inert gas) from the bell-jar chamber. Once the second chamber is again isolated, the bell-jar chamber is opened to an ordinary room air atmosphere and the now-filled mirror cell is removed.

In such a vacuum backfilling technique using an isolation valve means, backfilling occurs using an inert gas but the use of an isolation valve (such as a gate valve, sluice valve, port valve, slit valve or equivalent isolation valve) isolates the potentially air-sensitive electrolyte from the air atmosphere at those times when the empty cell is inserted, and the filled cell is removed, from the bell-jar chamber. Such use of an isolation valve means during vacuum backfilling using an inert gas allows for the bell-jar chamber to be loaded and unloaded in an ordinary room air environment, while protecting the potentially air-sensitive electrolyte from exposure to air. In such an isolation valve vacuum backfilling apparatus, a suitable dispenser can be used to replenish the crucible with electrolyte, with the electrolyte being pumped from an electrolyte reservoir that is maintained under air-tight conditions without being exposed to air. With this arrangement, the electrolyte is replenished without being exposed to air. Also, as an alternative to flooding the second chamber with inert gas when the isolation valve is closed (so as to isolate the electrolyte in the second chamber from contact with air), a vacuum can be established (and/or maintained) in this second chamber when the isolation valve is closed.

Each of the documents cited herein is hereby incorporated by reference to the same extent as if each document had individually been incorporated by reference.

In view of the above description of the instant invention, it is evident that a wide range of practical opportunities is provided by the teaching herein. The following examples of electrochromic mirrors and electrochromic devices are provided to illustrate the utility of the present invention only and are not to be construed so as to limit in any way the teaching herein.

EXAMPLES

Example 1

An electrochromic interior rearview automotive mirror cell having a shape commonly used for interior rearview mirrors was constructed from clear HW-ITO-coated glass as the first substrate (having a sheet resistance of about 12 ohms per square), with a tungsten oxide electrochromic solid film coated over its HW-ITO coating (which is coated onto the inward surface of the substrate). As the second substrate of the mirror cell, a HW-ITO-coated glass substrate (also having a sheet resistance of about 12 ohms per square) with the ITO coated onto its inward surface was used. A reflective element was formed by coating a layer of silver onto the rearmost (opposite, non-inward) surface of the second substrate of the mirror cell. The HW-ITO was coated onto the glass substrates at a thickness of about 1,500 Å; the tungsten oxide electrochromic solid film was coated over the HW-ITO coating of the first substrate at a thickness of about 5,000 Å; and the silver was coated onto the rearmost surface of the second substrate using conventional wet chemical silver line deposition as known in the mirror art. The first substrate was positioned in spaced-apart relationship with the second substrate to form a 88 μm interpane spacing between the coated inward surfaces of the substrates. The first substrate was also laterally displaced from the second substrate to provide a convenient area for bus bar attachment.

We formulated an electrolyte for this mirror cell containing ferrocene (about 0.015 M), phenothiazine (about 0.06 M), lithium perchlorate (about 0.05 M) and "UVINUL" 400 [about 5% (w/v)] in a solvent combination of tetramethylene sulfone and propylene carbonate [in a ratio of about 50:50 (v/v)].

We dispensed the electrolyte described above into the mirror cell by the vacuum backfilling method (as described in Varaprasad IV].

Upon application of about 1.4 volts, we observed that the mirror dimmed uniformly and rapidly to a neutral gray colored state. Specifically, we observed that the mirror dimmed from about 70% reflectance to about 20% reflectance in a response time of about 3.2 seconds. In addition, we observed that the mirror exhibited a high reflectance in the unpowered, bleached state of about 74.7% and a low reflectance in the dimmed state of about 5.9%

We made and recorded these observations following the standard procedure J964A of the Society of Automotive Engineers, using a reflectometer—set in reflectance mode—equipped with a light source (known in the art as Standard Illuminant A) and a photopic detector assembly.

Figure 2:
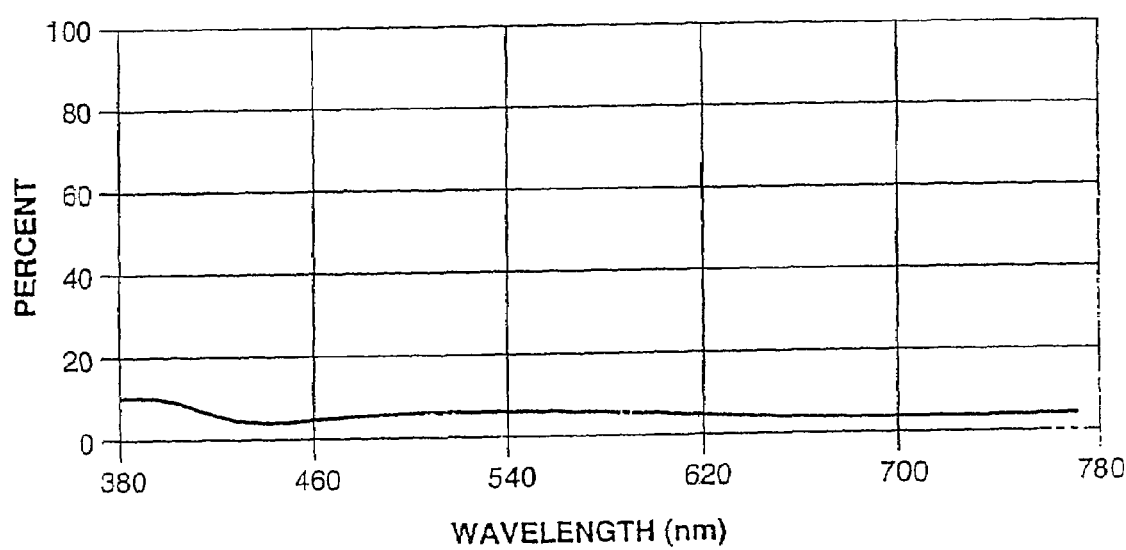
FIG. 2 depicts a spectral scan of percent reflectance versus wavelength in nanometers of an electrochromic mirror according to the present invention when dimmed to a neutral colored state.

Spectral scans were recorded using a conventional spectrophotometer operating in reflection mode in both the bleached state [see FIG. 1 and Tables II(a) and II(b)] and the colored state at an applied potential of about 1.5 volts [see FIG. 2 and Tables III(a) and III(b)].

TABLE II(a)

Reflectance Data In The Unpowered, Bleached State

| WL (nm) | 0 | 5 | 10 | 15 | 20 | 25 | 30 | 35 | 40 | 45 |
|---|---|---|---|---|---|---|---|---|---|---|
| 380 | 14.5 | 20.4 | 29.1 | 38.2 | 45.9 | 51.7 | 56.1 | 59.5 | 61.9 | 64.2 |
| 430 | 65.9 | 67.7 | 68.9 | 70.4 | 71.6 | 72.7 | 73.6 | 74.8 | 75.4 | 76.2 |
| 480 | 77.0 | 77.7 | 78.1 | 78.9 | 79.5 | 80.2 | 80.6 | 80.7 | 80.7 | 80.9 |
| 530 | 80.7 | 80.6 | 80.0 | 80.1 | 79.4 | 79.3 | 78.8 | 78.5 | 78.1 | 77.8 |
| 580 | 77.2 | 76.9 | 76.5 | 75.8 | 75.1 | 74.5 | 74.1 | 73.5 | 72.5 | 71.9 |
| 630 | 71.4 | 70.6 | 70.1 | 69.4 | 68.7 | 67.9 | 67.2 | 66.5 | 65.6 | 64.9 |
| 680 | 64.5 | 63.6 | 62.9 | 62.0 | 61.3 | 60.6 | 60.2 | 59.6 | 58.6 | 57.4 |
| 730 | 57.1 | 56.6 | 55.7 | 55.0 | 54.6 | 53.9 | 52.5 | 51.6 | 51.2 | 50.7 |
| 780 | 50.5 | | | | | | | | | |

TABLE II(b)

Color Statistics - C.I.E. Convention Using 2 Degree Eye

| Illuminant | x | y | DomWave | Purity | Y |
|---|---|---|---|---|---|
| A | 0.4422 | 0.4172 | 547.0 | 3.2 | 77.0 |
| C | 0.3097 | 0.3304 | 549.7 | 3.8 | 77.8 |

TABLE III(a)

Reflectance In The Colored State at 1.5 Volts

| WL (nm) | 0 | 5 | 10 | 15 | 20 | 25 | 30 | 35 | 40 | 45 |
|---|---|---|---|---|---|---|---|---|---|---|
| 380 | 11.4 | 11.6 | 11.8 | 11.5 | 10.6 | 9.5 | 8.6 | 7.7 | 6.8 | 6.1 |
| 430 | 5.5 | 5.0 | 5.0 | 5.1 | 5.6 | 5.6 | 5.8 | 6.0 | 6.2 | 6.3 |
| 480 | 6.5 | 6.7 | 6.8 | 6.9 | 7.0 | 7.1 | 7.2 | 7.2 | 7.2 | 7.3 |
| 530 | 7.4 | 7.6 | 7.8 | 8.0 | 8.1 | 8.1 | 8.0 | 7.8 | 7.6 | 7.4 |
| 580 | 7.3 | 7.0 | 6.8 | 6.6 | 6.3 | 6.1 | 6.0 | 5.7 | 5.6 | 5.4 |
| 630 | 5.4 | 5.2 | 5.2 | 5.1 | 5.0 | 4.9 | 4.9 | 4.8 | 4.8 | 4.8 |
| 680 | 4.8 | 4.8 | 4.8 | 4.7 | 4.8 | 4.8 | 4.8 | 4.8 | 4.8 | 4.8 |
| 730 | 4.9 | 4.9 | 4.9 | 5.0 | 5.1 | 5.0 | 5.1 | 5.2 | 5.1 | 5.2 |
| 780 | 5.4 | | | | | | | | | |

TABLE III(b)

| Color Statistics - C.I.E. Convention Using 2 Degree Eye at 1.5 Volts | | | | | |
|---|---|---|---|---|---|
| Illuminant | x | y | DomWave | Purity | Y |
| A | 0.4323 | 0.4342 | 545.3 | 8.5 | 7.0 |
| C | 0.3098 | 0.3499 | 549.3 | 8.9 | 7.1 |

We also cycled the mirror as described in Table IV below.

TABLE IV

| Number of | Cycle | Color/Bleach | |
|---|---|---|---|
| Cycles | Temperature (° C.) | Cycle (secs) | Voltage |
| 30,000 | 50 | 5/5 | 1.4/0.0 |
| 40,000 | room temperature | 5/5 | 1.4/0.0 |
| 30,000 | −30 | 5/5 | 1.4/0.0 |
| 90,000 | 50 | 5/5 | 1.6/0.0 |
| 11,000 | 80 | 30/30 | 1.4/0.0 |

After subjecting this mirror to such cycling conditions, we observed the reflectance of the mirror to decrease from about 70% to about 20% in a response time of about 3.2 seconds. In addition, we observed the mirror to have a high reflectance in the unpowered, bleached state of about 78.6% and a low reflectance in the dimmed state of about 6.4% when a potential of 1.4 volts was applied thereto. We made and recorded these observations using the SAE procedure referred to supra.

We observed that these mirrors exhibited excellent stability to temperature extremes., For example, after storage at temperatures in the 80° C.-110° C. range, for periods ranging from about 2 hours to in excess of 336 hours, performance remained excellent, and, indeed, in aspects such as transition times from low to high reflectance states performance was even better after heat exposure.

Example 2

In this example, we used the same electrolyte formulation and an electrochromic mirror constructed in the same manner as in Example 1, supra.

We introduced an applied potential of about 1.4 volts to the mirror and observed its center portion to change from a high reflectance of about 75.9% to a low reflectance of about 6.3%, which decreased from about 70% reflectance to about 20% reflectance in a response time of about 3.5 seconds.

We then subjected this mirror to an accelerated simulation of outdoor weathering conditions to investigate its resilience and stability to ultraviolet light. Specifically, we subjected the mirror to about 1300 KJ/m$^2$ of ultraviolet exposure in an Atlas Ci35A Xenon Weather-o-meter (Atlas Electric Devices Company, Chicago, Ill.), equipped with a Xenon lamp emitting about 0.55 w/m$^2$ intensity at about 340 nm. After accelerated outdoor weathering, we observed that the mirror continued to function suitably for use in a motor vehicle. We also observed that the mirror cycled well. In addition, we observed the high reflectance to be about 75.2% and the low reflectance to be about 6.9% when a potential of about 1.4 volts was applied thereto.

We made and recorded these observations using the SAE procedure referred to in Example 1, supra.

Example 3

The electrochromic mirror cell of this example was constructed from clear HW ITO-coated glass as the first substrate as in Example 1, supra. However, the second substrate was constructed of ordinary soda-lime glass. Using electron beam evaporation in a vacuum chamber, a layer of chromium was coated directly onto the inward surface of the second glass substrate as an adhesion promoter. Next, and without breaking vacuum, a thin film of silver was coated onto the layer of chromium as a reflective element, and thereafter (again without breaking vacuum) tungsten oxide was coated over the layer of silver as an electrochromic solid film. The layer of chromium was coated onto the second substrate at a thickness of about 1,000 Å; the thin film of silver was coated over the chromium at a thickness of about 1,000 Å; and the tungsten oxide was coated over the silver at a thickness of about 5,000 Å. The sheet resistance of the silver so undercoated with chromium was about 0.4 to. 0.5 ohms per square. As with the mirror cell of Example 1, supra, the first substrate was positioned in spaced-apart relationship with the second substrate to form an 88 μm interpane spacing between the coated inward surfaces of the substrates. The first substrate was laterally displaced from the second substrate to provide a convenient area for bus bar attachment.

We used the electrolyte of Example 1, supra, and dispensed it into the mirror cell using the vacuum backfilling method [as described in Varaprasad IV].

We introduced an applied potential of about 1.4 volts to the mirror and observed the change from a high reflectance of about 81.6% to a low reflectance of about 5.9%, which decreased from about 70% reflectance to about 20% reflectance in a response time of about 1.9 seconds.

We made and recorded these observations using the SAE procedure referred to in Example 1, supra.

We also cycled the mirror as described in Table V below.

TABLE V

| Number | Cycle | Color/Bleach | |
|---|---|---|---|
| of Cycles | Temperature (° C.) | Cycle (secs) | Voltage |
| 30,000 | 50 | 5/5 | 1.4/0.0 |
| 40,000 | room temperature | 5/5 | 1.4/0.0 |

After subjecting the mirror to such cycling conditions, we observed the reflectance of the mirror in the unpowered, bleached state to be 77.3%, and the mirror dimmed to 6.2% reflectance with 1.4 volts applied thereto.

Example 4

We used an electrochromic mirror cell constructed in the same format and with the same shape and dimensions as in Example 1, supra, except that a tungsten oxide electrochromic solid film (having a thickness of about 5,000 Å) was coated over the HW-ITO coating on the inward surface of the second substrate.

We formulated an electrolyte containing ferrocene (about 0.025 M), phenothiazine (about 0.05 M), lithium perchlorate (about 0.05 M) and "UVINUL" 400 [about 10% (w/v)] in a solvent combination of tetramethylene sulfone and propylene carbonate [in a ratio of about 25:75 (v/v)]. We dispensed the electrolyte into the mirror cell using the vacuum backfilling method [as described in Varaprasad IV].

Upon introduction of an applied potential of about 1.4 volts, we observed the mirror to dim uniformly and rapidly to a neutral gray colored state. Specifically, we observed the mirror to have a high reflectance in the unpowered, bleached state of about 70.7% and a low reflectance in the dimmed state of about 7.3%. We made and recorded these observations using the SAE procedure referred to in Example 1, supra.

We also cycled the mirror and subjected the mirror to an accelerated simulation of outdoor weathering conditions to investigate its resilience and stability to ultraviolet light as described in Example 2, supra, but at an exposure of about over 2,500 KJ/m$^2$. We observed that the mirror cycled well, and after accelerated outdoor weathering, we also observed that the mirror continued to function in a manner suitable for use in a motor vehicle.

Example 5

In this example, we fabricated an electrochromic glazing cell of a construction suitable for use as a window or a sun roof for a motor vehicle. The glazing cell was dimensioned to about 15 cm×about 15 cm, with an interpane spacing between the tungsten oxide coating on the inward surface of the second substrate and the HW-ITO coating on the inward surface of the first substrate of about 105 μm.

The glazing cell was constructed using spacers to assist in defining the interpane spacing. The spacers were sprinkled over the tungsten oxide-coated surface of the first substrate and, inward from the peripheral edge of the HW-ITO-coated second substrate, an epoxy was applied using a silk-screening technique. While the epoxy was still uncured, the first substrate and the second substrate were off-set from one another by a lateral displacement and a perpendicular displacement. The epoxy was then cured into a seal for the electrochromic glazing cell using a vacuum bagging technique (as is known in the laminating art) at a reduced atmospheric pressure of about 10" of mercury and a temperature of about 110° C. for a period of time of about 2 hours in order to achieve substantially even pressure while curing the epoxy into a seal.

We formulated an electrolyte containing ferrocene (about 0.015 M), phenothiazine (about 0.06 M), lithium perchlorate (about 0.05 M) and "UVINUL" 400 [about 5% (w/v)] in a solvent combination of tetramethylene sulfone and propylene carbonate [in a ratio of about 50:50 (v/v)]. We dispensed this electrolyte into the electrochromic glazing cell using the vacuum backfilling method [as described in Varaprasad IV].

Upon introduction of an applied potential of about 1.4 volts to the electrochromic glazing, we observed the transmissivity change from a high transmittance of about 78.6% to a low transmittance of about 12.9%.

We made and recorded these observations using the SAE procedure referred to in Example 1, supra, except that the reflectometer was set in transmittance mode.

Example 6

In this example, we constructed an electrochromic mirror suitable for use as an exterior rearview mirror for a motor vehicle.

The mirror was constructed from clear HW-ITO-coated glass as the first substrate as in Example 1, supra.

However, as the second substrate we used ordinary soda-lime glass. Both substrates were sized and shaped to dimensions of 9.5 cm×15 cm. A notch was cut in one edge of the first substrate, and another notch was cut in a different location on one edge of the second substrate. A bus bar was formed along the edges of the first substrate by silk-screening a silver conductive frit material [#7713 (Du Pont)] all around the perimetal region of the HW-ITO-coated surface of the substrate to a width of about 2.5 mm, and then firing the frit at an elevated temperature in a reducing atmosphere to avoid oxidizing the HW-ITO.

A layer of chromium at a thickness of about 1,000 Å was coated directly by vacuum deposition onto the inward surface of the second glass substrate as an adhesion promoter. Thereafter, without breaking vacuum, a thin film of silver at a thickness of about 1,000 Å was coated onto the layer of chromium as a reflective element, and tungsten oxide at a thickness of about 5,000 Å was then coated (again, without breaking vacuum) over the layer of silver as an electrochromic solid film. The first substrate and the second substrate were then positioned in spaced-apart relationship so that the edges of the substrates were flush, and a seal was applied so as to form a cavity between the two substrates. In this flush design, the interpane spacing between the coated inward surfaces of the substrates was 88 μm.

For this exterior mirror, we formulated an electrolyte containing ferrocene (about 0.025 M), phenothiazine (about 0.06 M), lithium tetrafluoroborate (about 0.05 M) and "UVINUL" 400 [about 5% (w/v)] in propylene carbonate. We dispensed this electrolyte into the mirror cell using the vacuum backfilling method [as described in Varaprasad IV].

Electrical leads were then attached to the mirror. The notch on the second substrate permitted an electrical lead to be attached at a point contact on the silver frit bus bar formed around and substantially circumscribing the perimeter of the HW-ITO-coated inward surface of the first substrate. Another electrical lead was attached to the portion of the chromium/silver/tungsten oxide coating on the inward surface of the second substrate exposed by the notch cut in the first substrate. The point contact was sufficient to apply a potential across the electrodes because of the low sheet resistance of the coating on the inward surface of the second substrate.

Upon introduction of an applied potential of about 1.5 volts to the mirror, we observed the reflectance change from a high reflectance of about 77.5% to a low reflectance of about 10.6%.

We also cycled the mirror for about 50,000 cycles at a temperature of about 50° C., and observed that the mirror cycled well and continued to function suitably for use in a motor vehicle.

Example 7

In this example, we used the same electrolyte formulation and an electrochromic mirror cell of the same shape as described in Example 1, supra. After filling the electrochromic mirror cell using the vacuum backfilling method (as described in Varaprasad IV], we removed the tungsten oxide coating from the peripheral edge of the first substrate using a dilute basic solution of potassium hydroxide followed by water. We then connected the bus bars to this newly-exposed ITO surface. Thereafter we applied a secondary weather barrier material. The secondary weather barrier material was formed from "ENVIBAR" UV 1244T ultraviolet curable epoxy, with about 2% of the silane coupling agent A-186 (OSi Specialties Inc., Danbury, Conn.) combined with about 1% of the photoinitiator "CYRACURE" UVI-6990. Thereafter, we cured this material by exposing it to a suitable source of ultraviolet light to form a secondary weather barrier.

Once the secondary weather barrier was formed, we introduced an applied potential of about 1.3 volts to the mirror and observed the reflectance change from a high reflectance of about 77.8% to a low reflectance of about 7.1%.

We made and recorded these observations using the SAE procedure referred to in Example 1, supra.

We also mounted this electrochromic mirror in the cabin of a motor vehicle and found the mirror to operate in a commercially acceptable manner.

Example 8

We used an electrochromic mirror cell having the same shape as described in Example 1, supra, constructed from clear ITO-coated glass as the first substrate (having a sheet resistance of about 80 ohms per square). As the second substrate of the mirror cell, we used ordinary soda-lime glass. The first substrate was dimensioned about 2 to about 3 mm larger in both length and width than the second substrate. A layer of chromium, as an adhesion promoter, was coated directly onto the inward surface of the second glass substrate at a thickness of about 1,000 Å. A thin film of silver, as a reflective element, was thereafter coated onto the layer of chromium at a thickness of about 1,000 Å and tungsten oxide, as an electrochromic solid film, was then coated over the layer of silver at a thickness of about 5,000 Å. These thin films were coated in a vacuum deposition process by electron beam evaporation and were deposited in a unitary deposition process without breaking vacuum during deposition of the chromium/silver/tungsten oxide stack.

Also, when a transparent conductor coated substrate (for example, fluorine doped tin oxide coated glass, such as "TEC-Glass" described supra, that is bendable in an ordinary air atmosphere) is used for the substrate 2, and/or when a bendable reflector-coated substrate (for example, the combination of a silicon based reflector overcoated with a tin oxide transparent conductor described supra), is used for the substrate 35 the process outlined in FIG. 15 can be appropriately modified. For example, a convex or aspherical exterior mirror shape suitable for use as the substrate 2 can be cut from a bent minilite of "TEC-20" glass comprising a fluorine doped tin oxide transparent conductor of about 20 ohms per square sheet resistance and with the tin oxide coating located on the concave surface of the bent minilite. Use of such air-bendable transparent conductors, as are conventionally known, is an alternate to transparent conductor coating the concave surface of a bent, plain glass surface, as illustrated in FIG. 15. Also, use of a bendable, elemental semiconductor reflector layer that is itself rendered conducting, or that is overcoated with a transparent conducting layer such as tin oxide, may be used (in lieu of coating metal layers) of aluminum, silver, chromium and the like that are typically non-bendable) on the convex surface of bent substrate 3.

The first substrate and the second substrate were positioned in spaced-apart relationship to form a 88 μm interpane spacing between the ITO-coated surface of the first substrate and the multi-layered surface of the second substrate. The size and shape differential between the first substrate and the second substrate allowed the ITO-coated surface of the first substrate to extend beyond the multi-layered surface of the second substrate. Bus bars were attached substantially all around the peripheral edge of the ITO-coated first substrate onto which were connected the electrical leads. On the multi-layered second substrate, we attached electrical leads at a smaller portion thereof, such as at a mere point contact.

We formulated an electrolyte containing ferrocene (about 0.015 M), phenothiazine (about 0.06 M), lithium perchlorate (about 0.05 M) and "UVINUL" 400 [about 5% (w/v)] in a solvent combination of tetramethylene sulfone and propylene carbonate [in a ratio of about 50:50 (v/v)]. We dispensed this electrolyte into the mirror cell using the vacuum backfilling method [as described in Varaprasad IV].

Upon introduction of an applied potential of about 1.4 volts, we observed the mirror to dim uniformly and rapidly to a neutral gray colored state. Specifically, we observed the mirror to have a high reflectance in the unpowered, bleached state of about 75.8% and a low reflectance in the dimmed state of about 9.5%. We made and recorded these observations using the SAE procedure referred to in Example 1, supra.

Example 9

In this example, we used the electrolyte formulation and an electrochromic mirror having the same shape as described in Example 8, supra. However, the mirror of this example was constructed from ITO-coated glass as the first substrate having a sheet resistance of about 55 ohms per squares. In addition, the first substrate and the second substrate were positioned in spaced-apart relationship to form a 63 μm interpane spacing between the ITO-coated surface of the first substrate and multi-layered surface of the second substrate.

After dispensing the electrolyte into the mirror cell using the vacuum backfilling method [as described in Varaprasad IV], we observed the mirror to have a high reflectance of about 75.7% and a low reflectance of about 8.6% when a potential of about 1.4 volts was applied thereto. We made and recorded these observations using the SAE procedure referred to in Example 1, supra.

Example 10

In this example, we fabricated an electrochromic glazing device of a construction suitable for use as a window or a sun roof on a motor vehicle containing a solid electrolyte. The glazing device was dimensioned to about 15 cm×about 15 cm, with an interpane spacing between the tungsten oxide coating on the inward surface of the first substrate and the HW-ITO coating on the inward surface of the second substrate of about 74 μm.

The glazing device was constructed using spacers to assist in defining the interpane spacing. The spacers were sprinkled over the tungsten oxide coated surface of the first substrate and an epoxy was applied inward from the peripheral edge of the HW-ITO coated second substrate using a silk-screening technique. While the epoxy was still uncured, the first substrate and the second substrate were off-set from one another by a lateral displacement and a perpendicular displacement. The weather barrier of the electrochromic glazing device was then formed by thermal curing using a vacuum bagging technique (as is known in the laminating art) at a reduced atmospheric pressure of about 10" of mercury and a temperature of about 140° C. for a period of time of about 1 hour in order to maintain a substantially even pressure when curing the epoxy into a weather barrier.

We prepared a formulation of starting components containing ferrocene [about 0.3% (w/w)], phenothiazine [about 0.8% (w/w)], lithium perchlorate (about 0.4% (w/w)], "SARBOX" acrylate resin (500E50) [about 27.9% t (w/w)], propylene carbonate (as a plasticizer) [about 67.3% (w/w)] and "IRGA-CURE" 184 (as a photoinitiator) [about 3.3% (w/w)]. We dispensed this formulation into the electrochromic glazing device using the vacuum backfilling method [as described in Varaprasad IV].

We then in situ polymerized the formulation by exposing it to ultraviolet radiation to form a solid-phase electrolyte.

We then affixed bus bars along the peripheral edges of the electrochromic glazing device, and connected electrical leads to the bus bars.

We introduced an applied potential of about 1.5 volts to the electrochromic glazing for a period of time of about 2 minutes, with the positive polarity applied at the second substrate (the surface of which having tungsten oxide overcoated onto its HW-ITO-coated surface) and observed it to have a high transmittance of about 73.0%. Thereafter, we reversed the polarity, and observed the transmission to dim to a low transmittance of about 17.8% when a potential of about 1.5 volts was applied thereto.

We made and recorded these observations using the SAE procedure referred to in Example 1, supra, except that the reflectometer was set in transmittance mode.

Example 11

In this example, we constructed an electrochromic mirror device having the same shape described in Example 1, supra, with an interpane spacing of about 74 μm and using a solid-phase electrolyte.

We prepared a formulation of starting components containing ferrocene [about 0.2% (w/w)], phenothiazine [about 0.5% (w/w)], lithium perchlorate [about 0.3% (w/w)], polyethylene glycol dimethacrylate (600) (PEGDMA-600) [about 17.9% (w/w)], propylene carbonate (as a plasticizer) [about 76.5% (w/w)], "IRGACURE" 184 (as a photoinitiator) [about 2.1% (w/w)] and "UVINUL" 400 [about 2.5% (w/w)].

The mirror was constructed using spacers to assist in defining the interpane spacing. The spacers were sprinkled over the HW-ITO coated inward surface of the first substrate (whose opposite, non-inward surface had been coated with a layer of silver using conventional wet chemical silver line deposition) and the formulation, which would be transformed into a solid-phase electrolyte, was dispensed thereover. The second substrate, whose inward surface was coated with tungsten oxide at a thickness of about 5,000 Å, was positioned over the spacer-sprinkled HW-ITO coated surface of the first substrate to allow the formulation to spread evenly across and between the coated surfaces of the first substrate and the second substrate.

We temporarily held the first substrate and the second substrate together using clamps and in situ polymerized the formulation located therebetween through exposure to ultraviolet radiation to form a solid-phase electrolyte. Specifically, we placed the mirror onto the conveyor belt of a Fusion UV Curing System F-450 B, with the belt advancing at a rate of about fifteen feet per minute and being subjected to ultraviolet radiation generated by the D fusion lamp of the F-450 B. We passed the mirror under the fusion lamp fifteen times pausing for two minute intervals between every fifth pass.

We then affixed bus bars along the peripheral edges of the device, and attached electrical leads to the bus bars.

We introduced an applied potential of about 1.5 volts to the electrochromic mirror for a period of time of about 2 minutes, with the positive polarity applied at the second substrate (the surface of which having tungsten oxide overcoated onto its HW-ITO-coated surface) and observed it to have a high reflectance of about 73.2%. Thereafter, we reversed the polarity, and observed the reflection to dim to a low reflectance of about 7.1% when a potential of about 1.5 volts was applied thereto.

We made and recorded these observations using the SAE procedure referred to in Example 1, supra.

Example 12

In this example, we constructed an electrochromic mirror cell having the same shape described in Example 4, supra.

We formulated an electrolyte containing ferrocene (about 0.025 M), phenothiazine (about 0.06 M), lithium perchlorate (about 0.05 M) and "UVINUL" 400 [about 5% (w/v)] in a solvent combination of 1,2-butylene carbonate and propylene carbonate [in a ratio of about 50:50 (v/v)]. We dispensed this electrolyte into the mirror cell using the vacuum backfilling method [as described in Varaprasad IV].

Upon introduction of an applied potential of about 1.4 volts to the mirror, we observed the high reflectance change from about 72.0% to a low reflectance of about 6.8%.

We also cycled the mirror for about 50,000 cycles at a temperature of about 50° C., and observed it to cycle well.

Example 13

In this example, we again constructed an electrochromic mirror cell having the same shape described in Example 1, supra.

For this mirror cell, we formulated an electrolyte containing ferrocene (about 0.025 M), phenothiazine (about 0.06 M), lithium perchlorate (about 0.05 M), lithium tetrafluoroborate (about 0.05 M) and "UVINUL" 400 [about 5% (w/v)] in propylene carbonate, and dispensed it into the mirror cell using the vacuum backfilling method [as described in Varaprasad IV].

Upon introduction of an applied potential of about 1.4 volts to the mirror, we observed the high reflectance to change from about 72.0% to a low reflectance of about 6.7%.

The mirror demonstrated excellent cycle stability and stability to ultraviolet light.

Example 14

In this example, we constructed an electrochromic mirror cell having the same shape described in Example 1, supra, with an on demand display. For illustrative purposes, see FIG. 9.

To provide the on demand display to this mirror cell, a display window (with dimensions of about $7/16"\times3/4"$) was laser-etched through an overcoating of silver/copper/paint on the rearmost (opposite, non-inward) surface of the second substrate of the mirror cell.

Over and within the display window, we applied an optical adhesive ["IMPRUV" LV potting compound (commercially available from Loctite Corporation, Newington, Conn.)] so that a glass cover sheet, having a thickness of about 0.675", may be disposed over and affixed thereto.

The glass cover sheets suitable for use in this context were prepared by previously exposing a larger glass sheet to a vacuum evaporation process in which a thin film layer of silver was coated onto one of its surfaces. The thin film layer of silver was substantially reflecting (having a reflectance of about 93%) and partially transmitting (having a transmittance of about 5%). The silver-coated glass cover sheet was then cut to size—e.g., about $1"\times3/4"$—, and the silvered-surface disposed over, and affixed to using the optical adhesive, the display window. Over the opposite, non-silvered surface of the glass cover sheet, we placed a layer of epoxy [UV15-74R1 (commercially available from Master Bond Incorporated, Hackensack, N.J.)] and affixed thereto a vacuum fluorescent display [Part No. FIP2QM8S (NEC Electronics Incorporated, Mountain View, Calif.)].

Into this mirror cell, we dispensed the electrolyte of Example 1, supra.

Example 15

In this example, we constructed an electrochromic mirror cell having the same shape described in Example 1, supra, with an on demand display. For illustrative purposes, see FIG. 10.

In this mirror cell, like the mirror cell of Example 14, supra, a display window (with dimensions of about 7/16"×3/4") was laser-etched through the silver/copper/paint overcoating of the rearmost (opposite, non-inward) surface of the second substrate of the mirror cell.

A thin film layer of silver was then coated over the display window so formed by electron beam evaporation in a vacuum chamber as described supra. The thin film layer of silver was substantially reflecting (having a reflectance of about 90%) and partially transmitting (having a transmittance of about 8%).

Over and within the silvered-display window, we applied a layer of epoxy [UV15-74RI (Master Bond)] and affixed thereto a vacuum fluorescent display [Part No. FIP2QM8S (NEC Electronics)].

Into this mirror cell, we dispensed the electrolyte of Example 1, supra.

Example 16

In this example, we constructed an electrochromic mirror cell using as the first substrate and second substrate clear HW-ITO-coated glass. Over the inward surface of the second substrate, we coated a layer of chromium at a thickness of about 100 Å as an adhesion promoter. We then coated a thin film of silver at a thickness of about 450 Å onto the layer of chromium as a reflective element, and a layer of tungsten oxide at a thickness of about 5,800 Å over the layer of silver as an electrochromic solid film. The first substrate and the second substrate were positioned in spaced-apart relationship to form an 88 µm interpane spacing between the coated inward surfaces of the substrates.

We placed an opaque tape on the rearmost surface of the second substrate with apertures provided therein at appropriate locations to accommodate vacuum fluorescent displays and other information indicia.

A vacuum fluorescent display was affixed to this mirror cell as described in Example 14, supra, but dispensing with the reflector coated cover sheet. The display provided compass directional information and, dependent on the vehicle direction when driving, displayed N, NE, E, SE, S, SW, W or NW when any one of which coordinates was activated by compass circuitry included in the mirror housing and assembly into which the electrochromic mirror element was mounted for driving in a vehicle, and such as described in commonly assigned U.S. Pat. No. 5,255,442 (Schierbeek). Turn signal indicia [JKL NEO-Wedge Lamps T2-1/4 (commercially available from JKL Components Corporation, Paloina, Calif.)] were also located behind the rearmost surface of the second substrate, with appropriately shaped apertures cut into the opaque tape at the location of the turn signal indicia. The turn signal indicia was activated through a triggering mechanism from the particular turn signal. For an illustration of the use of turn signal indicia 21 in an electrochromic mirror, see FIG. 12.

Into this mirror cell, we dispensed the electrolyte of Example 1, supra.

Upon introduction of an applied potential of about 1.4 volts to the mirror, we observed the high reflectance to change from about 74.1% to a low reflectance of about 7.0%. We also observed the transmittance to be about 4.5% in the clear state.

This mirror was installed in a vehicle and tested under a variety of actual day and night driving conditions, and was found to operate for its intended purpose.

Example 17

In this example, we constructed an electrochromic mirror suitable for use as an interior rearview mirror for a motor vehicle.

The mirror was constructed from clear ITO-coated glass as the first substrate (having a sheet resistance of about 80 ohms per square). As the second substrate of the mirror cell we used ordinary soda-lime glass. Both substrates were sized and shaped to identical dimensions. A notch was cut in the middle of the top edge of the first substrate and another notch was cut in the middle of the bottom edge of the second substrate. A thin metal film bus bar was formed along the edges of the first substrate by first affixing a mask over the central region leaving most of the perimeter region unmasked, and then depositing by a vacuum evaporation process a thin film of chromium having a thickness of about 2,000 Å followed by a thin film of silver having a thickness of about 5,000 Å.

A layer of chromium at a thickness of about 1,000 Å was coated directly onto the inward surface of the second glass substrate as an adhesion promoter. A thin film of silver at a thickness of about 1,000 Å was then deposited onto the layer of chromium as a reflective element and tungsten oxide at a thickness of about 5,000 Å was then coated over the layer of silver as an electrochromic solid film.

The first substrate and the second substrate were then positioned in a spaced-apart relationship so that the edges of the substrates were flush and a seal was applied to form a cavity between the substrates. In this flush design, the interpane spacing between the coated inward surfaces of the substrates was 88 µm.

For this flush design interior mirror, we formulated an electrolyte as in Example 1, supra. We dispensed this electrolyte into the mirror cell using the vacuum backfilling method [as described in Varaprasad I].

Electrical leads were then attached to the mirror. The notch in the second substrate permitted an electrical lead to be attached at a point contact on the thin metal film bus bar on the bottom edge of the first substrate. Similarly, the notch in the first substrate caused a portion of the top edge of the inward surface of the second substrate to be exposed, permitting an electrical lead to be attached at a point contact on the chromium/silver/tungsten oxide coating.

Upon introduction of an applied potential of about 1.5 volts to the mirror, we observed a reflectance change from a high reflectance of about 85.3% to a low reflectance of about 7.5%.

Example 18

In this example, we constructed an aspherical electrochromic mirror cell using as the first substrate a 0.063" thick clear, HW-ITO-coated glass shape and as the second substrate a 0.093" thick clear HW-ITO-coated glass substrate. The second substrate was silver coated on its rear surface (i.e., the fourth surface of the assembly) using a conventional wet chemical silverline process, as is well-known in the automotive silvering art. The first and second substrates were individually bent to an aspheric radius using a multi-radius design commonly used for driver-side exterior mirrors on vehicles in Europe. This design includes an inboard spherical curvature region of about 2,000 mm radius of curvature and a continuously reducing radius, aspherical curvature outboard region that decreased in radius from about 560 mm through about 230 mm to about 160 mm. The bent, multi-radius substrates were individually press bent, as an oversized lite, in a bending press mold, as previously described, by first heating the glass to a temperature of at least about 550° C. followed by press bending to conform to a precision mold.

After bending and annealing the oversized multi-radius lite, the multi-radius shapes (of the size and shape used as a driver-side exterior mirror on a Peugeot 605 vehicle manufactured by PSA of France for model year 1994), were cut from the oversized, bent, multi-radius lite. The inward facing, ITO-coated surface of the second substrate was coated with a layer of tungsten oxide of thickness about 5,500 Å, using electron beam evaporation and using a rapid cycle process, as previously described, whereby evaporation of the tungsten oxide commenced when, during initial pumpdown, the chamber pressure reached about $2 \times 10^{-4}$ torr (mm Hg). The first substrate and the second substrate were positioned in spaced apart relationship to form an interpane spacing of about 88 μm between the coated inward facing surfaces of the substrates. The seal material used was EPON 8281 epoxy that was cured with ANCAMINE® 2014FG as a latent curing agent, To enhance uniformity and conformity of matching a local radius of the first substrate to its corresponding local radius on the second substrate, glass beads having a diameter of about 88 μm were included in the uncured epoxy as well as being sprinkled over the surface of the inward facing surface of the second substrate. Using a computer numerical control ("CNC") controlled ASYMTEK dispenser and a 20 gauge needle, the uncured epoxy was applied around the perimeter of the inward surface of the first substrate. The first substrate was then carefully aligned over the corresponding local radii of the second substrate and was temporarily affixed thereto using simple clamps. This assembly was placed in a "MYLAR" vacuum bag and a vacuum was established so that atmospheric pressure impressed upon the surfaces of the assembly to force conformity between the local radii of the first and second substrates. Next, and while under vacuum and thus still under atmospheric pressure, the vacuum bagged assembly was based in an oven and exposed to a temperature of about 140° C. for a period of time of about one hour to cure the epoxy. Once cured, the assembly was removed from the oven, the vacuum bag was vented and removed, and the empty cell, so formed, was filled with the electrolyte of Example 1, supra, using vacuum backfilling.

Once cell fabrication was completed, we introduced a voltage of about 1.4 volts to the mirror, and observed the high reflectance to change from about 74.7% to a low reflectance of about 7.3%. This change in reflectance was achieved rapidly and uniformly with little to no double imaging observed.

This mirror was mounted into a bezel, and installed in a vehicle. The mirror was found to operate for its intended purpose.

Also, such mirrors showed the environmental, cycle and performance resilience described supra.

Example 19

In this example, we constructed a multi-radius mirror, similar to that described in Example 18, supra. However, in this example the second substrate was non-ITO coated clear glass, and not silverline mirrored on its fourth surface. Instead, its inward facing plain glass surface was first coated with a layer of chromium (adhesion promoter layer) having a thickness of about 1,000 Å, followed by a layer of aluminum (reflector) having a thickness of about 2,000 Å, and followed by a layer of tungsten oxide (electrochromic solid film) having a thickness of about 6,000 Å.

Once cell fabrication was completed, we introduced a voltage of about 1.4 volts to the mirror and observed the high reflectance to change from about 69.7% to a low reflectance of about 6.4%. This change in reflectance was achieved rapidly and uniformly with little to no double imaging observed.

Example 20

The mirror of this example was fabricated generally as described in Example 3, supra, except that the front substrate was a flat HW-ITO-coated glass shape having a thickness of about 0.043", with dimensions of about 6.75"×12.7". In addition, the rear substrate was flat, plain glass having a thickness of 0.063" with similar dimensions. The interpane spacing in this mirror construction was about 74 microns. The electrolyte comprised lithium perchlorate (about 0.01 M), lithium tetrafluoroborate [about 0.04 M), ferrocene (about 0.04 M) and "UVINUL" 400 (about 5% (w/v)] dissolved in a solvent combination of tetramethylene sulfone and propylene carbonate [in a ratio of about 60:40 (v/v)]. The electrochromic mirror cell so formed was suitable for use in an exterior mirror assembly on a large, Class 8, Kenworth T600 heavy truck manufactured by Kenworth Truck Company, Seattle, Wash.

Once cell fabrication was completed, we introduced a voltage of about 1.4 volts to the mirror (using around-the-perimeter bus bars), and observed the high reflectance to change from about 81.2% to a low reflectance of about 16.5%. This change in reflectance was achieved rapidly and uniformly with little to no double imaging observed.

Example 21

In this example, we report results of rearview mirror constructions otherwise similar to that described in Example 1, supra, except for the use of tungsten oxide doped with tin instead of undoped tungsten oxide. Electrochromic solid films of the tin doped tungsten oxide type were deposited both by physical vapor deposition [specifically, electron beam evaporation) and by non-vacuum deposition (specifically, by wet chemical deposition with the dip/fire technique, see U.S. Pat. No. 4,855,161 (Moser)].

In the physical vapor deposition approach, the procedure and construction described in Example 1, supra, was used but with evaporation of a mixture of tungsten oxide/tin oxide (in a ratio of about 95:5% w/w) to form a tin-doped tungsten oxide having a thickness of about 6,000 Å (with the $Sn/WO_3$ weight ratio in the coating at about 0.04). Rearview mirror cells so formed using such evaporated tin doped tungsten oxide were tested and operated to determine their suitability for use as rearview mirrors in automobiles. These mirrors were found to be suitable both in terms of performance and in terms of cycle/environmental resilience.

Compared to similar mirror cells fabricated using undoped tungsten oxide, but without other intended differences, tin doping of the tungsten oxide film produced a noticeably more neutral coloration when the mirrors were electrochromically dimmed under applied potential. Also, we found that mixing of tin oxide with the tungsten oxide during its reactive evaporation under vacuum led to less spitting from the evaporation crucible and facilitated, perhaps due to enhanced electrical conductivity in the inorganic oxide mixture, easier evaporation of the mixture to form the oxide film on the glass. This enhances ease of manufacturing of electrochromic devices using, for example, a vacuum deposited, tungsten oxide-based electrochromic film, and the like. We also observed a higher bleached state % reflectivity and a faster bleach time when tin doped tungsten oxide was used compared to undoped tungsten oxide.

In the non-vacuum deposition approach, a wet chemical, dip/fire method was used, such as is described in U.S. Pat. No. 4,855,161 (Moser), the disclosure of which is hereby incorporated herein by reference. A dipping solution was prepared which comprised about 7.5 wt % tungsten hexachloride, about 2.5 wt % dibutyltin oxide, about 55 wt % ethyl acetate, about 30 wt % isopropanol and about 5 wt % methanol. HW-ITO coated glass substrates were coated with this sol-gel formulation dipping solution by a conventional dip-coating method, and transferred to an oven pre-heated to a temperature of about 120° C. In the oven, the as-dipped coating, having already been air dried, was fired for a period of time of about 2 hours to produce the desired tin doped tungsten oxide coating, with the $Sn/WO_3$ weight ratio being about 0.25.

Again, rearview mirrors cells were constructed as described in Example 1, supra, except that this dip/fire tin doped tungsten oxide coating was used.

The performance characteristics of such rearview mirrors are reported in Tables VI(a) and VI(b) below:

TABLE VI(a)

Room Temperature, 1.5 V, 5 secs/5 secs cycle

| Number of Cycles | % HR | % LR | Transition Times (secs) | |
|---|---|---|---|---|
| | | | 70-20% | 10-60% |
| Initial | 79.7 | 9.5 | 5.3 | 5.9 |
| 25,000 | 76.6 | 9.3 | 5.1 | 5.2 |
| 50,000 | 77.0 | 8.9 | 4.8 | 4.9 |
| 80,000 | 76.2 | 8.9 | 4.7 | 4.7 |
| 120,000 | 76.0 | 8.7 | 4.7 | 4.4 |

TABLE VI(b)

50° C., 1.5 V, 5 secs/5 secs cycle

| Number of Cycles | % HR | % LR | Transition Times (secs) | |
|---|---|---|---|---|
| | | | 70-20% | 10-60% |
| Initial | 78.7 | 8.0 | 4.7 | 6.2 |
| 25,000 | 77.2 | 8.2 | 4.6 | 5.6 |
| 50,000 | 77.6 | 8.1 | 4.6 | 5.2 |
| 80,000 | 76.6 | 7.7 | 4.7 | 5.4 |
| 120,000 | 75.5 | 8.1 | 4.4 | 5.2 |

Sol-gel formulations dipping formulations with different $Sn/WO_3$ weight ratios were coated on transparent conductor coated glass substrates. We found desirable a coating with a ratio between about 0.1 and about 0.5. Different firing temperatures were also used, and we found desirable a firing temperature within the range of about 120° C. and 300° C.

Example 22

In this example, we constructed a continually variable transmission bandpass filter. The spectral content passed by a bandpass filter may be electrically attenuated and thus provide user control over not just the spectral content of radiation (typically, a spectral sub-region band of visible, ultraviolet, near-infrared or infrared electromagnetic radiation), but also over the intensity of the radiation passed by the filter. Such bandpass filters are typically of the interference type comprising multiple thin film layers of determined thickness and refractive index so as to selectively transmit (and occasionally reflect) radiation such as incident light. Such interference filters have wide applications, such as in the diagnosis of disease (by tracing of fluorescent antibodies), spectral radiometry and colorimetry. Continually variable transmissive and reflective filters are useful in optical filters, display devices including heads-up display devices, the control of automotive lighting sources including headlamps, control enhancement filters, laser optic systems and similar applications. Such variable intensity filters are preferably medium-band, narrow-band or restricted band filters that permit isolation of wavelength intervals with a bandwidth as low as a few nanometers (such as, less than about 100 nanometers, and in some applications less than about 10 nanometers in more spectrally selective applications) without requiring use of dispersion elements (such as prisms and gratings), but with electrically controllable modulation of the intensity of light or other radiation which passes therethrough and/or reflects therefrom.

Figure 17:
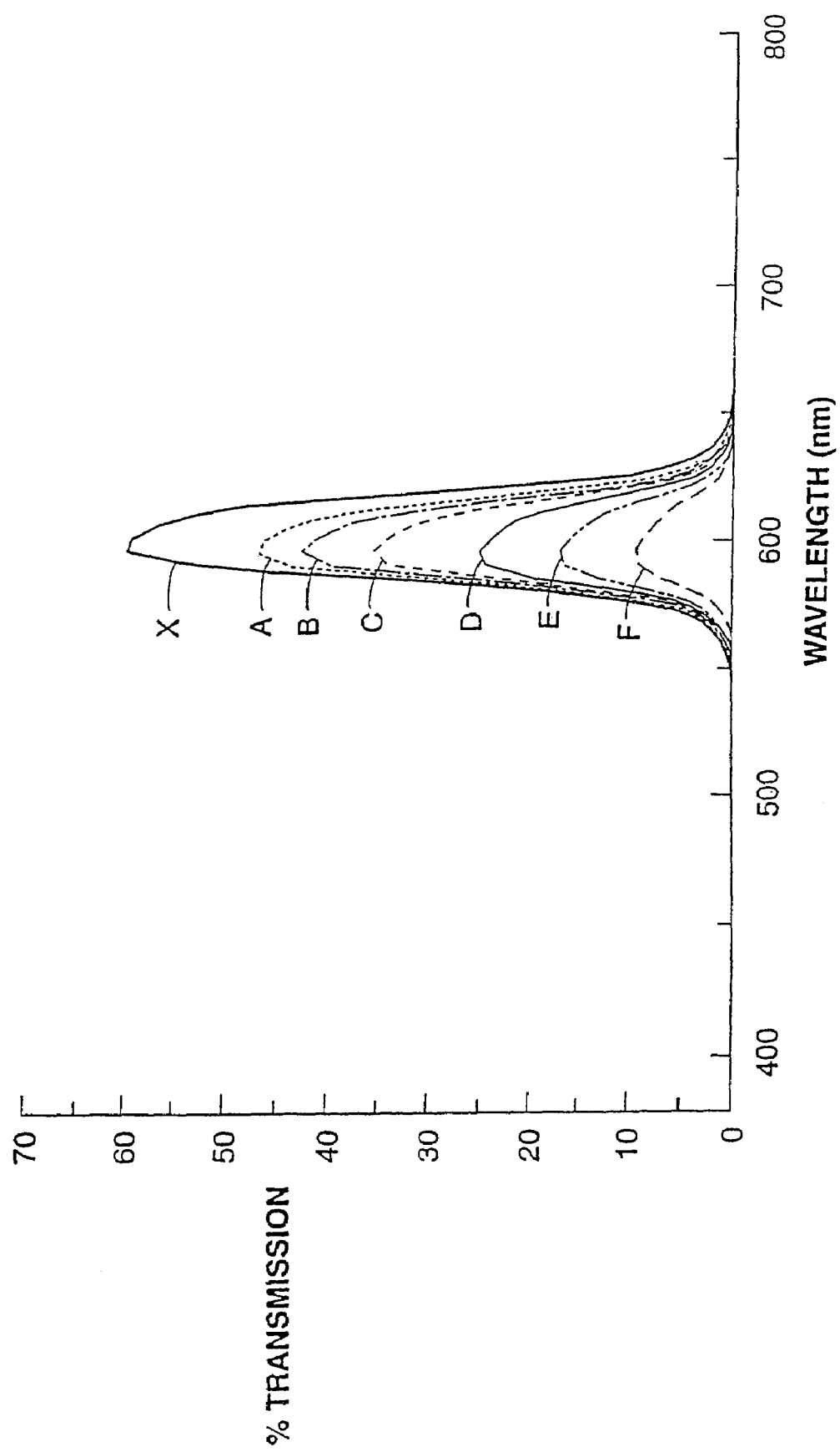
FIG. 17 is a plot of percent transmission versus wavelength for a continuously variable intensity filter fixed to the glass of the electrochromic window cell for voltages applied to the electrochromic medium within the range of from about 0 volts to about 1.4 volts.

As an example of such a variable intensity filter, we constructed an electrochromic window element having dimensions of about 2"×2", such as is described in Example 5, supra, and attached to the outermost glass surface thereof a 600 nm medium-band interference filter having a bandwidth of about 40 nm, whose % transmission versus wavelength (nm) spectrum is shown as solid curve X in FIG. 17. This filter was fixed to the glass of the electrochromic window cell using an index matching optical adhesive having an index of about 1.5.

A plot of % transmission versus wavelength for this continuously variable intensity filter is shown in FIG. 17 for voltages applied to the electrochromic medium within the range of from about 0 volts to about 1.4 volts. In FIG. 17, light transmission through the band pass filter and the electrochromic window cell with no potential applied is represented by curve A. At an applied potential of about 0.3 volts, light transmission through the band pass filter and the electrochromic window cell is represented by curve B. At an applied potential of about 0.5 volts, light transmission through the band pass filter and the electrochromic window cell is represented by curve C. At an applied potential of about 0.8 volts, light transmission through the band pass filter and the electrochromic window cell is represented by curve D. At an applied potential of about 1.1 volts, light transmission through the band pass filter and the electrochromic window cell is represented by curve E. And at an applied potential of about 1.4 volts, light transmission through the band pass filter and the electrochromic window cell is represented by curve F. In Table VII below, then transmission at about 600 nanometers is presented in connection with the voltage applied to the variable intensity filter.

TABLE VII

| Applied Voltage (volts) | % transmission at about 600 nm |
|---|---|
| 0 | 47 |
| 0.3 | 42 |
| 0.5 | 35 |
| 0.8 | 25 |
| 1.1 | 17 |
| 1.4 | 9 |

As seen in FIG. 17, the spectral selectivity is substantially preserved as the light intensity is modulated continuously under a potential variably applied to the electrochromic medium.

Rather than attaching a separate filter to an electrochromic cell as described above, an alternative approach is to deposit an interference stack of thin film coatings on at least one surface of the substrates in the electrochromic cell. In such an arrangement, the transparent conductor and a metal oxide electrochromic solid film layer may comprise in combination with other dielectric, semi-conductor and conducting layers, the interference stack that provides spectral selectivity.

Example 23

The electrochromic mirror cell of this example was constructed as described in Example 4, supra, except that the electrolyte included AMPT as a redox promoter in place of the redox promoter, phenothiazine. AMPT was synthesized following the procedures described in U.S. Pat. No. 4,666,907 (Fortin), the disclosure of which is hereby incorporated herein by reference.

The synthesized AMPT was purified by recrystallization from methanol.

The elemental analysis of the AMPT was determined to be:

|  | C | H | N | S | O |
|---|---|---|---|---|---|
| Calculated (%) | 66.40 | 4.83 | 5.16 | 11.82 | 11.70 |
| Found (%) | 66.55 | 4.76 | 5.19 | 12.19 | 11.30 |

The electrolyte comprised AMPT (about 0.035 M), ferrocene (about 0.02 M), lithium perchlorate (about 0.055 M) and "UVINUL" 400 [about 5% (w/v)] dissolved in propylene carbonate. Performance of the filled electrochromic mirror cell is reported in Table VIII below:

TABLE VIII

| 50° C., 1.3 V, 15 sec/15 sec cycle | | | | | |
|---|---|---|---|---|---|
| Number of Cycles | % HR | % LR | \multicolumn{3}{c}{Transition Times (seconds)} |
|  |  |  | 70-20% | 60-20% | 10-60% | 10-50% |
| Original | 74.6 | 6.7 | 3.5 | 3.1 | 13.6 | 7.6 |
| 65,000 | 71.4 | 8.4 | 4.1 | 3.6 | 5.1 | 3.6 |

Example 24

The electrochromic mirror cell of this example was constructed as described in Example 3, supra, except that the electrolyte included C-PT as a redox promoter in place of the redox promoter, phenothiazine. C-PT was synthesized following the procedures described in N. L. Smith, J. Org. Chem., 15, 1125 (1950).

In this example, the substrates were juxtaposed flush to each other and an around-the-perimeter evaporated bus bar (comprising about 1,000 Å of chromium metal) was evaporatively deposited, using a mask to mask off the central portion, around the edge perimeter of the inward facing surface of the first ITO-coated substrate followed by another 10,000 Å of silver metal evaporated thereover. A chromium adhesion layer/silver reflector layer/tungsten oxide electrochromic solid film layer was evaporated onto the opposing surface of the second substrate, which was plain glass. The electrolyte comprised C-PT (about 0.05 M), lithium perchlorate (about 0.05 M) and "UVINUL" 400 [about 5% (w/v)] dissolved in propylene carbonate.

With a potential of about 1.3 volts applied between the evaporated bus bar around the perimeter of the inward facing surface of the first substrate and the metal reflector layer on the opposing second substrate, we observed the initial high reflectivity state [HR (%)] to be about 87.3%, which dimmed to a low reflectivity state [LR (%)] of about 7.2%, with the transition from 70 to 20% reflectance occurring in a period of time of about 2.1 seconds and the transition from 10 to 60% reflectance, upon bleaching by shorting the electrodes, occurring in a period of time of about 7.1 seconds.

Example 25

In this example, we constructed an electrochromic mirror suitable for use as an interior rearview mirror for a motor vehicle. Construction was otherwise similar to that described in Example 6, supra, except that the shape of the mirror constructed for this example was of the size and shape commonly used for interior rearview mirrors. In addition, the first substrate was glass coated with a layer of ITO having a thickness of about 300 Å, with a specific resistivity of about $2.4 \times 10^{-4}$ ohm.centimeter and a sheet resistance of about 80 ohms per square. Also, a thin film of aluminum having a thickness of about 2,000 Å was used as a reflective element instead of the silver reflective element used in the construction of Example 6, supra.

We filled the electrochromic rearview mirror with an electrolyte comprising ferrocene (about 0.015 M), phenothiazine (about 0.06 M), lithium perchlorate (about 0.05 M) and "UVINUL" 400 [about 5% (w/v)] in a solvent combination of propylene carbonate and tetramethylene sulfone [in a ratio of about 50:50 (v/v].

With about 1.1 to about 1.4 volts applied between the wrap-around silver conductive frit bus bar on the perimeter of the ITO-coated, inward facing surface on the first substrate and the aluminum reflector/chromium adhesion layer combination on the opposing surface of the second substrate, the electrochromic rearview mirror was observed to dim from a high reflectivity state of about 70%±5% reflectance to a dimmed state of about 6%±2% reflectance.

The electrochromic mirror of this example was tested and demonstrated to meet the requirements for commercial use on vehicles, as both interior rearview mirrors and exterior rearview mirrors. Also, in terms of cycle stability, an electrochromic mirror (which initially demonstrated a high reflectivity state of about 70.5% reflectance, and which dimmed to a reflectivity of about 7.1% reflectance when a potential of about 1.4 volts was applied thereto) was repetitively cycled at a temperature of about 50° C. for a total of 39,463 cycles, with each cycle consisting of the introduction of an applied potential of about 1.4 volts for 15 seconds and an applied potential of zero volts for 15 seconds. After cycling was completed, the mirror retained a high reflectivity state of about 68.2% reflectivity, dimmed to about 6.6% reflectivity under an applied potential of about 1.4 volts, and continued to be suitable for use on vehicles. Also, after about 14 days of oven bake at a temperature of about 85° C., a mirror (which initially had a high reflectivity state of about 71.6% reflectance, and which dimmed to about 7.4% reflectance when an applied potential of about 1.4 volts was introduced thereto) exhibited a high reflectivity state of about 76.1% reflectance and dimmed to about 8.5% reflectance when about 1.4 volts was applied thereto. This mirror continued to be suitable for its intended use on vehicles even after oven bake at 85° C. This mirror satisfied the performance requirements and reliability requirements, such as of automobile manufacturers, to be suitable for use within the interior cabin of an automobile, or for use as an exterior mirror.

These examples are provided for illustrative purposes only, and it will be clear to those of ordinary skill in the art that changes and modifications may be practiced within the spirit of the claims which define the scope of the present invention. Thus, the art-skilled will recognize or readily ascertain using no more than routine experimentation, that equivalents exist to the embodiments of the invention described herein. And, it is intended that such equivalents be encompassed by the claims which follow hereinafter.

What we claim is:

1. A signal mirror for a vehicle comprising:
   a reflective mirror element having a front side and a rear side;
   said reflective mirror element comprising a semitransparent mirror reflector coated onto a light-transmitting substrate;
   wherein visible light transmission through said reflective mirror element is at least about 3% visible light transmission;
   wherein visible light reflectance by said reflective mirror element is at least about 40% visible light reflectance for visible light incident upon the front side of said reflective mirror element;
   wherein said reflective mirror element does not exhibit substantial spectral selectivity in its reflectance of visible light incident upon the front side of said reflective mirror element and wherein said reflective mirror element does not exhibit substantial spectral selectivity in its transmission of visible light incident upon the rear side of said reflective mirror element;
   said semitransparent mirror reflector comprising a metal thin film layer, wherein said metal thin film layer is overcoated with an overcoating layer and wherein at least one of (a) said overcoating layer comprises another metal thin film layer of visible light reflectance higher than that of said metal thin film layer, (b) said overcoating layer comprises a transparent electrically conductive metal oxide layer, (c) said metal thin film layer is undercoated with an undercoating layer, (d) said metal thin film layer is undercoated with an undercoating layer comprising a transparent electrically conductive metal oxide layer and (e) said metal thin film layer is undercoated with an undercoating layer comprising a transparent indium thin oxide conductive metal oxide layer having a layer thickness of at least about 50 angstroms; and
   at least one of (a) a turn signal light display that emits visible light upon actuation of a turn signal by a driver of a vehicle equipped with said reflective mirror element, said turn signal light display disposed to the rear of the rear side of said reflective mirror element and configured so that said light emitted by said turn signal light display passes through said metal thin film layer of said semitransparent mirror reflector to be viewed by a viewer viewing from the front of said reflective mirror element and wherein said turn signal light display exhibits, when electrically powered and when operated in the vehicle during daytime driving conditions, a display luminance of at least about 30 foot lamberts as measured with said turn signal light display placed behind, and emitting light through, said reflective mirror element and (b) a blind-spot indicator light display that emits visible light upon a detection by a blind-spot detector that is part of a vehicle equipped with said blind-spot indicator light display, said blind-spot indicator light display disposed to the rear of the rear side of said reflective mirror element and configured so that said light emitted by said blind-spot indicator light display passes through said metal thin film layer of said semitransparent mirror reflector to be viewed by a viewer viewing from the front of said reflective mirror element and wherein said blind-spot indicator light display exhibits, when electrically powered and when operated in the vehicle during day time driving conditions, a display luminance of at least about 30 foot lamberts as measured with said blind-spot indicator light display placed behind, and emitting light through, said reflective mirror element.

2. The signal mirror of claim 1, wherein said metal thin film layer comprises a metal selected from the group consisting of aluminum, palladium, platinum, molybdenum, titanium, chromium, silver, nickel and iron, and wherein said metal thin film layer has a layer thickness in the range from about 200 angstroms to about 750 angstroms.

3. The signal mirror of claim 2, wherein said reflective mirror element comprises a large area vehicular exterior rearview reflective mirror element having an area greater than about 140 square centimeters and wherein said metal thin film layer is formed by sputtering in a vacuum deposition process.

4. The signal mirror of claim 1, wherein said visible light reflectance by said reflective mirror element is in the range from about 40% visible light reflectance to about 80% visible light reflectance for visible light incident upon the front side of said reflective mirror element, and wherein, when not emitting light, the disposition of said at least one of a turn signal light display and a blind-spot indicator light display to the rear of said reflective mirror element is not substantially distinguishable to the driver of a vehicle equipped with said reflective mirror element, and wherein said metal thin film layer is formed by sputtering in a vacuum deposition process.

5. A signal mirror for a vehicle comprising:
   a reflective mirror element having a front side and a rear side;
   said reflective mirror element comprising a semitransparent mirror reflector coated onto a light-transmitting substrate;
   wherein visible light transmission through said reflective mirror element is at least about 3% visible light transmission;
   wherein visible light reflectance by said reflective mirror element is at least about 40% visible light reflectance for visible tight incident upon the front side of said reflective mirror element;
   wherein said reflective mirror element does not exhibit substantial spectral selectivity in its reflectance of visible light incident upon the front side of said reflective mirror element and wherein said reflective mirror element does not exhibit substantial spectral selectivity in its transmission of visible light incident upon the rear side of said reflective mirror element;
   said semitransparent mirror reflector comprising a metal thin film layer, wherein said metal thin film layer is undercoated with an undercoating layer and wherein at least one of (a) said undercoating coating layer comprises another metal thin film layer of visible light reflectance lower than that of said metal thin film layer, (b) said undercoating layer comprises a transparent electrically conductive metal oxide layer, (c) said undercoating layer comprising a transparent electrically conductive indium tin oxide layer having a layer thickness of at least about 50 angstroms and (d) said undercoating layer comprising a transparent electrically conductive indium tin oxide layer having a layer thickness of at least about 50 angstroms and less than about 300 angstroms; and at least one of (a) a turn signal light display that emits visible light upon actuation of a turn signal by a driver of a vehicle equipped with said reflective mirror element, said turn signal light display disposed to the rear of the rear side of said reflective mirror element and configured so that said light emitted by said turn signal light display passes through said metal thin film layer of said semitransparent mirror reflector to be viewed by a viewer viewing from the front of said reflective mirror element and wherein said turn signal light display exhibits, when electrically powered and when operated in the vehicle during day time driving conditions, a display luminance of at least about 30 foot lamberts as measured with said turn signal light display placed behind, and emitting light through, said reflective mirror element and (b) a blind-spot indicator light display that emits visible light upon a detection by a blind-spot detector that is part of a vehicle equipped with said blind-spot indicator light display, said blind-spot indicator light display disposed to the rear of the rear side of said reflective mirror element and configured so that said light emitted by said blind-spot indicator light display passes through said metal thin film layer of said semitransparent mirror reflector to be viewed by a viewer viewing from the front of said reflective mirror element and wherein said blind-spot indicator light display exhibits, when electrically powered and when operated in the vehicle during day time driving conditions, a display luminance of at least about 30 foot lamberts as measured with said blind-spot indicator light display placed behind, and emitting light through, said reflective mirror element.

6. The signal mirror of claim 5, wherein said metal thin film layer has a layer thickness of at least about 200 angstroms and a reflectivity of at least about 40% visible light reflectance for visible light incident thereon.

7. The signal mirror of claim 6, wherein said metal thin film layer comprises a metal selected from the group consisting of aluminum, palladium, platinum, molybdenum, titanium, chromium, silver, nickel and iron.

8. The signal mirror of claim 6, wherein said metal thin film layer comprises silver.

9. The signal mirror of claim 8, wherein said reflective mirror element comprises a portion of an electrochromic mirror, and wherein said electrochromic mirror comprises an electrochromic medium disposed in a cavity between a front substantially light transmitting substrate and a rear substrate, said front substantially light transmitting substrate having a front surface, said front substantially light transmitting substrate further having a rear surface that is coated with a transparent electrically conducting layer, said front substantially light transmitting substrate spaced-apart from said rear substrate and wherein said rear substrate comprises said reflective mirror element, and wherein said semitransparent mirror reflector of said reflective mirror element is disposed on the surface of the rear substrate closest to the transparent electrically conducting coated rear surface of said front substrate and wherein said electrochromic medium disposed in said cavity between said front substrate and said rear substrate comprising said reflective mirror element contacts said semitransparent mirror reflector, and wherein said electrochromic mirror reflects at least about 55% of visible light incident at said front surface of said front substantially light transmitting substrate when said electrochromic medium is in its bleached state and wherein said electrochromic mirror does not exhibit substantial spectral selectivity in its reflectance of visible light incident at said front surface of said front substantially light transmitting substrate when said electrochromic medium is in its bleached state, and wherein said electrochromic mirror transmits at least about 4% of visible light incident at the rear of said rear substrate when said electrochromic medium is in its bleached state and wherein said electrochromic mirror does not exhibit substantial spectral selectivity in its transmission of visible light passing therethrough when said electrochromic medium is in its bleached state.

10. A signal mirror for a vehicle comprising:

a reflective mirror element having a front side and a rear side;

said reflective mirror element comprising a semitransparent mirror reflector coated onto a light-transmitting substrate, wherein said reflective mirror element comprises a portion of an exterior electrochromic mirror, and wherein said electrochromic mirror comprises an electrochromic medium disposed in a cavity between a front substrate and said reflective mirror element, and wherein said electrochromic medium disposed in said cavity between said front substrate and said reflective mirror element contacts said semitransparent mirror reflector;

wherein visible light transmission through said reflective mirror element is at least about 3% visible light transmission;

wherein visible light reflectance by said reflective mirror element is at least about 40% visible light reflectance for visible light incident upon the front side of said reflective mirror element;

wherein said reflective mirror element does not exhibit substantial spectral selectivity in its reflectance of visible light incident upon the front side of said reflective mirror element and wherein said reflective mirror element does not exhibit substantial spectral selectivity in its transmission of visible light incident upon the rear side of said reflective mirror element;

said semitransparent mirror reflector comprising a metal thin film layer; and at least one of (a) a turn signal light display that emits visible light upon actuation of a turn signal by a driver of a vehicle equipped with said reflective mirror element, said turn signal light display disposed to the rear of the rear side of said reflective mirror element and configured so that said light emitted by said turn signal light display passes through said metal thin film layer of said semitransparent mirror reflector to be viewed by a viewer viewing from the front of said reflective mirror element and wherein said turn signal light display exhibits, when electrically powered and when operated in the vehicle during day time driving conditions, a display luminance of at least about 30 foot lamberts as measured with said turn signal light display placed behind, and emitting light through, said reflective mirror element and (b) a blind-spot indicator light display that emits visible light upon a detection by a blind-spot detector that is part of a vehicle equipped with said blind-spot indicator light display, said blind-spot indicator light display disposed to the rear of the rear side of said reflective mirror element and configured so that said light emitted by said blind-spot indicator light display passes through said metal thin film layer of said semitransparent mirror reflector to be viewed by a viewer viewing from the front of said reflective mirror element and wherein said blind-spot indicator light display exhibits, when electrically powered and when operated in the vehicle during day time driving conditions, a display luminance of at least about 30 foot lamberts as measured with said blind-spot indicator light display placed behind, and emitting light through, said reflective mirror element.

11. The signal mirror of claim 10, wherein said at least one of a turn signal light display and a blind-spot indicator light display exhibits, when electrically powered and when operated in the vehicle during day time driving conditions, a display luminance of at least about 80 foot lamberts as measured with the light display placed behind, and emitting light through, said electrochromic medium and with said electrochromic medium in its bleached state, and wherein said electrochromic medium comprises a solid-phase at least partially formed in situ in said cavity by a polymerization reaction.

12. The signal mirror of claim 10, wherein the substrate thickness of one of said front substrate and said reflective mirror element is thinner than the substrate thickness of the other of said front substrate and said reflective mirror element, and wherein the substrate thickness of said one of said front substrate and said reflective mirror element is about 0.043", and wherein the substrate thickness of said other of said front substrate and said reflective mirror element is about 0.063", and wherein said reflective mirror element comprises a large area vehicular exterior rearview reflective mirror element having an area greater than about 140 square centimeters.

13. The signal mirror of claim 10, wherein said at least one of a turn signal light display and a blind-spot indicator light display comprises at least one light emitting diode and wherein said metal thin film layer has a layer thickness of at least about 200 angstroms.

* * * * *

UNITED STATES PATENT AND TRADEMARK OFFICE
CERTIFICATE OF CORRECTION

PATENT NO. : 7,494,231 B2  
APPLICATION NO. : 11/954982  
DATED : February 24, 2009  
INVENTOR(S) : Desaraju V. Varaprasad et al.

Page 1 of 1

It is certified that error appears in the above-identified patent and that said Letters Patent is hereby corrected as shown below:

Column 19:
Lines 43, "monofanctional" should be --monofunctional--.
Line 48, "monofanctional" should be --monofunctional--.

Column 43:
Line 3, "(Doman)." should be --(Dornan).--.

Column 44:
Line 71, "w/when" should be --when--.

Column 49:
Line 46, "cycloallkyl" should be --cycloalkyl--.

Column 50:
Line 16, "minor" should be --mirror--.

Column 67:
Line 60, Delete "," after "aspects".

Column 90:
Line 49, Claim 5, "tight" should be --light--.

Column 92:
Line 26, Claim 10, "clement" should be --element--.

Signed and Sealed this

Twenty-first Day of April, 2009

JOHN DOLL
*Acting Director of the United States Patent and Trademark Office*